(12) United States Patent
Kato

(10) Patent No.: US 8,483,053 B2
(45) Date of Patent: Jul. 9, 2013

(54) INFORMATION PROCESSING DEVICE, INFORMATION PROCESSING METHOD, PROGRAM, AND DATA STRUCTURE

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1250 days.

(21) Appl. No.: 10/588,501

(22) PCT Filed: Nov. 8, 2004

(86) PCT No.: PCT/JP2004/016532
§ 371 (c)(1),
(2), (4) Date: Aug. 4, 2006

(87) PCT Pub. No.: WO2005/076622
PCT Pub. Date: Aug. 18, 2005

(65) Prior Publication Data
US 2007/0165676 A1    Jul. 19, 2007

(30) Foreign Application Priority Data
Feb. 6, 2004   (JP) .................................. 2004-030214

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)

(52) U.S. Cl.
USPC .......................................... 370/229; 370/390

(58) Field of Classification Search
None
See application file for complete search history.

(56) References Cited

U.S. PATENT DOCUMENTS 6,614,936 B1 *  9/2003  Wu et al. ........................ 382/238
7,646,967 B2 *  1/2010  Kato et al. ..................... 386/124
(Continued)

FOREIGN PATENT DOCUMENTS

EP   1 182 877 A2   2/2002
EP   1 182 877 A3   2/2002

(Continued)

OTHER PUBLICATIONS

Author Unknown, ISO/IEC 13818-1: Generic Coding of Moving Pictures and Associated Audio: Systems, International Organization for Standardization, Workgroup 11—Coding of Moving Pictures and Associate Audio, pp. 1-130, Nov. 13, 1994.*

(Continued)

*Primary Examiner* — John Blanton
*Assistant Examiner* — Christopher Crutchfield
(74) *Attorney, Agent, or Firm* — Oblon, Spivak, McClelland, Maier & Neustadt, L.L.P.

(57) ABSTRACT

The present invention relates to an information processing apparatus, an information processing method, a program, and a data structure for processing a stream including a base stream and extension streams at a plurality of levels. A transmitter encodes an audio stream into a base stream BS and first to n-th extension streams Ext1 to ExtN. The transmitter refers to tables 90 and 91, generates TS packets 92 and 93-1 to 93-n having PIDs for the corresponding types of streams and the TS packets 90 and 91 of the tables, and outputs the generated TS packets to a receiver. The receiver refers to the TS packets 90 and 91 of the tables and determines the type(s) of stream(s) that it can process. The receiver selects the TS packets having the PID(s) associated with the stream(s) that it can process and decodes the TS packets. The present invention is applicable to a transmitter and a receiver that perform encoding and decoding.

15 Claims, 36 Drawing Sheets

U.S. PATENT DOCUMENTS

| | | | |
|---|---|---|---|
| 2002/0191625 A1* | 12/2002 | Kelly et al. | 370/412 |
| 2006/0098937 A1* | 5/2006 | Bruls et al. | 386/46 |
| 2009/0010614 A1* | 1/2009 | Yahata et al. | 386/96 |

FOREIGN PATENT DOCUMENTS

| | | |
|---|---|---|
| JP | 10-004539 | 1/1998 |
| JP | 10-4539 | 1/1998 |
| JP | 10-233692 | 9/1998 |
| JP | 10-313449 | 11/1998 |
| JP | 11-134812 | 5/1999 |
| JP | 2003-152544 | 5/2003 |
| JP | 2003-152752 | 5/2003 |
| JP | 2005-510982 | 4/2005 |
| WO | WO 01/65848 A1 | 9/2001 |
| WO | WO 03/047266 | 6/2003 |

OTHER PUBLICATIONS

F. Pereira and T. Ebrahimi, The MPEG-4 Book, Prentice Hall, Jul. 10, 2002, pp. 1-50.*

C. Herpel, A. Eleftheriadis, MPEG-4 Systems: Elementary Stream Management, Elsevier Science, Signal Processing: Image Communication, vol. 15, 2000, pp. 299-320.*

Author Unknown, IEEE 11496-3, Amendment 2, 2001, Subpart 4: General Audio Coding, ISO Press, 2001, pp. 1-87 and 307-311.*

S. Lee, S. Kim, E. Oh, A real Time Audio Streaming Meathod for Time Varying Network Loads, 112th Convention of The AES, May 13, 2002, pp. 1-4.*

Author Unknown, Generic Coding of Moving Pictures and Associated Audio: Systems, International Organization for Standardization, Workgroup 11—Coding of Moving Pictures and Associate Audio, pp. 1-130, Nov. 13, 1994.*

S. Kim, S. Park, Y. Kim, Fine Grain Scalability in MPEG-4 Audio, Audio Engineering Society, 111th Convention of The AES, Sep. 24, 2001, pp. 1-5.*

U.S. Appl. No. 12/614,142, filed Nov. 6, 2009, Kato.

Kimura, Takeshi et al. "MPEG-2 System no ISDB eno Tekiyo no Kento", ITEJ Technical Report, vol. 18, No. 28, pp. 7-12, May 26, 1994.

ITU—Telecommunication Standardization Sector, "Considerations of Loss Priority Between H.22x (Multi-media Multiplex Including MPEG-2 Systems) and AAL Type 1/2", Joint Video Team (JVT) of ISO/IEC MPEG & ITU-T/VCEG(ISO/IEC JTC1/SC29/WG11 and ITU-T SG16 Q6), No. AVC-636, XP030000633, Jul. 13, 1994, pp. 1-3.

L. M. Van De Kerkhof, et al., "MPEG1 and MPEG2 Audio Coding Algorithms and Implementation", WPM 14.2, XP010218348, pp. 236-237.

Office Action issued Nov. 25, 2010, in Japanese Patent Application No. 2005-517621, filed Nov. 17, 2010 (without English-language Translation).

U.S. Appl. No. 12/960,177, filed Dec. 3, 2010, Kato.

* cited by examiner

FIG. 7

```
Program Association Table(PAT){
    program_entry{
        program_number  PMT_PID{
                1           X
    }           2           Y
}
```

FIG. 8

```
Program Map Table(PMT){
    PID   X
    stream_entry(){
        BASE_PID a0
        Ext1_PID a1
        Ext2_PID a2
            ⋮
        ExtN_PID aN
    }
}
```

FIG. 10
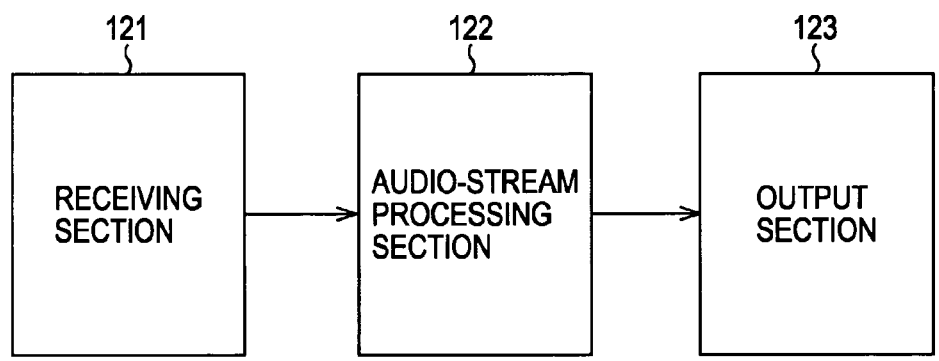
42

FIG. 21

```
Program Map Table(PMT)={
 PID    X
 steram_entry(){
    Audio_stream_type
    Audio_PID a0
 }
}
```

FIG. 25

```
transport_packet(){
    sync_byte
    transport_error_indicator
    payload_unit_start_indicator
    transport_priority
    PID
    transport_scrambling_control
    adaptation_field_control
    continuity_counter
    adaptation_field(){
        adaptation_field_length
        flags
        transport_private_data_flag(=1)
        flags
        transport_private_data_length(=1)
        sub_id
    }
    payload()
}
```

FIG. 27

```
transport_packet(){
    sync_byte
    transport_error_indicator
    payload_unit_start_indicator
    transport_priority // 0 : Ext1 , 1 : Base
    PID
    transport_scrambling_control
    adaptation_field_control
    continuity_counter
    payload()
}
```

INFORMATION PROCESSING DEVICE, INFORMATION PROCESSING METHOD, PROGRAM, AND DATA STRUCTURE

TECHNICAL FIELD

The present invention relates to information processing apparatuses, information processing methods, programs, and data structures, and in particular, to an information processing apparatus, an information processing method, a program, and a data structure for processing a stream including a base stream and extension streams at a plurality of levels.

BACKGROUND ART

An MPEG (Moving Picture Experts Group) 2 audio stream has backward compatibility so that it can be played back by even an MPEG1 audio decoder. In other words, the MPEG2 audio stream has a structure including an MPEG1 audio stream portion as a base portion and an MPEG2 audio portion as an extension portion thereof.

In the DVD (Digital Versatile Disc) video format, a technology for multiplexing an MPEG2 audio stream into a program stream is disclosed (e.g., Non-Patent Document 1). FIG. 1 is an illustration of the structure of a program stream 1 in the DVD video format. The program stream 1 in FIG. 1 includes a video pack 11, an MPEG2 audio pack 12, and a plurality of packs 13-1 to 13-*j* (j represents an arbitrary natural number).

The MPEG2 audio pack 12 includes a pack header 21, a PES (Packetized Elementary Stream) packet header 22, an MPEG1 audio data (Base) 23, a PES packet header 24, and an MPEG2 audio data (Extension) 25. In addition, the payload of the MPEG2 audio pack 12 includes an MPEG1 audio PES packet including the PES packet header 22 and the MPEG1 audio data 23, and an MPEG2 audio extension PES packet including the PES packet header 24 and the MPEG2 audio data 25.

When playing back the MPEG2 audio pack 12, a playback apparatus that can decode only an MPEG1 audio stream (playback apparatus only for MPEG1) separates and plays back only the PES packet header 22 and the MPEG1 audio data 23, which correspond to the MPEG1 audio stream portion. A playback apparatus that can perform decoding of up to an MPEG2 audio stream (playback apparatus capable of playing back up to an extension audio stream) separates and plays back both base and extension audio streams. Specifically, the latter playback apparatus plays back, in addition to the PES packet header 22 and the MPEG1 audio data 23, the PES packet header 24 and the MPEG2 audio data 25, which correspond to the MPEG2 extension audio stream.

[Non-Patent Document 1] DVD Specifications for Read-Only Disc Part 3; Version 1.1

DISCLOSURE OF THE INVENTION

Problems to be Solved by the Invention

However, for stream extensibility in the recent years, in the case of the program stream shown in FIG. 1, the stream structure is determined as a format. Thus, there is a problem in that a further audio stream extension cannot be added.

This results in reduction of extensibility and causes a problem in that it is difficult to realize standardization of playback apparatuses.

In addition, when an audio stream is broadcast, it is common to perform broadcasting by using a TS (Transport Stream). However, the use of a TS is inappropriate in the program stream encoding method shown in FIG. 1. Specifically, a TS packet corresponding to a pack (e.g., the MPEG2 audio pack 12 in FIG. 1) has a relatively small length of 188 bytes. When two PES packets, a base portion (MPEG1) and an extension portion (MPEG2), are multiplexed in the TS packet, there is a problem in that the encoding efficiency is low.

The present invention has been made in view of the above circumstances and is intended to enable encoding and decoding of a stream including a base stream and extension streams at a plurality of levels.

Means for Solving the Problems

A first information processing apparatus of the present invention includes encoding means for encoding an input stream so as to include, among a base stream and first to n-th extension streams having extensibility for the base stream, at least the base stream and the first extension stream; table generating means for generating a table in which information is written for associating IDs that respectively identify the base stream and the first to n-th extension streams, which are encoded by the encoding means, with the base stream and the first to n-th extension streams; adding means for adding the corresponding IDs to the base stream and the first to n-th extension streams encoded by the encoding means; and packetizing means for packetizing the base stream and the first to n-th extension streams, to which the IDs are added by the adding means, and the table into TS packets.

A first information processing method of the present invention includes an encoding step of encoding an input stream so as to include, among a base stream and first to n-th extension streams having extensibility for the base stream, at least the base stream and the first extension stream; a table generating step of generating a table in which information is written for associating IDs that respectively identify the base stream and the first to n-th extension streams, which are encoded by processing in the encoding step, with the base stream and the first to n-th extension streams; an adding step of adding the corresponding IDs to the base stream and the first to n-th extension streams encoded by processing in the encoding step; and a packetizing step of packetizing the base stream and the first to n-th extension streams, to which the IDs are added by processing in the adding step, and the table into TS packets.

A first program of the present invention is a program for allowing a computer to execute processing including an encoding step of encoding an input stream so as to include, among a base stream and first to n-th extension streams having extensibility for the base stream, at least the base stream and the first extension stream; a table generating step of generating a table in which information is written for associating IDs that respectively identify the base stream and the first to n-th extension streams, which are encoded by processing in the encoding step, with the base stream and the first to n-th extension streams; an adding step of adding the corresponding IDs to the base stream and the first to n-th extension streams encoded by processing in the encoding step; and a packetizing step of packetizing the base stream and the first to n-th extension streams, to which the IDs are added by processing in the adding step, and the table into TS packets.

According to a first aspect of the present invention, an input stream is encoded so as to include, among a base stream and first to n-th extension streams having extensibility for the base stream, at least the base stream and the first extension stream. A table is generated in which information is written for associating IDs that respectively identify the encoded base stream and the encoded first to n-th extension streams with the base stream and the first to n-th extension streams. The corresponding IDs are added to the encoded base stream and the encoded first to n-th extension streams. The base stream, the first to n-th extension streams, and the table are packetized into TS packets.

A second information processing apparatus of the present invention includes input means for inputting a stream including TS packets forming a base stream, TS packets forming each of first to n-th extension streams having extensibility for the base stream, and a TS packet storing a table in which information is written for associating IDs that respectively identify the TS packets with the base stream or the first to n-th extension streams formed of the TS packets; determining means for referring to the table stored in the TS packet input by the input means and determining the type of processable stream; selecting means for selecting, from the stream, the TS packets having the ID associated with the stream determined by the determining means to be processable; and decoding means for decoding the TS packets selected by the selecting means.

The second information processing apparatus may further include buffering means for buffering, with respect to each ID, the TS packets selected by the selecting means.

A second information processing method of the present invention includes an input step of inputting a stream including TS packets forming a base stream, TS packets forming each of first to n-th extension streams having extensibility for the base stream, and a TS packet storing a table in which information is written for associating IDs that respectively identify the TS packets with the base stream or the first to n-th extension streams formed of the TS packets; a determining step of referring to the table stored in the TS packet input by processing in the input step and determining the type of processable stream; a selecting step of selecting, from the stream, the TS packets having the ID associated with the stream determined by processing in the determining step to be processable; and a decoding step of decoding the TS packets selected by processing in the selecting step.

A second program of the present invention is a program for allowing a computer to execute processing including an input step of inputting a stream including TS packets forming a base stream, TS packets forming each of first to n-th extension streams having extensibility for the base stream, and a TS packet storing a table in which information is written for associating IDs that respectively identify the TS packets with the base stream or the first to n-th extension streams formed of the TS packets; a determining step of referring to the table stored in the TS packet input by processing in the input step and determining the type of processable stream; a selecting step of selecting, from the stream, the TS packets having the ID associated with the stream determined by processing in the determining step to be processable; and a decoding step of decoding the TS packets selected by processing in the selecting step.

According to a second aspect of the present invention, a stream is input, which includes TS packets forming a base stream, TS packets forming each of first to n-th extension streams having extensibility for the base stream, and a TS packet storing a table in which information is written for associating IDs that respectively identify the TS packets with the base stream or the first to n-th extension streams formed of the TS packets. The table is referred to and the type of processable stream is determined. From the stream, the TS packets having the ID associated with the stream determined to be processable are selected and decoded.

A first data structure of the present invention is a data structure of an entire stream including TS packets forming a base stream; TS packets forming each of first to n-th extension streams having extensibility for the base stream; and a TS packet storing a table in which information is written for associating the TS packets forming the base stream or the first to n-th extension streams with IDs identifying these TS packets. A header of each of the TS packets forming the base stream and the TS packets forming each of the first to n-th extension streams includes the ID identifying the TS packet.

The TS packets forming the base stream and the TS packets forming each of the first to n-th extension streams, which are included in the entire stream, may be arranged in sequence of the TS packets to be played back at the same time and in the order of the TS packets forming the base stream and the TS packets forming each of the first to n-th extension streams.

According to a third aspect of the present invention, an entire stream includes TS packets forming a base stream, TS packets forming each of first to n-th extension streams having extensibility for the base stream, and a TS packet storing a table in which information is written for associating the TS packets forming the base stream or the first to n-th extension streams with IDs identifying these TS packets. A header of each of the TS packets forming the base stream and the TS packets forming each of the first to n-th extension streams includes the ID identifying the TS packet.

A third information processing apparatus of the present invention includes encoding means for encoding, of an entire stream that may include a base stream and first to n-th extension streams having extensibility for the base stream, at least the base stream; first adding means for adding a same first ID to, among the base stream and the first to n-th extension streams, the stream encoded by the encoding means, the first ID being used to identify the entire stream; second adding means for adding a second ID to, among the base stream and the first to n-th extension streams, the stream encoded by the encoding means, the second ID being used to identify each of the base stream and the first to n-th extension streams; and packetizing means for packetizing the base stream and the first to n-th extension streams, to which the first ID and the second ID are added by the first adding means and the second adding means, into TS packets.

The encoding means may encode the TS packets forming the base stream and the TS packets forming each of the first to n-th extension streams, which are included in the entire stream, so that the TS packets to be played back at the same time are arranged in sequence in the order of the TS packets forming the base stream and the TS packets forming each of the first to n-th extension streams.

When any of synchronization units of the first to n-th extension streams corresponding to synchronization units of the base stream are present, the encoding means may encode, among the first to n-th extension streams, the extension stream having the present synchronization units and the base stream.

When any of the synchronization units of the first to n-th extension streams corresponding to the synchronization units of the base stream are present, the encoding means may encode, among the first to n-th extension streams, the extension stream having the present synchronization units and the base stream and may not encode the extension stream having none of the present synchronization units, thereby encoding the entire stream using variable bit rate.

A third information processing method of the present invention includes an encoding step of encoding, of an entire stream that may include a base stream and first to n-th extension streams having extensibility for the base stream, at least the base stream; a first adding step of adding a same first ID to, among the base stream and the first to n-th extension streams, the stream encoded by processing in the encoding step, the first ID being used to identify the entire stream; a second adding step of adding a second ID to, among the base stream and the first to n-th extension streams, the stream encoded by processing in the encoding step, the second ID being used to identify each of the base stream and the first to n-th extension streams; and a packetizing step of packetizing the base stream and the first to n-th extension streams, to which the first ID and the second ID are added by processing in the first adding step and the second adding step, into TS packets.

A third program of the present invention is a program for allowing a computer to execute processing including an encoding step of encoding, of an entire stream that may include a base stream and first to n-th extension streams having extensibility for the base stream, at least the base stream; a first adding step of adding a same first ID to, among the base stream and the first to n-th extension streams, the stream encoded by processing in the encoding step, the first ID being used to identify the entire stream; a second adding step of adding a second ID to, among the base stream and the first to n-th extension streams, the stream encoded by processing in the encoding step, the second ID being used to identify each of the base stream and the first to n-th extension streams; and a packetizing step of packetizing the base stream and the first to n-th extension streams, to which the first ID and the second ID are added by processing in the first adding step and the second adding step, into TS packets.

According to a fourth aspect of the present invention, of an entire stream that may include a base stream and first to n-th extension streams having extensibility for the base stream, at least the base stream is encoded. A same first ID used to identify the entire stream and a second ID identifying each of the base stream and the first to n-th extension streams are added to, among the base stream and the first to n-th extension streams, the stream encoded by the encoding means. The base stream and the first to n-th extension streams to which the first ID and the second ID are added are packetized into TS packets.

A fourth information processing apparatus of the present invention includes input means for inputting an entire stream that may include TS packets forming a base stream and TS packets forming each of first to n-th extension streams having extensibility for the base stream; selecting means for selecting, from the entire stream, the processable TS packets based on a first ID used to identify the entire stream, a second ID identifying each of the base stream and the first to n-th extension streams, and a predetermined condition set in advance, the first ID and the second ID being stored in each of the TS packets input by the input means; and decoding means for decoding the TS packets selected by the selecting means.

To the input means, the entire stream may be input, including the TS packets forming the base stream and the TS packets forming each of the first to n-th extension streams arranged in sequence of the TS packets to be played back at the same time and in the order of the TS packets forming the base stream and the TS packets forming each of the first to n-th extension streams.

The entire stream input to the input means may at least include the encoded base stream, and may further include the first to n-th extension streams which correspond to synchronization units of the base stream and which are encoded using variable bit rate.

A fourth information processing method of the present invention includes an input step of inputting an entire stream that may include TS packets forming a base stream and TS packets forming each of first to n-th extension streams having extensibility for the base stream; a selecting step of selecting, from the entire stream, the processable TS packets based on a first ID used to identify the entire stream, a second ID identifying each of the base stream and the first to n-th extension streams, and a predetermined condition set in advance, the first ID and the second ID being stored in each of the TS packets input by processing in the input step; and a decoding step of decoding the TS packets selected by processing in the selecting step.

A fourth program of the present invention is a program for allowing a computer to execute processing including an input step of inputting an entire stream that may include TS packets forming a base stream and TS packets forming each of first to n-th extension streams having extensibility for the base stream; a selecting step of selecting, from the entire stream, the processable TS packets based on a first ID used to identify the entire stream, a second ID identifying each of the base stream and the first to n-th extension streams, and a predetermined condition set in advance, the first ID and the second ID being stored in each of the TS packets input by processing in the input step; and a decoding step of decoding the TS packets selected by processing in the selecting step.

According to a fifth aspect of the present invention, an entire stream that may include TS packets forming a base stream and TS packets forming each of first to n-th extension streams having extensibility for the base stream is input. Based on a first ID used to identify the entire stream and a second ID identifying each of the base stream and the first to n-th extension streams, which are stored in each of the TS packets, and based on a predetermined condition set in advance, the processable TS packets are selected from the entire stream and decoded.

A second data structure of the present invention is a data structure of an entire stream including TS packets forming a base stream; and TS packets forming, when any of synchronization units of first to n-th extension streams corresponding to synchronization units of the base stream are present, among the first to n-th extension streams, the extension stream having the present synchronization units. A header of each of the TS packets forming the base stream and the TS packets forming each of the first to n-th extension streams includes a first ID used to identify the entire stream and a second ID identifying each of the base stream and the first to n-th extension streams.

The TS packets forming the base stream and the TS packets forming each of the first to n-th extension streams, which are included in the entire stream, may be arranged in sequence of the TS packets to be played back at the same time and in the order of the TS packets forming the base stream and the TS packets forming each of the first to n-th extension streams.

The entire stream may at least include the base stream, and may further include the TS packets forming the first to n-th extension streams corresponding to the synchronization units of the base stream, the number of the TS packets being variable.

According to a sixth aspect of the present invention, an entire stream includes TS packets forming a base stream; and TS packets forming, when any of synchronization units of first to n-th extension streams corresponding to synchronization units of the base stream are present, among the first to n-th extension streams, the extension stream having the present synchronization units. A header of each of the TS packets forming the base stream and the TS packets forming each of the first to n-th extension streams includes a first ID used to identify the entire stream and a second ID identifying each of the base stream and the first to n-th extension streams.

Advantages

According to the first aspect of the present invention, processing in accordance with stream extension can be performed. In particular, according to the present invention, even when a stream is extended, encoding in accordance with an information processing apparatus at a receiving side can be performed.

According to the second aspect of the present invention, processing in accordance with stream extension can be performed. In particular, according to the present invention, even when an extended stream is input, decoding in accordance with the processing capacity of the information processing apparatus can be performed.

According to the third aspect of the present invention, a data structure in accordance with stream extension can be obtained. In particular, according to the present invention, even when a stream is extended, a data structure in accordance with the information processing apparatus at the receiving side can be obtained.

According to the fourth aspect of the present invention, processing in accordance with stream extension can be performed. In particular, according to the present invention, even when a stream is extended, encoding in accordance with the information processing apparatus at the receiving side can be performed.

According to the fifth aspect of the present invention, processing in accordance with stream extension can be performed. In particular, according to the present invention, even when an extended stream is input, decoding in accordance with the processing capacity of the information processing apparatus can be performed.

According to the sixth aspect of the present invention, processing in accordance with stream extension can be performed. In particular, according to the present invention, even when a stream is extended, a data structure in accordance with the information processing apparatus at the receiving side can be obtained.

BRIEF DESCRIPTION OF THE DRAWINGS

FIG. 7 is an illustration of an example of a PAT table.

FIG. 8 is an illustration of an example of a PMT table.

FIG. 10 is a block diagram showing an example of the configuration of a receiver in FIG. 2.

FIG. 21 is an illustration of another example of the PMT table.

FIG. 25 is an illustration of the structure of a TS packet corresponding to FIG. 23.

FIG. 27 is an illustration of the structure of a TS packet corresponding to FIG. 26.

REFERENCE NUMERALS

40 transmitting/receiving system, 41 transmitter, 42 receiver, 71 input section, 72 audio encoder, 73 base buffer, 74-1 to 74-*n* extension buffers, 76 TS packetizing section, 77 transmitting section, 90 to 92, and 93-1 to 93-*n* TS packets, 121 receiving section, 122 audio-stream processing section, 123 output section, 151 input portion, 152 filter control portion, 153 PID filter, 154 base buffer, 155 audio decoder, 201 PID filter, 202 extension buffer, 203 audio decoder, 231 PID filter, 232 audio decoder, 261 PID filter, 262 audio decoder, 301 PID filter, 302 buffer, 303 audio decoder, 310 transmitter, 311 extraction-information adding section, 312 TS packetizing section, 313 Sub_id adding section, 404 Sub_id filter control portion, 405 Sub_id filter

BEST MODE FOR CARRYING OUT THE INVENTION

A first embodiment of the present invention is described below with reference to FIGS. 2 to 19.

Figure 1:
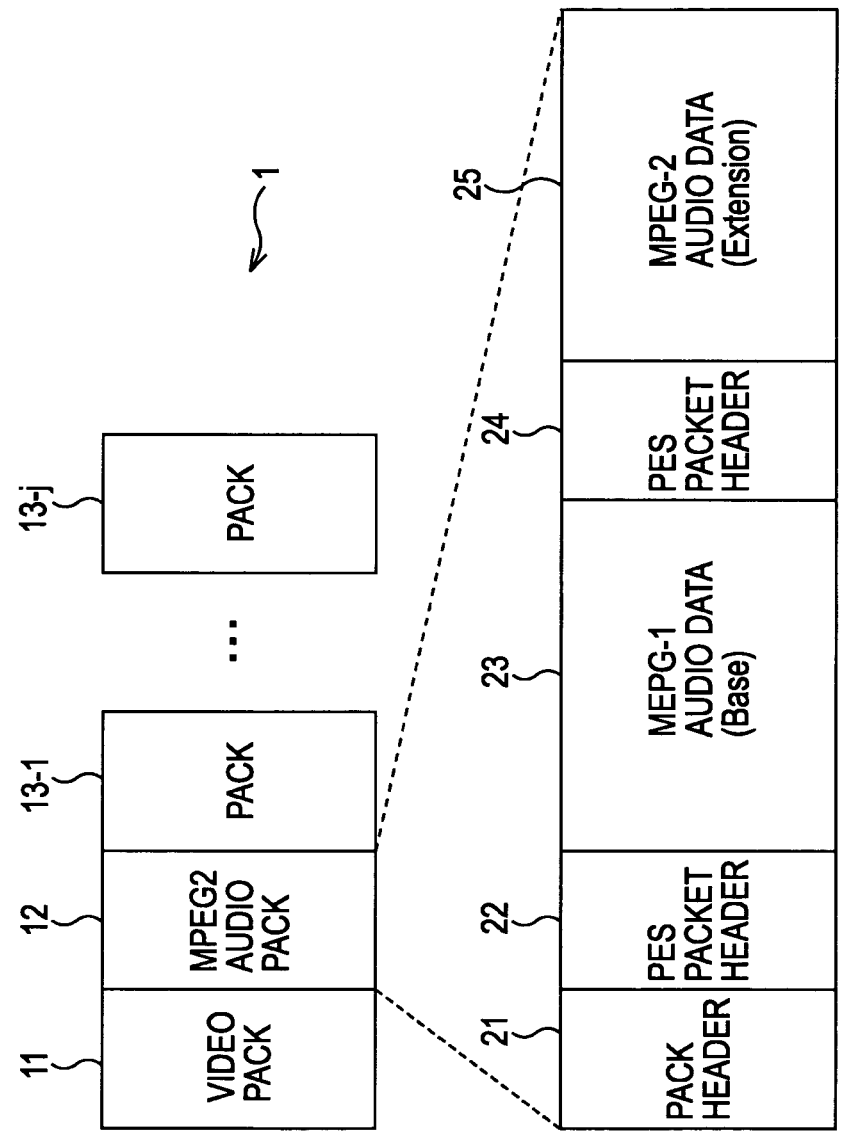
FIG. 1 is an illustration of the structure of a program stream in the DVD video format.
Figure 2:
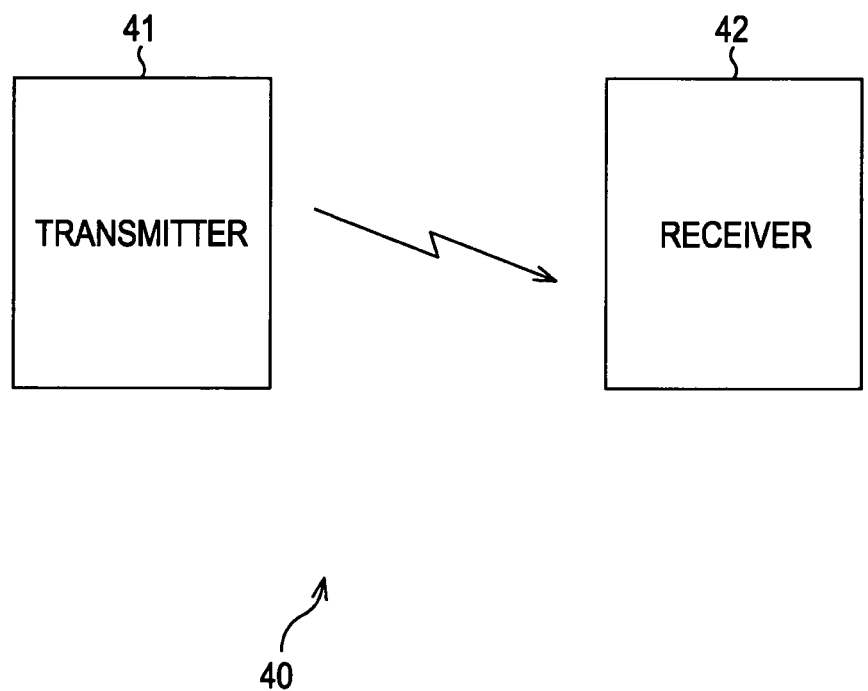
FIG. 2 is a diagram showing an example of the configuration of the entirety of a transmitting/receiving system of a first embodiment to which the present invention is applied.

FIG. 2 is a diagram showing an example of the configuration of the entirety of a transmitting/receiving system to which the present invention is applied.

This transmitting/receiving system 40 includes a transmitter 41 and a receiver 42. The transmitter 41 is an apparatus, such as a broadcasting station, for transmitting a stream including a plurality of TS packets. The receiver 42 is a household apparatus, such as a household set-top box, for receiving the stream.

In this embodiment, the transmitter 41 encodes an audio stream to generate TS packets and transmits the TS packets, and the receiver 42 receives the TS packets and decodes the TS packets to acquire the audio stream.

Figure 3:
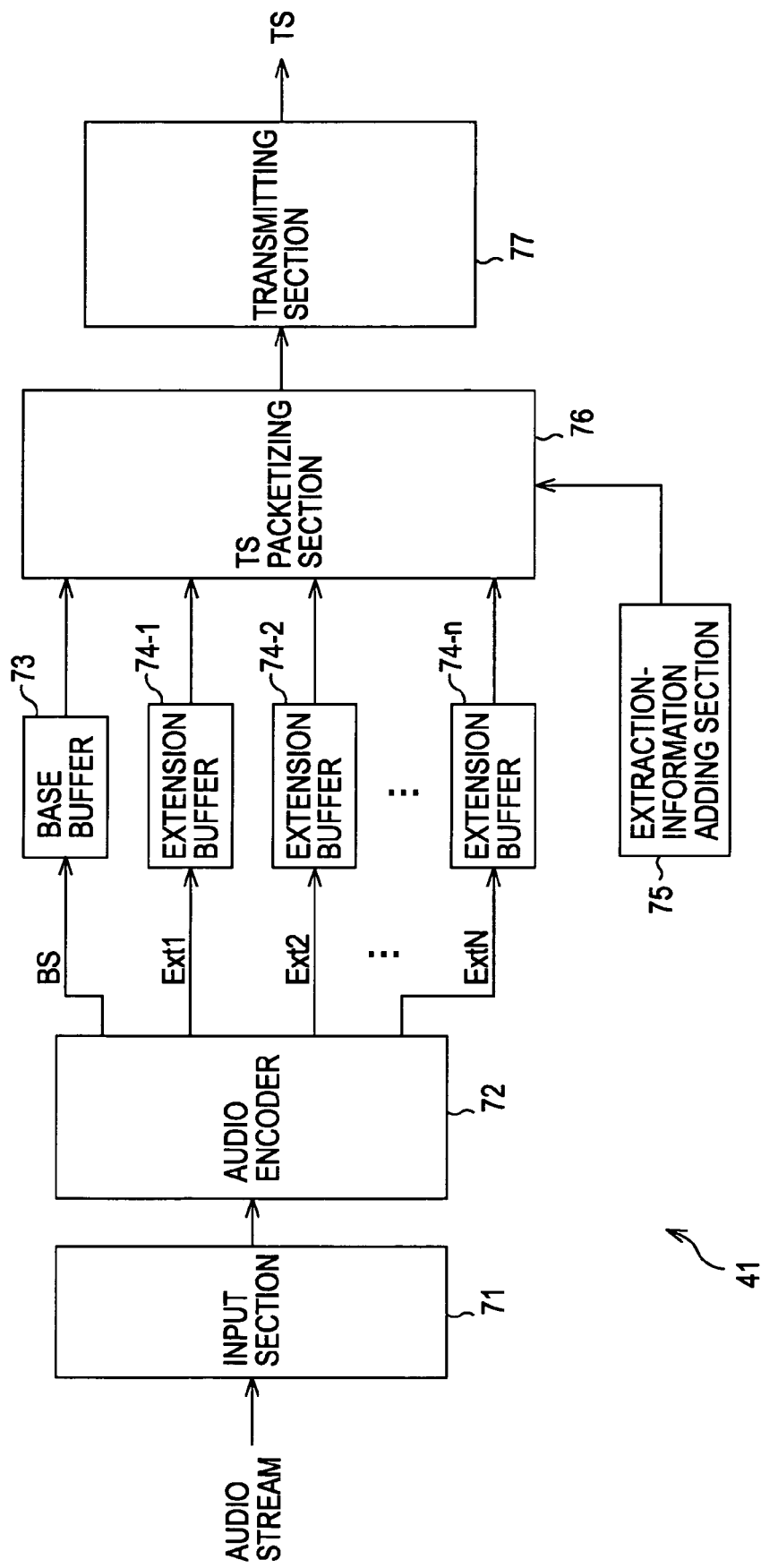
FIG. 3 is a block diagram showing an example of the configuration of a transmitter in FIG. 2.

FIG. 3 is a block diagram showing an example of the configuration of the transmitter 41 in FIG. 2.

The transmitter 41 includes an input section 71, an audio encoder 72, a base buffer 73, extension buffers 74-1 to 74-*n*, an extraction-information adding section 75, a TS packetizing section 76, and a transmitting section 77, in which n represents an arbitrary natural number equal to one or greater.

An audio stream to be transmitted is input to the input section 71. The audio encoder 72 encodes the audio stream. The audio encoder 72 in FIG. 3 is an encoder corresponding to the n-th extension audio stream. That is, the audio encoder 72 can encode the audio stream into a base stream and extension audio streams at a plurality of levels ranging from the first to n-th levels.

In this embodiment, the larger the value of the level n, the higher the extensibility is, resulting in better audio playback quality and higher functionality. The audio encoder 72 encodes the audio stream into the base stream and the first to n-th extension streams and supplies the encoded streams to the extension buffers 74-1 to 74-*n* at the corresponding levels. For example, the audio encoder 72 supplies the encoded base audio stream (BS) to the base buffer 73, supplies the encoded first extension audio stream (Ext1) to the extension buffer 74-1, supplies the encoded second extension audio stream (Ext2) to the extension buffer 74-2, and similarly supplies the encoded n-th extension audio stream (ExtN) to the extension buffer 74-*n*. Here, the level of the extension audio stream corresponds to the reference numeral of the buffer. Also, the base audio stream is represented as BS, and the first to n-th extension audio streams are represented as Ext1 to ExtN, respectively.

After separating the audio stream into the base audio stream and the first to n-th extension audio streams, the audio encoder 72 in this embodiment may encode the streams. Alternatively, as the result of encoding the audio stream, the base audio stream and the first to n-th extension audio streams may be output.

The base buffer 73 stores (buffers) the base audio stream, and the extension buffers 74-1 to 74-*n* store (buffer) the first to n-th extension audio streams, respectively. Under the control of the TS packetizing section 76, the base buffer 73 and the extension buffers 74-1 to 74-*n* read the audio streams stored therein.

The extraction-information adding section 75 generates tables, which are extraction information, so that at the decoding side the extension audio stream at a desired level is extracted from the base audio stream and the first to n-th extension audio streams. In the tables, information is written for associating IDs (PIDs (Packet Identification) in the first embodiment) that respectively identify the base audio stream and the first to n-th extension audio streams with the base audio stream and the first to n-th extension audio streams. Specifically, the tables include a PAT (Program Association Table) and a PMT (Program Map Table). The details of the tables are described below with reference to FIGS. 7 and 8. The extraction-information adding section 75 supplies the tables to the TS packetizing section 76.

The TS packetizing section 76 controls the base buffer 73 and the extension buffers 74-1 to 74-*n* to acquire the base audio stream and the first to n-th extension audio streams and also acquires the tables supplied from the extraction-information adding section 75. Also, the TS packetizing section 76 packetizes the tables into TS packets and, based on the tables, packetizes the base audio stream and the first to n-th extension audio streams into TS packets (generates TS packets). At this time, the TS packetizing section 76 adds the PIDs that identify the types of streams (the base audio stream and the first to n-th extension audio streams) based on the tables. The TS packetizing section 76 supplies the generated TS packets to the transmitting section 77. The transmitting section 77 transmits the TS packets. Here, the plural TS packets are transmitted in sequence, resulting in transmission of one stream (consisting of a plurality of TS packets).

In the first embodiment, the PID identifies each packet (TS packet (transport stream packet) forming an MPEG TS, and the PID having a unique value is added to each packet. In other words, in order that the receiver 42 at the receiving side selects a packet of an extension audio stream at a desired level, the PID value added to this packet is necessary.

Next, the structure of a TS (transport stream) in which the base audio stream and the extension audio streams at a plurality of levels are multiplexed is described with reference to FIGS. 4 and 5.

Figure 4:
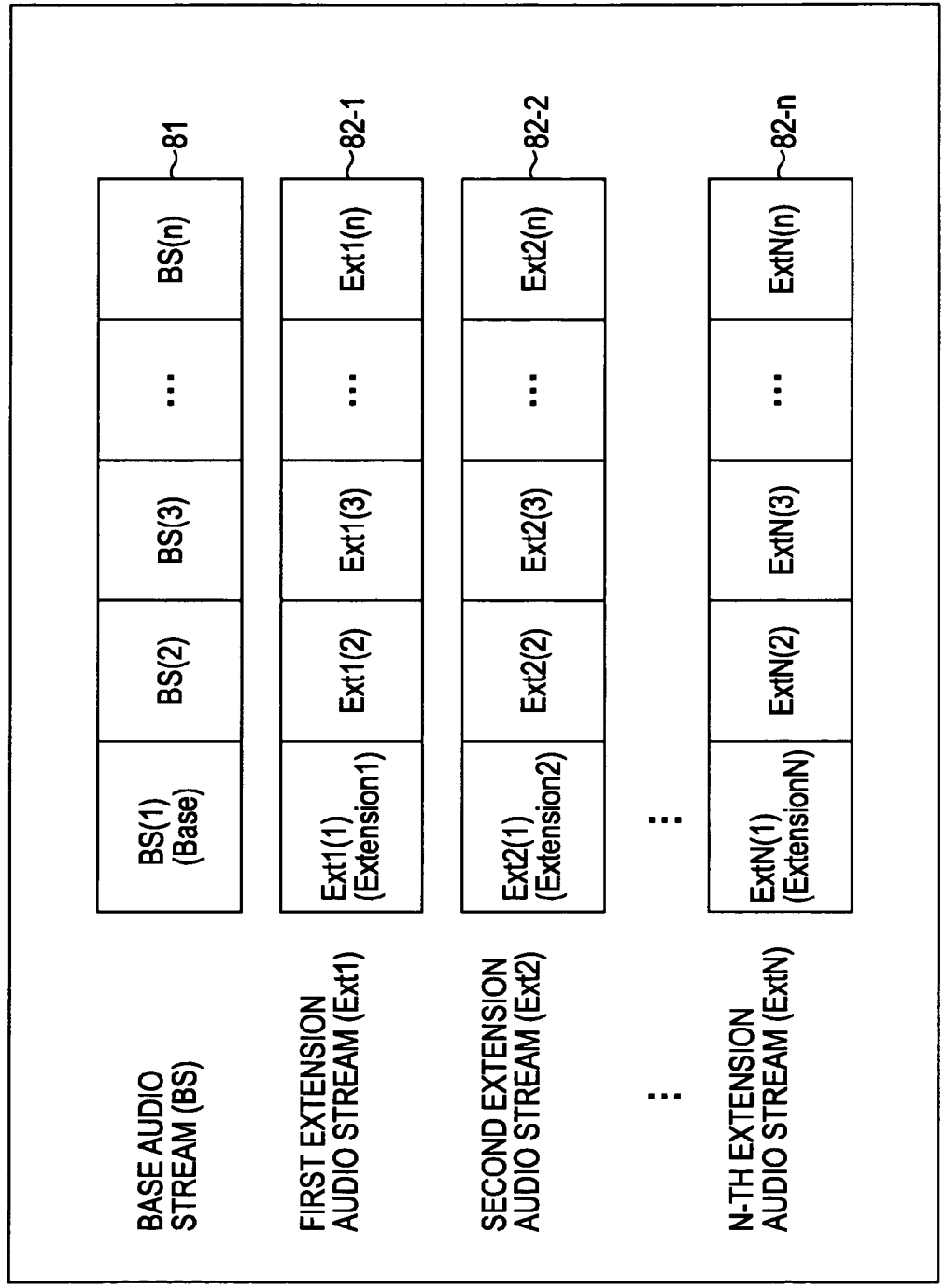
FIG. 4 is an illustration of the structure of a TS in which a base audio stream and extension audio streams at a plurality of levels are multiplexed.

In the example of FIG. 4, a TS includes a base audio stream 81 and first to n-th extension audio streams 82-1 to 82-*n*. Each of the base audio stream 81 and the first to n-th extension audio streams 82-1 to 82-*n* is encoded in units of a predetermined number of audio samples, and each unit is indicated by a parenthesized subscript. Specifically, for example, the base audio stream 81 is separated into a plurality of units BS(1), BS(2), ..., BS(n) and encoded. A set of units having the same subscript, for example, BS(1), Ext1(1), Ext2(1), ..., ExtN(1), is synchronously encoded by the audio encoder 72 and synchronously played back (decoded).

Figure 5:
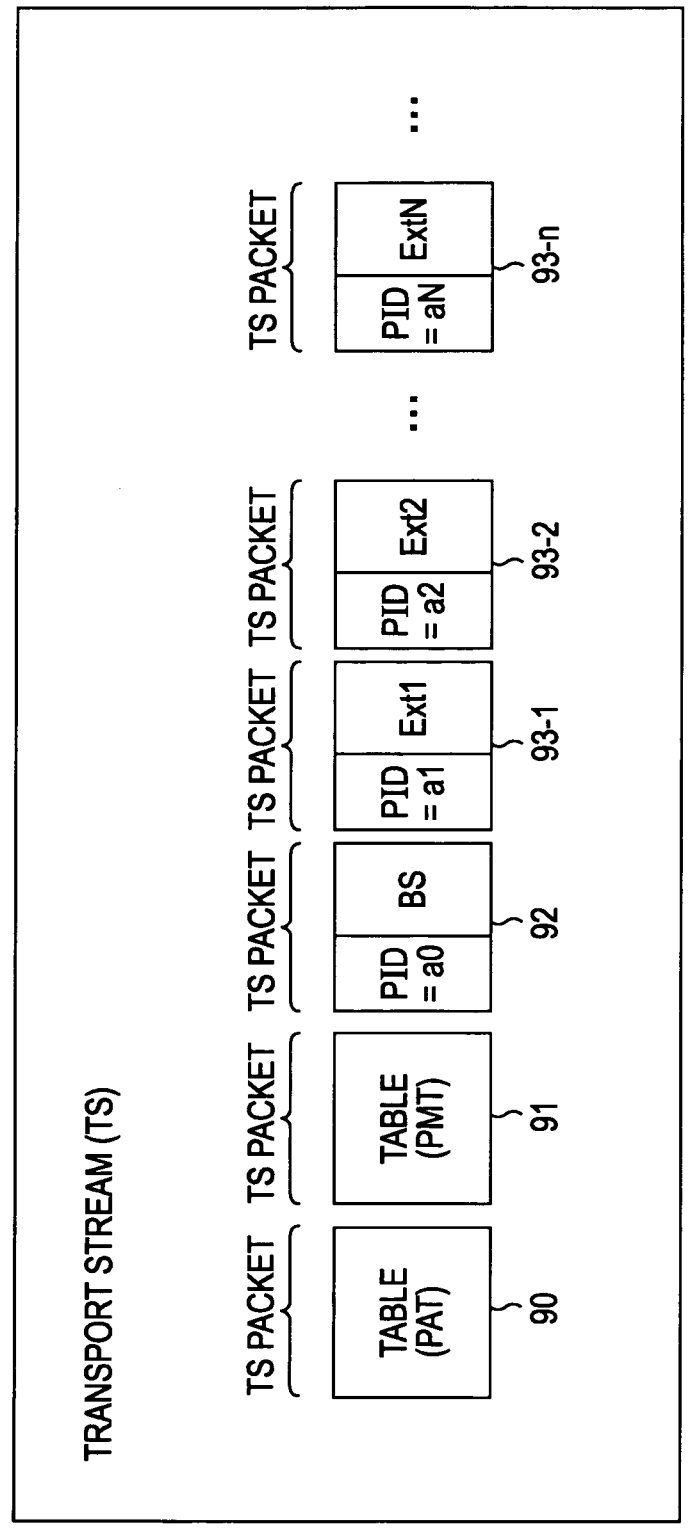
FIG. 5 is an illustration of the structure of the TS in which the base audio stream and the extension audio streams at a plurality of levels are multiplexed.

The TS packetizing section 76 multiplexes the base audio stream 81 and the first to n-th extension audio streams 82-1 to 82-*n* into TS packets having different PIDs (packet IDs), as shown in FIG. 5. One TS packet stores data of, for example, 188 bytes.

The TS stream in FIG. 5 includes a TS packet 90 in which a PAT (Program Association Table) table is written, a TS packet 91 in which a PMT (Program Map Table) table is written, a TS packet 92 of the base audio stream (BS) with PID=a0, a TS packet 93-1 of the first extension audio stream (Ext1) with PID=a1, a TS packet 93-2 of the second extension audio stream (Ext2) with PID=a2, . . . , and a TS packet 93-n of the n-th extension audio stream (ExtN) with PID=aN. The TS packet 91 of the table is transmitted by the transmitter 41 every predetermined period.

In this embodiment, the receiver 42 at the receiving side is capable of decoding at least the base audio stream (BS). When the receiver 42 at the receiving side can play back extension audio streams up to a predetermined m-th level (m represents a natural number equal to one or greater, and m≦n), the receiver 42 can decode the base audio stream and the first to m-th extension audio streams. Regarding the relationships between the base audio stream and the extension audio streams, for example, the larger the value n of the decodable extension audio stream, the better the audio playback quality is and the higher the functionality is.

Next, a TS packet transmitting process executed by the transmitter 41 in FIG. 3 is described with reference to the flowchart in FIG. 6. This process is initiated when the power of the transmitter 41 is turned on to input an audio stream to the input section 71.

In step S11, the input section 71 receives the input audio stream. In step S12, the input section 71 outputs the received audio stream to the audio encoder 72.

In step S13, the audio encoder 72 encodes the base audio stream and the first to n-th extension audio streams. As a result, the audio encoder 72 outputs the base audio stream and the first to n-th extension audio streams shown in FIG. 4 in (vertically) synchronized form.

In step S14, the audio encoder 72 outputs the encoded audio streams separately for each level (type of stream). Specifically, the audio encoder 72 outputs the encoded base audio stream to the base buffer 73, the encoded first extension audio stream to the extension buffer 74-1, the encoded second extension audio stream to the extension buffer 74-2, and the encoded n-th extension audio stream to the extension buffer 74-n.

In step S15, the base buffer 73 and the first to n-th extension buffers 74-1 to 74-n respectively store (buffer) the encoded audio streams.

In step S16, the base buffer 73 and the first to n-th extension buffers 74-1 to 74-n respectively output the encoded audio streams with predetermined timing. Actually, the TS packetizing section 76 controls the buffers (the base buffer 73 and the first to n-th extension buffers 74-1 to 74-n) so as to read the corresponding audio streams therefrom.

In step S17, the extraction-information adding section 75 generates tables and supplies the tables to the TS packetizing section 76. Specifically, the extraction-information adding section 75 generates the tables shown in FIGS. 7 and 8 and supplies the tables to the TS packetizing section 76.

FIG. 7 illustrates the PAT (Program Association Table). Specifically, in this PAT, the PMT-PID corresponding to each program-number is written. In the example of FIG. 7, PMT-PID for program-number 1 is "X" and PMT-PID for program-number 2 is "Y". The value of the PMT-PID is referred to by the PMT (Program Map Table) shown in FIG. 8. In FIG. 8, stream_entry in the case where the PID is "X" is written. Specifically, the PMT includes BASE_PID=a0, Ext1_PID=a1, Ext2_PID=a2, . . . , ExtN_PID=aN. It is clear that, according to FIGS. 7 and 8, the PID of the base audio stream (BS) is "a0"; the PID of the first extension audio stream Ext1 is "a1"; the PID of the second extension audio stream Ext2 is "a2"; and similarly the PID of the n-th extension audio stream ExtN is "aN". Accordingly, as shown in FIG. 5, the PID corresponding to the encoding level is identifiable.

In this embodiment, the PAT and the PMT are transmitted in different TS packets. In other words, as shown in FIG. 5, the TS packet 90 of the table in which the PAT is written and the TS packet 91 of the table in which the PMT is written are transmitted.

Referring back to FIG. 6, in step S18, the TS packetizing section 76 executes a TS packet generating process. The details of the process are described below with reference to FIG. 9. The TS packets generated by the TS packetizing section 76 are output to the transmitting section 77.

In step S19, the transmitting section 77 transmits the TS packets (an audio stream including the plural TS packets) to the receiver 42. Specifically, the stream including the TS packets 90 and 91 of the tables, the TS packet 92 of the base audio stream, and the TS packets 93-1 to 93-n of the first to n-th extension audio streams is transmitted. After that, the process is finished. Although the TS packets are transmitted to the receiver 42 in this embodiment, the TS packets may be recorded in various types of recording media, which are not shown. Alternatively, transmission of the TS packets to the receiver 42 may be performed indirectly by recording the TS packets in a recording medium and then supplying the recording medium to the receiver 42.

Figure 6:
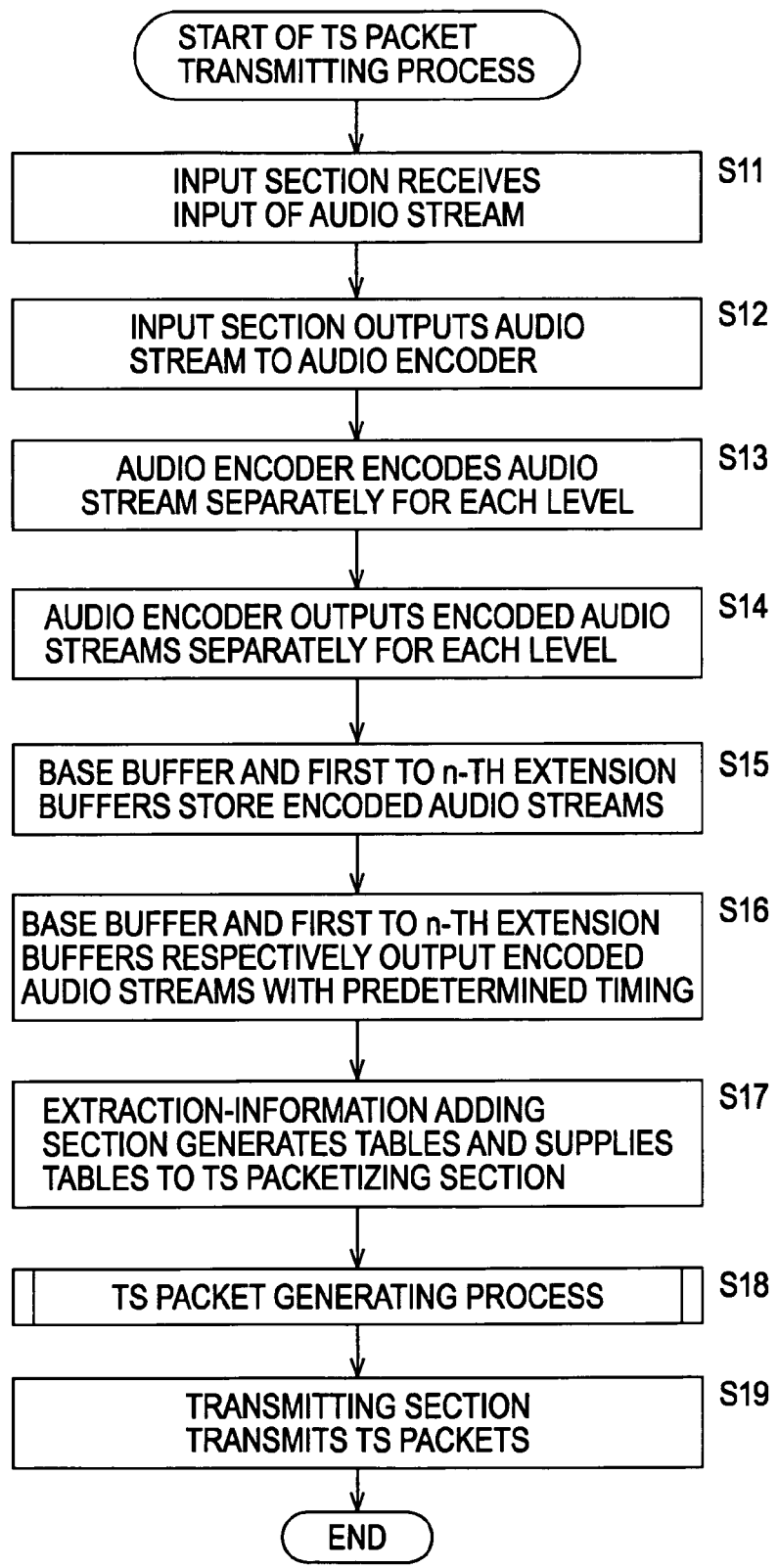
FIG. 6 is a flowchart illustrating a TS packet transmitting process executed by the transmitter in FIG. 3.

Next, the details of the TS packet generating process in step S18 of FIG. 6 are described with reference to the flowchart of FIG. 9.

In step S31, the TS packetizing section 76 acquires the tables. The tables are such as those shown in FIGS. 7 and 8, which are generated in step S17 of FIG. 6. That is, the tables include information in which the PIDs that respectively identify the base audio stream and the first to n-th extension audio streams and information that respectively identifies the base audio stream and the first to n-th extension audio streams are written.

In step S32, the TS packetizing section 76 packetizes the tables into TS packets (generates TS packets based on the tables) and outputs the TS packets to the transmitting section 77 (and the transmitting section 77 transmits the TS packets in turn to the receiver 42). Accordingly, the TS packet 90 in which the PAT in FIG. 5 is written and the TS packet in which the PMT is written are generated and output to the transmitting section 77. In this process, the TS packets are transmitted only once. Actually, however, the TS packets in which the tables are written are transmitted every predetermined period of time. Accordingly, even when the receiver 42 starts receiving the stream in the middle thereof, the receiver 42 can acquire the tables and thus reliably decode the stream.

In step S33, the TS packetizing section 76 adds, based on the tables, the PIDs to the corresponding audio streams from the base buffer 73 and the first to n-th extension buffers 74-1 to 74-n. Although the tables are packetized into TS packets by the processing in step S31 and then transmitted, it is assumed here that the tables are held by the TS packetizing section 76. Accordingly, PID=a0 is added to the base audio stream (BS), PID=a1 is added to the first extension audio stream (Ext1), PID=a2 is added to the second extension audio stream (Ext2), and similarly PID=aN is added to the n-th extension audio stream (ExtN).

In step S34, the TS packetizing section 76 generates TS packets, respectively, based on the audio streams from the base buffer 73 and the first to n-th extension buffers 74-1 to 74-n. As shown in FIG. 5, the base audio stream and the first to n-th extension audio streams are generated as TS packets having respective different PIDs (packet IDs). In other words, the PIDs for determining the types of streams are added to the TS packets.

In step S35, the TS packetizing section 76 outputs the generated TS packets to the transmitting section 77. After that, the process returns to step S18 of FIG. 6.

Figure 9:
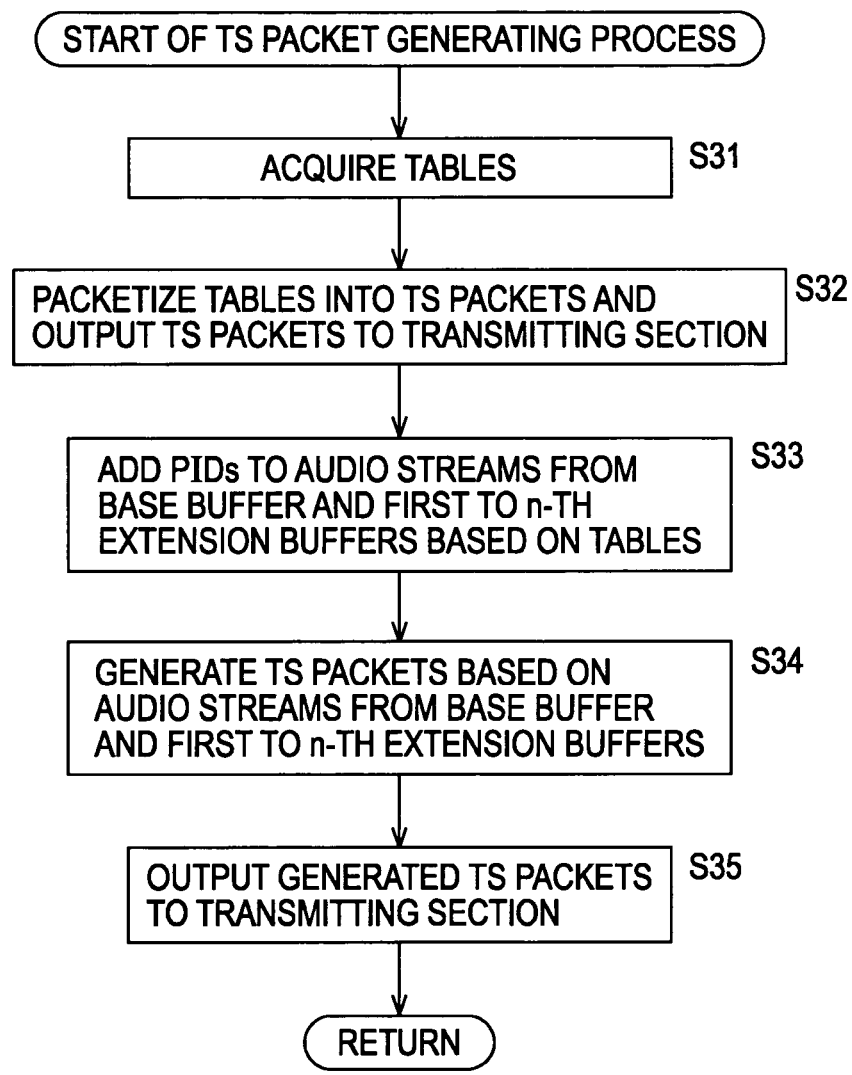
FIG. 9 is a flowchart illustrating a TS packet generating process.

By the processes in FIGS. 6 and 9, the transmitter 41 that can encode the n-th extension audio stream separates the encoded data into the base audio stream and the first to n-th extension audio streams; adds the PIDs to the audio streams based on the tables; packetizes the separated audio streams into TS packets and transmits the TS packets; and packetizes the tables into TS packets and transmits the TS packets. In other words, the audio stream including the plural TS packets having the PIDs identifying the types of streams and the TS packets of the tables is transmitted to the receiver 42.

The stream transmitted by the transmitter 41 includes the TS packets forming the base audio stream, the TS packets forming the first to n-th extension audio streams, and the TS packets of the tables in which information is written for associating the PIDs that respectively identify these TS packets with the base audio stream and the first to n-th extension audio streams. Since the PIDs that identify the types of audio streams are added to the TS packets forming the base audio stream and the TS packets forming the first to n-th extension audio streams, the receiving side can perform decoding in accordance with its processing capacity. The receiver 42 at the receiving side is described below.

FIG. 10 is a block diagram showing an example of the configuration of the receiver 42 in FIG. 2.

The receiver 42 includes a receiving section 121, an audio-stream processing section 122, and an output section 123. The receiving section 121 receives the TS packets, and the audio-stream processing section 122 performs processing concerning an audio stream. Specifically, the audio-stream processing section 122 extracts an audio stream by, for example, decoding the received TS packets. The output section 123 outputs the audio stream processed by the audio-stream processing section 122.

The audio-stream processing section 122 extracts a different audio stream depending on its decoding capability. The audio-stream processing section 122 is described below.

Figure 11:
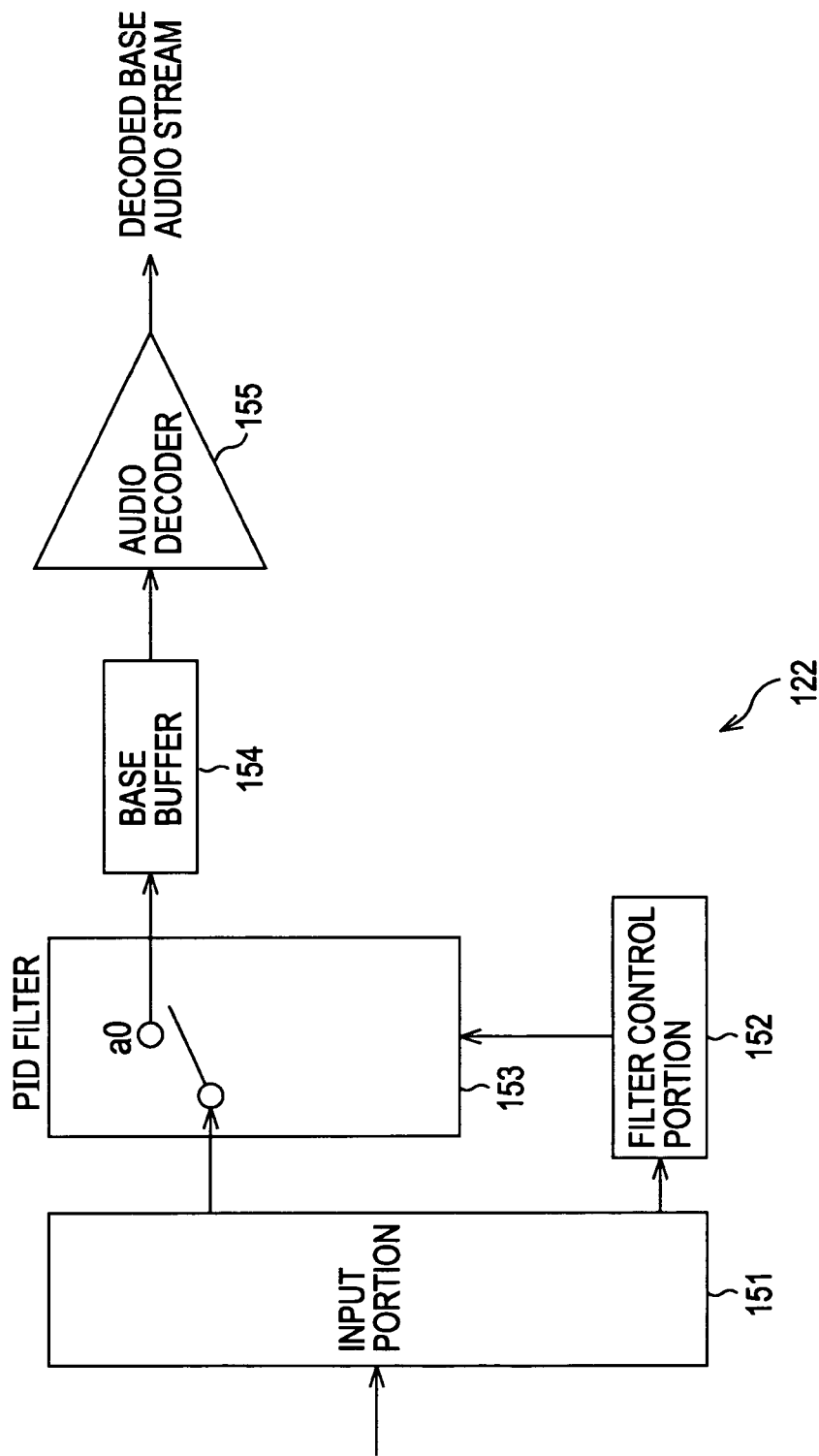
FIG. 11 is an illustration of an example of the configuration of an audio-stream processing section that can decode only the base audio stream.

FIG. 11 is a diagram showing an example of the configuration of the audio-stream processing section 122 including an audio decoder that can decode only the base audio stream.

The audio-stream processing section 122 in FIG. 11 includes an input portion 151, a filter control portion 152, a PID filter 153, a base buffer 154, and an audio decoder 155.

The input portion 151 receives input of TS packets of an audio stream supplied by the receiving section 121 in FIG. 10. The input portion 151 supplies, among the TS packets of the audio stream, the TS packets of the tables (tables illustrated in FIGS. 7 and 8) to the filter control portion 152, and the remaining TS packets (e.g., the TS packets of the base audio stream and the TS packets of the first to n-th extension audio streams having the PIDs in FIG. 5) to the PID filter 153. When, for example, TS packets of a video stream and of an audio stream are received by the receiving section 121, the input portion 151 acquires only the TS packets of the audio stream.

The filter control portion 152 controls the operation of the PID filter 153 based on the acquired tables. Specifically, the filter control portion 152 remembers the type(s) of stream(s) that it can process, and the filter control portion 152 determines the type(s) of stream(s) that it can process based on the tables. The filter control portion 152 refers in the tables to the PID(s) of the stream(s) that it can process and controls the PID filter 153 so as to select the TS packets having the PID(s) associated with the stream(s) that it can process. For example, the filter control portion 152 informs the PID filter 153 of the value(s) of the PID(s) associated with the type(s) of decodable stream(s) as the value(s) of the PID(s) to be selected.

Under the control of the filter control portion 152, the PID filter 153 selects (extracts) the TS packets. Specifically, the PID filter 153 selects, based on the PID(s) reported by the filter control portion 152, the TS packets having the same PID(s) and supplies the TS packets to the corresponding buffers. Each buffer stores (buffers) the TS packets selected by the PID filter 153. The audio decoder 155 acquires the TS packets stored in each buffer and decodes these TS packets.

In the example of FIG. 11, the audio-stream processing section 122 has only the audio decoder 155 corresponding to the base audio stream and is incapable of decoding the first to n-th extension audio streams. In this case, the filter control portion 152 remembers that the type of stream that it can process is only the base audio stream, and the filter control portion 152 refers in the tables to the PID corresponding to the base audio stream. In this case, the audio-stream processing section 122 determines that BASE_PID is the type of stream that it can process and refers in the tables to PID=a0. The filter control portion 152 controls the PID filter 153 so as to select the TS packets having the PID of the decodable stream. For example, the filter control portion 152 informs the PID filter 153 of the ID of the decodable stream or the value of the PID to be passed through. Based on the PID, namely, PID=a0, reported by the filter control portion 152, the PID filter 153 selects the TS packets having PID=a0 and supplies the TS packets to the base buffer 154. When the TS packets of the first to n-th extension audio streams are supplied, the PID filter 153 does not select these packets. In other words, when only the TS packets of the base audio stream having PID=a0 are supplied, the PID filter 153 selects the TS packets and supplies the TS packets to the base buffer 154 at a subsequent stage.

The base buffer 154 stores the TS packets of the base audio stream, which are selected and supplied by the PID filter 153. The base buffer 154 operates to allow synchronization of the TS packets at the receiving side and synchronization with the audio decoder 155. Although only one base buffer 154 is provided in the example of FIG. 11, two buffers may be provided in serial to serve as the base buffer 154, including a buffer for allowing synchronization of the TS packets at the receiving side and a buffer for allowing synchronization with the audio decoder 155. The audio decoder 155 decodes the TS packets of the base audio stream and outputs the decoded base audio stream.

Next, a TS packet receiving process executed by the receiver 42 in FIG. 10 is described with reference to the flowchart of FIG. 12. This process is initiated when an instruction to receive the TS packets is given to the receiver 42.

In step S51, the receiving section 121 of the receiver 42 receives TS packets (a stream including a plurality of TS packets). These TS packets are, for example, the TS packets transmitted by the transmitter 41 in step S19 of FIG. 6.

In step S52, the receiving section 121 extracts the TS packets of the audio stream and supplies the TS packets to the audio-stream processing section 122. For example, when the TS packets received by the receiving section 121 include TS packets of a video stream, the receiving section 121 extracts only the TS packets of the audio stream and supplies the TS packets to the audio-stream processing section 122.

In step S53, the audio-stream processing section 122 performs an audio stream processing process for decoding the TS packets of the audio stream (the audio stream including the plural TS packets) in accordance with the decoding capability of the audio-stream processing section 122. The details of the process are described with reference to FIG. 13. The audio stream processed by the audio-stream processing section 122 is supplied to the output section 123.

In step S54, the output section 123 outputs the decoded audio stream to, for example, a speaker, which is not shown. After that, the process is finished.

Figure 12:
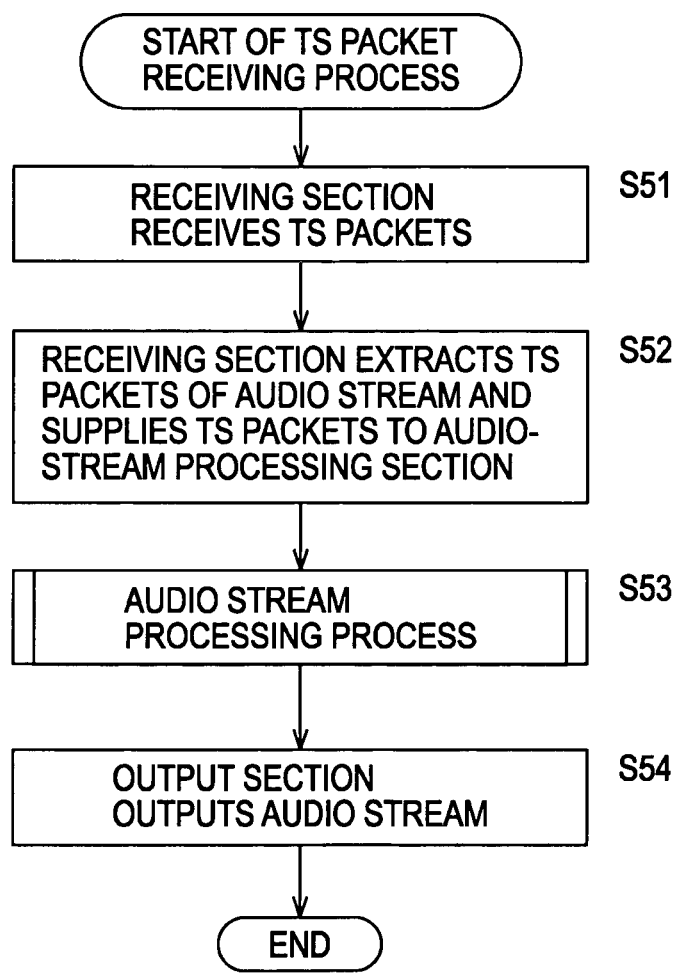
FIG. 12 is a flowchart showing a TS packet receiving process executed by the receiver in FIG. 10.

By the process in FIG. 12, the TS packets are received, and the TS packets of the audio stream are processed (decoded) and output.

Figure 13:
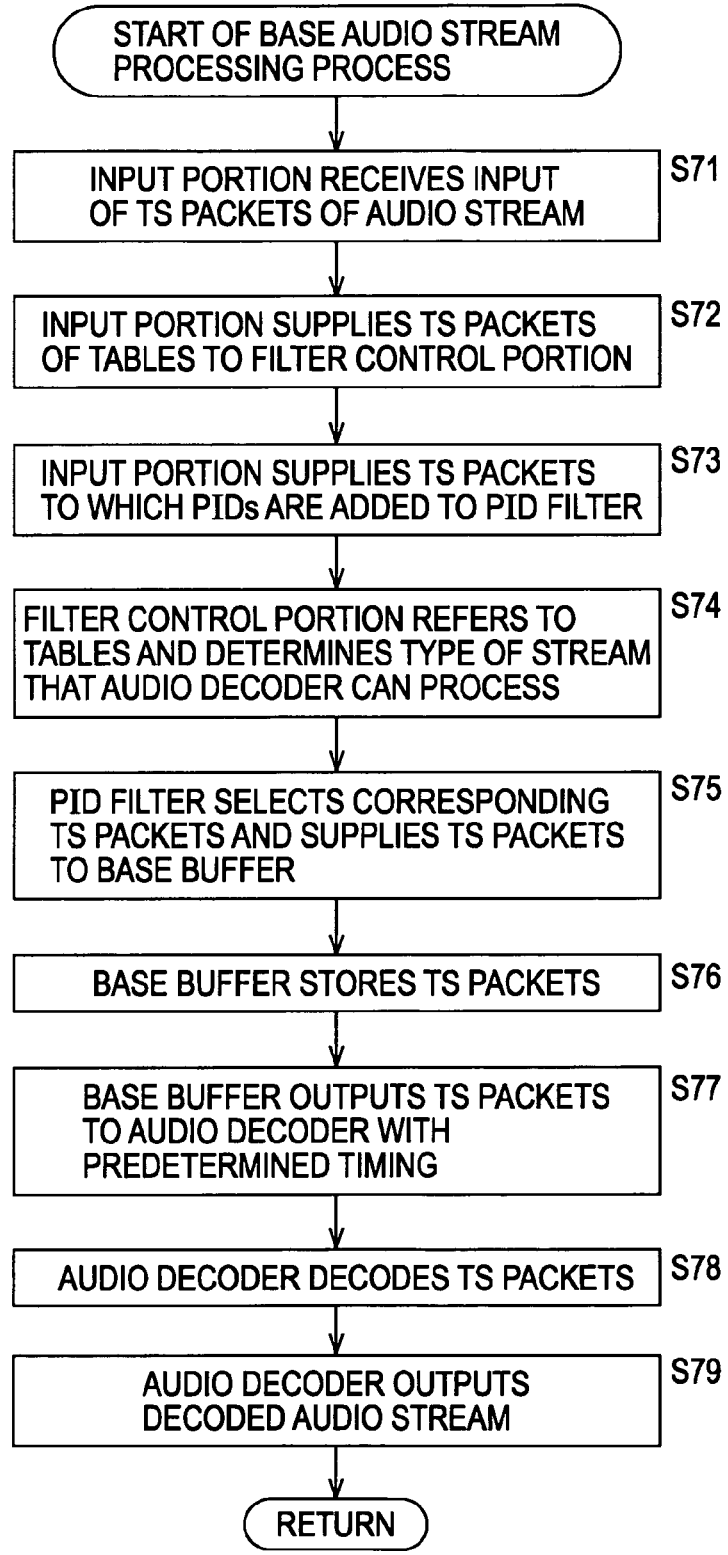
FIG. 13 is a flowchart showing an audio stream processing process executed by the audio-stream processing section in FIG. 11.

Next, a base audio stream processing process, which is an example of step S53 of FIG. 12, is described with reference to the flowchart of FIG. 13. This process is a process executed by the audio-stream processing section 122 in FIG. 11. Specifically, this process is a process executed by the audio-stream processing section 122 that can decode only the base audio stream.

In step S71, the input portion 151 receives input of the TS packets of the audio stream (the audio stream including the plural TS packets). The TS packets of the audio stream correspond to the audio stream including the TS packets of the tables, the TS packets of the base audio stream, and the TS packets of the first to n-th extension audio streams, which are transmitted by the transmitter 41 in step S19 of FIG. 6 described above.

In step S72, the input portion 151 supplies the TS packets of the tables to the filter control portion 152. Specifically, since the TS packets of the audio stream include the TS packets of the tables, the TS packets of the base audio stream, and the TS packets of the first to n-th extension audio streams, the input portion 151 supplies, among these TS packets, the TS packets of the tables to the filter control portion 152.

In step S73, the input portion 151 supplies the TS packets to which the PIDs are added to the PID filter 153. Specifically, in FIG. 5, the input portion 151 supplies the TS packets of the base audio stream and the TS packets of the first to n-th extension audio streams to which the PIDs are added to the PID filter 153.

In step S74, the filter control portion 152 refers to the tables and determines the type(s) of stream(s) that the audio decoder 155 can process. Specifically, the filter control portion 152 remembers that the type of stream that it can process is the base audio stream and determines, based on the tables, the type of stream that it can process. The filter control portion 152 refers in the tables to the PID of the stream that it can process and controls the PID filter 153 so as to select the TS packets having PID=a0 associated with the base stream that it can process.

In step S75, under the control of the filter control portion 152 (based on the determination), the PID filter 153 selects the corresponding TS packets and supplies the TS packets to the base buffer 154. Specifically, under the control of the filter control portion 152, the PID filter 153 selects the TS packets having PID=a0, i.e., the TS packets of the base audio stream, and supplies the TS packets to the base buffer 154.

In step S76, the base buffer 154 stores the supplied TS packets. The TS packets stored here are the TS packets of the base audio stream.

In step S77, the base buffer 154 outputs the TS packets to the audio decoder 155 with predetermined timing.

In step S78, the audio decoder 155 decodes the supplied TS packets of the base audio stream and, in step S79, outputs the decoded audio stream.

Since the PIDs are added to the TS packets and the relationships between the PIDs and the types of TS packets (TS packets of the base audio stream and the first to n-th extension audio streams) are written in the tables, even the audio-stream processing section 122 (the receiver 42) that can decode only the base audio stream, such as that shown in FIG. 11, can select and decode only the TS packets corresponding to the base audio stream. That is, even when the audio stream extended to a plurality of levels is transmitted, the receiver 42 having the audio-stream processing section 122 in FIG. 11 can extract only the base audio stream and plays back the base audio stream.

Next, the audio-stream processing section 122 having an audio decoder that can decode the base audio stream and the first extension audio stream is described with reference to FIG. 14.

Figure 14:
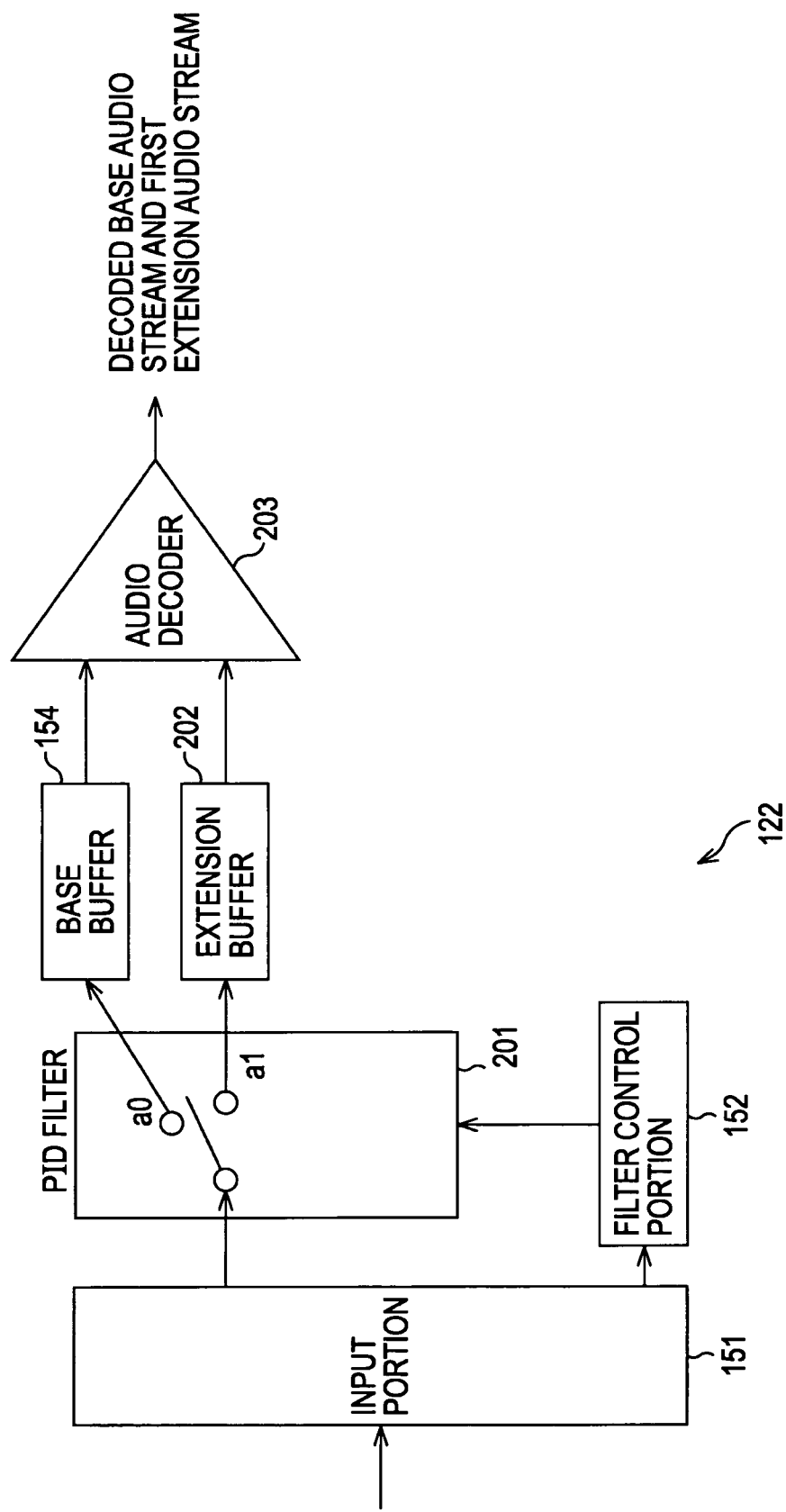
FIG. 14 is an illustration of an example of the configuration of an audio-stream processing section that can decode the base audio stream and the first extension audio stream.

FIG. 14 is a diagram showing an example of the configuration of the audio-stream processing section 122 including an audio decoder that can decode the base audio stream and the first extension audio stream. In this diagram, portions corresponding to those in FIG. 11 are referred to using the same reference numerals, and descriptions thereof are omitted to avoid repetition.

The audio-stream processing section 122 in FIG. 14 includes, in addition to the audio-stream processing section 122 in FIG. 11, a first extension buffer 202. An audio decoder 203 can decode not only the base audio stream but also the first extension audio stream. The PID filter 153 can extract not only the base audio stream but also the first extension audio stream.

The audio-stream processing section 122 in FIG. 14 includes the input portion 151, the filter control portion 152, a PID filter 201, the base buffer 154, the first extension buffer 202, and the audio decoder 203.

The filter control portion 152 controls the operation of the PID filter 201 based on the tables. Specifically, the filter control portion 152 remembers the types of streams that it can process and determines, based on the tables, the types of streams that it can process. The filter control portion 152 refers in the tables to the PIDs of the streams that it can process and controls the PID filter 201 so as to select the TS packets having the PIDs associated with the streams that it can process. In the example of FIG. 14, the filter control portion 152 controls the PID filter 201 so as to supply the TS packets having PID=a0 to the base buffer 154 and the TS packets having PID=a1 to the first extension buffer 202. Under the control of the filter control portion 152, the PID filter 201 extracts the TS packets. In other words, the PID filter 201 selects the TS packets having PID=a0 and supplies the TS packets to the base buffer 154 and selects the TS packets having PID=a1 and supplies the TS packets to the first extension buffer 202.

The base buffer 154 stores (buffers) the TS packets of the base audio stream, which are extracted by the PID filter 201, and the first extension buffer 202 stores the TS packets of the first extension audio stream, which are extracted by the PID filter 201. The audio decoder 203 acquires the TS packets stored in the base buffer 154 and the first extension buffer 202 and decodes the TS packets.

In the example of FIG. 14, the audio-stream processing section 122 has the audio decoder 203 corresponding to the base audio stream and the first extension audio stream and is incapable of decoding the second to n-th extension audio streams. In this case, under the control of the filter control portion 152 (determination by the filter control portion 152), the PID filter 201 extracts the TS packets with PID=a0 and the TS packets with PID=a1. In other words, when the TS packets of the second to n-th extension audio streams are supplied, the PID filter 201 does not select these packets. When the TS packets of the base audio stream having PID=a0 are supplied, the PID filter 201 selects the packets and supplies the packets to the base buffer 154 at a subsequent stage. When the TS packets of the first extension audio stream having PID=a1 are supplied, the PID filter 201 selects the packets and supplies the packets to the first extension buffer 202 at a subsequent stage.

The base buffer 154 stores the TS packets of the base audio stream (PID=a0), which are selected and supplied by the PID filter 201. The base buffer 154 operates to allow synchronization of the TS packets at the receiving side and synchronization with the audio decoder 203. The first extension buffer 202 stores the TS packets of the first extension audio stream (PID=a1), which are selected and supplied by the PID filter 201. The first extension buffer 202 operates to allow synchronization of the TS packets at the receiving side and synchronization with the audio decoder 203. Although one base buffer 154 and one extension buffer 202 are provided in the example of FIG. 14, two buffers may be provided in serial to serve as each buffer, including a buffer for allowing synchronization of the TS packets at the receiving side and a buffer for allowing synchronization with the audio decoder 203. The audio decoder 203 decodes the TS packets of the base audio stream and the TS packets of the first extension audio stream and outputs the decoded base audio stream and the decoded first extension audio stream.

As described above, the receiver 42 (the audio-stream processing section 122 in FIG. 14) capable of decoding the base audio stream and the first extension audio stream can separate and play back only the base audio stream and the first extension audio stream.

Next, the audio-stream processing section 122 having an audio decoder that can decode the base audio stream and the first and second extension audio streams is described with reference to FIG. 15.

Figure 15:
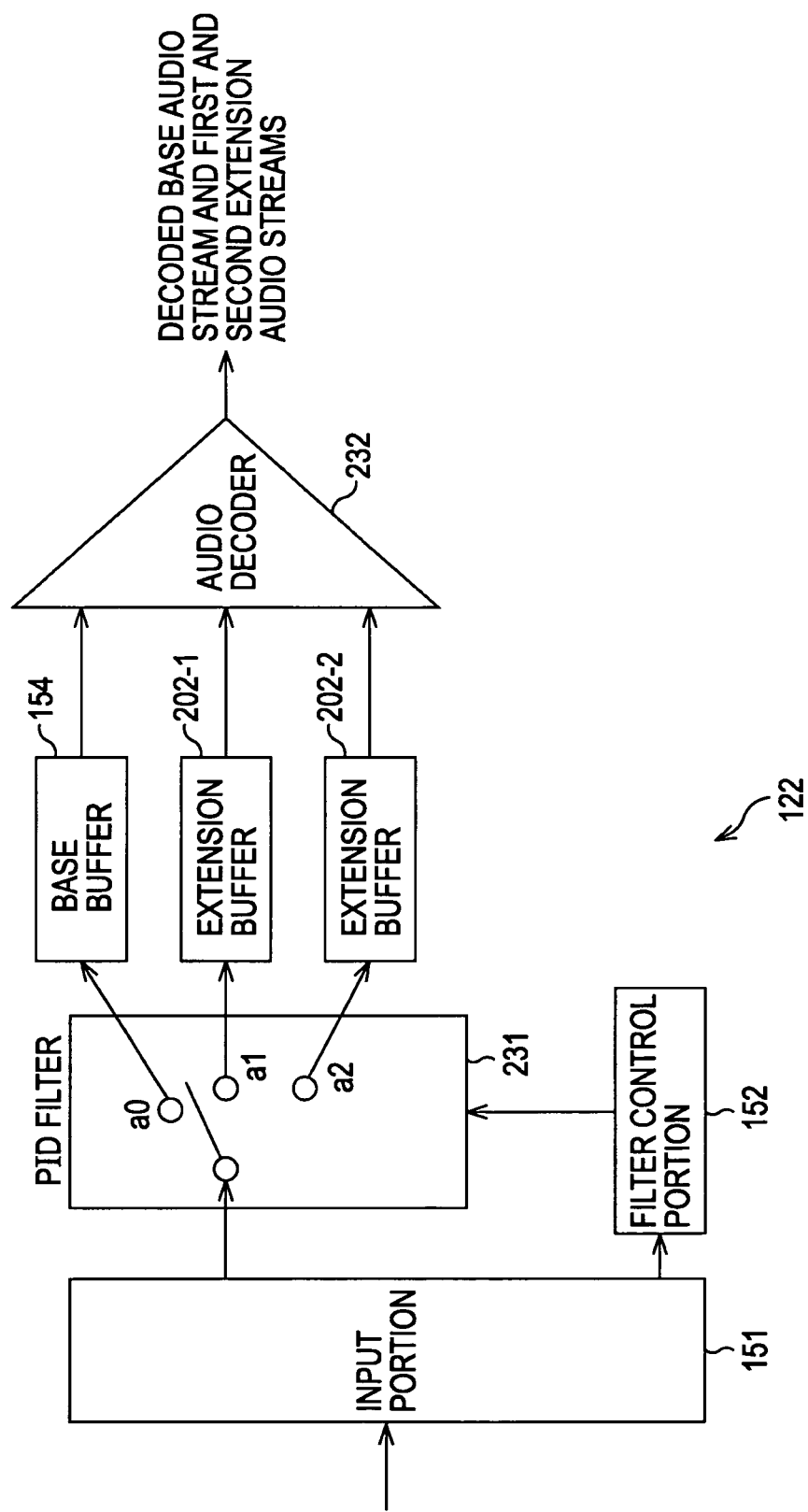
FIG. 15 is an illustration of an example of the configuration of an audio-stream processing section that can decode the base audio stream and the first and second extension audio streams.

FIG. 15 is a diagram showing an example of the configuration of the audio-stream processing section 122 including an audio decoder that can decode the base audio stream and the first and second extension audio streams. In this diagram, portions corresponding to those in FIGS. 11 and 14 are referred to using the same reference numerals, and descriptions thereof are omitted to avoid repetition.

The audio-stream processing section 122 in FIG. 15 includes a first extension buffer 202-1 serving as the first extension buffer 202 in FIG. 14 and additionally includes a second extension buffer 202-2. An audio decoder 232 can decode not only the base audio stream and the first extension audio stream but also the second extension audio stream. A PID filter 231 can extract the base audio stream and the first and second extension audio streams.

The audio-stream processing section 122 in FIG. 15 includes the input portion 151, the filter control portion 152, the PID filter 231, the base buffer 154, the first extension buffer 202-1, the second extension buffer 202-2, and the audio decoder 232.

The filter control portion 152 remembers the types of streams that it can process and determines, based on the tables, the types of streams that it can process. The filter control portion 152 refers in the tables to the PIDs of the streams that it can process and controls the PID filter 201 so as to select the TS packets having the PIDs associated with the streams that it can process. In the example of FIG. 15, the filter control portion 152 controls the PID filter 231 so as to supply the TS packets having PID=a0 to the base buffer 154, the TS packets having PID=a1 to the first extension buffer 202, and the TS packets having PID=a2 to the second extension buffer 202-2. Under the control of the filter control portion 152, the PID filter 231 extracts the TS packets. In other words, the PID filter 231 selects the TS packets having PID=a0 and supplies the TS packets to the base buffer 154, selects the TS packets having PID=a1 and supplies the TS packets to the first extension buffer 202-1, and selects the TS packets having PID=a2 and supplies the TS packets to the second extension buffer 202-2.

The second extension buffer 202-2 stores the TS packets of the second extension audio stream, which are selected by the PID filter 231. The audio decoder 232 acquires the TS packets stored in the base buffer 154 and the first and second extension buffers 202-1 and 202-2 and decodes the TS packets.

In the example of FIG. 15, the audio-stream processing section 122 has the audio decoder 232 corresponding to the base audio stream and the first and second extension audio streams and is incapable of decoding the third to n-th extension audio streams. In this case, under the control of the filter control portion 152, the PID filter 231 extracts (selects) the TS packets with PID=a0, the TS packets with PID=a1, and the TS packets with PID=a2. In other words, when the TS packets of the third to n-th extension audio streams are supplied, the PID filter 231 does not select these packets. When the TS packets of the base audio stream having PID=a0 are supplied, the PID filter 231 selects the packets and supplies the packets to the base buffer 154 at a subsequent stage. When the TS packets of the first extension audio stream having PID=a1 are supplied, the PID filter 231 selects the packets and supplies the packets to the first extension buffer 202-1 at a subsequent stage. When the TS packets of the second extension audio stream having PID=a2 are supplied, the PID filter 231 selects the packets and supplies the packets to the second extension buffer 202-2 at a subsequent stage.

The base buffer 154 stores the TS packets of the base audio stream (PID=a0), which are selected and supplied by the PID filter 231. The base buffer 154 operates to allow synchronization of the TS packets at the receiving side and synchronization with the audio decoder 232. The first extension buffer 202-1 stores the TS packets of the first extension audio stream (PID=a1), which are selected and supplied by the PID filter 231. The first extension buffer 202-1 operates to allow synchronization of the TS packets at the receiving side and synchronization with the audio decoder 232. The second extension buffer 202-2 stores the TS packets of the second extension audio stream (PID=a2), which are selected and supplied by the PID filter 231. The second extension buffer 202-2 operates to allow synchronization of the TS packets at the receiving side and synchronization with the audio decoder 232.

Although one base buffer 154, one extension buffer 202-1, and one extension buffer 202-2 are provided in the example of FIG. 15, two buffers may be provided in serial to serve as each buffer, including a buffer for allowing synchronization of the TS packets at the receiving side and a buffer for allowing synchronization with the audio decoder 232. The audio decoder 232 decodes the TS packets of the base audio stream and the TS packets of the first and second extension audio streams and outputs the decoded base audio stream and the decoded first and second extension audio streams.

As described above, the receiver 42 (the audio-stream processing section 122 in FIG. 15) capable of decoding the base audio stream and the first and second extension audio streams can separate and play back the base audio stream and the first and second extension audio streams.

Next, the audio-stream processing section 122 having an audio decoder that can decode the base audio stream and the first to n-th extension audio streams is described with reference to FIG. 16.

Figure 16:
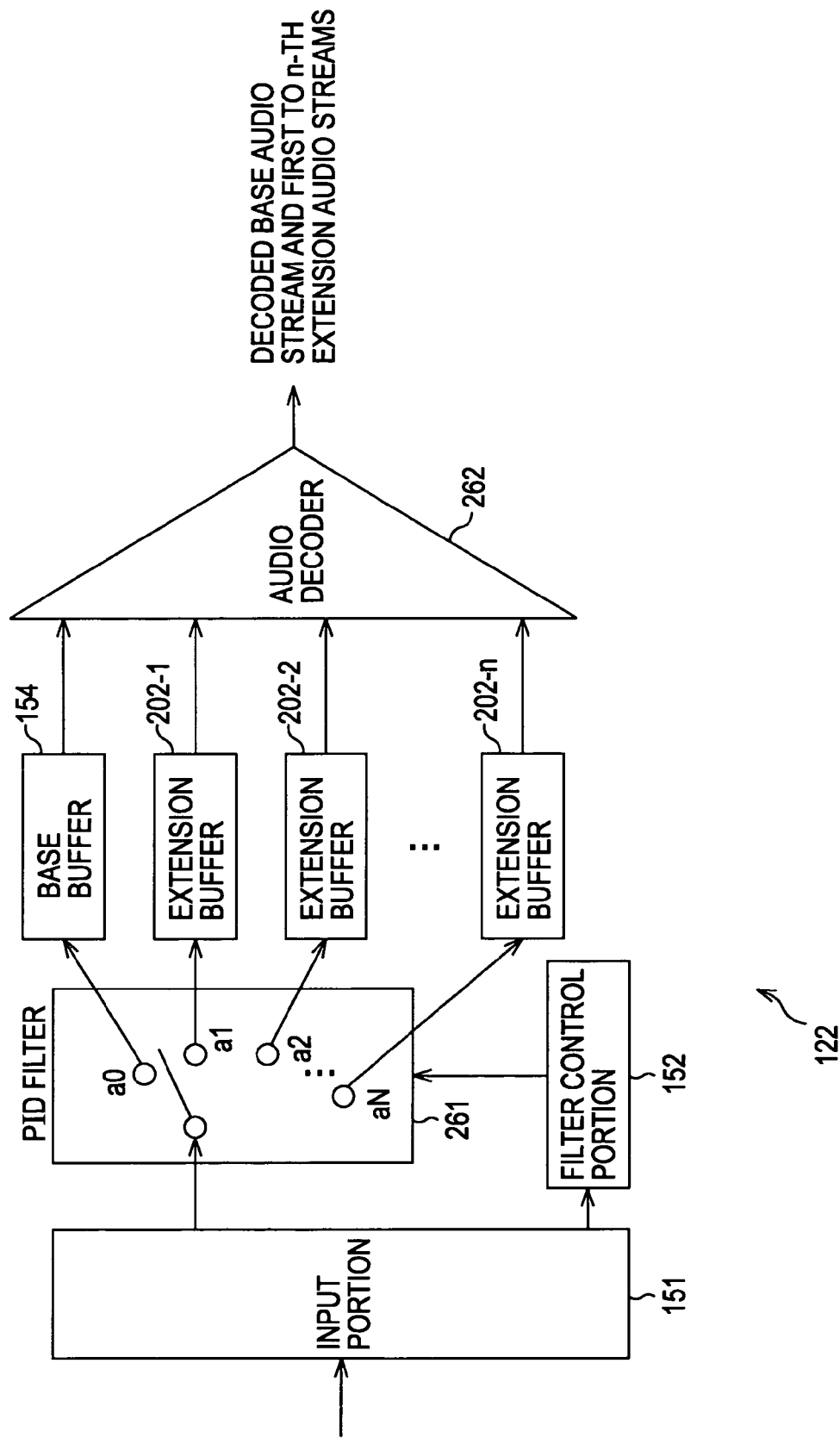
FIG. 16 is an illustration of an example of the configuration of an audio-stream processing section that can decode the base audio stream and the first to n-th extension audio streams.

FIG. 16 is a diagram showing an example of the configuration of the audio-stream processing section 122 including an audio decoder that can decode the base audio stream and the first to n-th extension audio streams. In this diagram, portions corresponding to those in FIG. 15 are referred to using the same reference numerals, and descriptions thereof are omitted to avoid repetition.

The audio-stream processing section 122 in FIG. 16 includes, in addition to FIG. 15, third to n-th extension buffers 202-3 to 203-*n*. An audio decoder 262 can decode not only the base audio stream and the first and second extension audio streams but also the third to n-th extension audio streams. A PID filter 261 can extract the base audio stream and even the first to n-th extension audio streams.

The audio-stream processing section 122 in FIG. 16 includes the input portion 151, the filter control portion 152, the PID filter 261, the base buffer 154, the first to n-th extension buffers 202-1 to 202-*n*, and the audio decoder 262.

The filter control portion 152 remembers that the base audio stream and the first to n-th extension audio streams are the types of streams that it can process. Based on the tables, the filter control portion 152 determines the types of streams that it can process. The filter control portion 152 refers in the tables to the PIDs of the streams that it can process and controls the PID filter 261 so as to select the TS packets having the PIDs associated with the streams that it can process. In the example of FIG. 16, the filter control portion 152 controls the PID filter 261 so as to supply the TS packets having PID=a0 to the base buffer 154, the TS packets having PID=a1 to the first extension buffer 202-1, the TS packets having PID=a2 to the second extension buffer 202-2, and similarly the TS packets having PID=aN to the n-th extension buffer 202-*n*. Under the control of the filter control portion 152, the PID filter 261 extracts the TS packets. In other words, the PID filter 261 selects the TS packets having PID=a0 and supplies the TS packets to the base buffer 154; selects the TS packets having PID=a1 and supplies the TS packets to the first extension buffer 202-1; selects the TS packets having PID=a2 and supplies the TS packets to the second extension buffer 202-2; and similarly selects the TS packets having PID=aN and supplies the TS packets to the n-th extension buffer 202-*n*.

The third to n-th extension buffers 202-3 to 202-*n* store the corresponding TS packets of the third to n-th extension audio streams, which are extracted by the PID filter 261. The audio decoder 262 acquires the TS packets stored in the base buffer 154 and the first to n-th extension buffers 202-1 to 202-*n* and decodes the TS packets.

In the example of FIG. 16, the audio-stream processing section 122 has the audio decoder 262 corresponding to the base audio stream and the first to n-th extension audio streams, and, that is to say, is capable of decoding all the received extension audio streams up to the n-th level. In this case, under the control of the filter control portion 152, the PID filter 261 extracts the TS packets with PIDs=a0 to aN and supplies these TS packets to the corresponding buffers (the base buffer 154 and the first to n-th extension buffers 202-1 to 202-*n*).

The base buffer 154 stores the TS packets of the base audio stream (PID=a0), which are selected and supplied by the PID filter 261. The base buffer 154 operates to allow synchronization of the TS packets at the receiving side and synchronization with the audio decoder 262. The first extension buffer 202-1 stores the TS packets of the first extension audio stream (PID=a1), which are selected and supplied by the PID filter 261. The first extension buffer 202-1 operates to allow synchronization of the TS packets at the receiving side and synchronization with the audio decoder 262. The second extension buffer 202-2 stores the TS packets of the second extension audio stream (PID=a2), which are selected and supplied by the PID filter 261. The first extension buffer 202-2 operates to allow synchronization of the TS packets at the receiving side and synchronization with the audio decoder 262. Similarly the n-th extension buffer 202-*n* stores the TS packets of the n-th extension audio stream (PID=aN), which are selected and supplied by the PID filter 261. The first extension buffer 202-*n* operates to allow synchronization of the TS packets at the receiving side and synchronization with the audio decoder 262. Although each of the base buffer 154 and the first to n-th extension buffers 202-1 to 202-*n* is provided in the example of FIG. 16, two buffers may be provided in serial to serve as each buffer, including a buffer for allowing synchronization of the TS packets at the receiving side and a buffer for allowing synchronization with the audio decoder 262. The audio decoder 262 decodes the TS packets of the base audio stream and the TS packets of the first to n-th extension audio streams and outputs the decoded base audio stream and the decoded first to n-th extension audio streams.

Figure 17:
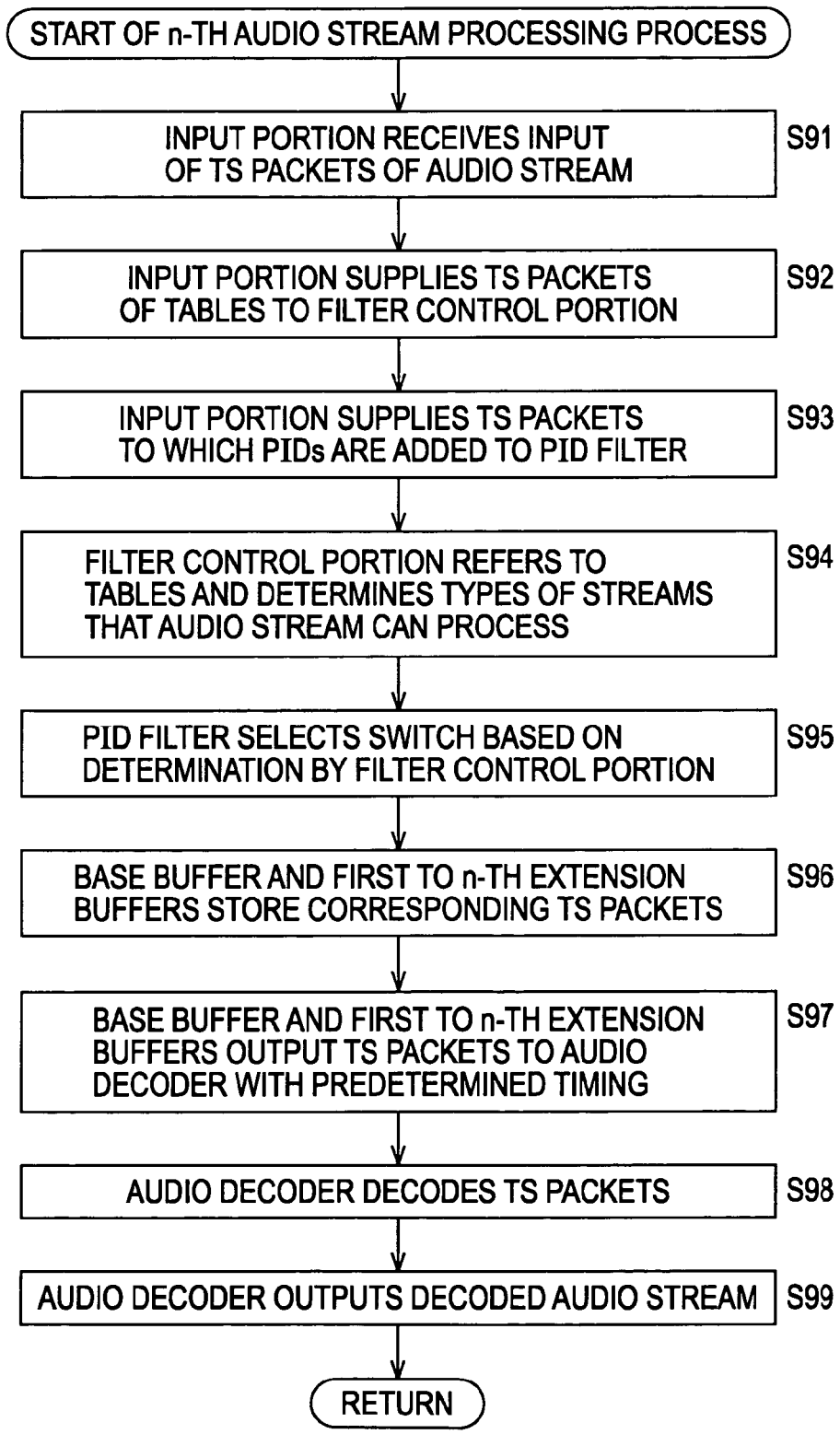
FIG. 17 is a flowchart showing an audio stream processing process executed by the audio-stream processing section in FIG. 16.

Next, an n-th audio stream processing process, which is an example of step S53 in FIG. 12, is described with reference to the flowchart of FIG. 17. This process is a process executed by the audio-stream processing section 122 in FIG. 16. Specifically, this process is a process executed by the audio-stream processing section 122 that can decode, in addition to the base audio stream, the first to n-th extension audio streams.

In step S91, the input portion 151 receives input of the TS packets of the audio stream (the audio stream including the plural TS packets). The TS packets of the audio stream correspond to the audio stream including the TS packets of the tables, the TS packets of the base audio stream, and the TS packets of the first to n-th extension audio streams, which are transmitted by the transmitter 41 in step S19 of FIG. 6 described above.

In step S92, the input portion 151 supplies the TS packets of the tables to the filter control portion 152. Specifically, since the TS packets of the audio stream include the TS packets of the tables, the TS packets of the base audio stream, and the TS packets of the first to n-th extension audio streams, the input portion 151 supplies, among these TS packets, the TS packets of the tables to the filter control portion 152.

In step S93, the input portion 151 supplies the TS packets to which the PIDs are added to the PID filter 261. Specifically, in FIG. 5, the input portion 151 supplies the TS packets of the base audio stream and the first to n-th extension audio streams to which the PIDs are added to the PID filter 261.

In step S94, the filter control portion 152 refers to the tables and determines the types of streams that the audio decoder 262 can process. Specifically, the filter control portion 152 remembers that the types of streams that it can process are the base audio stream and the first to n-th extension audio streams and determines, based on the tables, the types of streams that it can process. That is, the filter control portion 152 detects, from the tables, the base audio stream and the first to n-th extension audios streams. In other words, the filter control portion 152 refers to the tables and determines the types of streams that it can process and determines the PIDs associated with these streams as the types of streams that it can process. The filter control portion 152 controls the PID filter 261 so as to select the TS packets having PID=a0 associated with the base stream and the TS packets having PID=a1 to aN associated with the first to n-th extension audio streams.

As described above, the filter control portion 152 controls the PID filter 261 so as to supply the TS packets of the base audio stream and the TS packets of the first to n-th extension audio streams to the base buffer 154 and the first to n-th extension buffers 202-1 to 202-*n*, respectively. Since in the process in FIG. 17 the audio decoder 262 is capable of decoding the base audio stream and the first to n-th extension audio streams, the filter control portion 152 controls the PID filter 261 so as to supply the TS packets having PID=a0, a1, a2, . . . , aN to the corresponding buffers.

In step S95, based on the determination by the filter control portion 152 (the types of streams determined to be processable), the PID filter 261 selects a switch and supplies the corresponding TS packets to the buffers at a subsequent stage. Specifically, the PID filter 261 uses the switch to select the TS packets having PID=a0, namely, the TS packets of the base audio stream, and supplies the TS packets to the base buffer 154 at a subsequent stage. In addition, the PID filter 261 uses the switch to select the TS packets having PID=a1 to aN, namely, the TS packets of the first to n-th extension audio streams and supplies these TS packets to the corresponding first to n-th extension buffers 202-1 to 202-n at a subsequent stage.

In step S96, the base buffer 154 and the first to n-th extension buffers 202-1 to 202-n store the supplied TS packets, respectively.

In step S97, the base buffer 154 and the first to n-th extension buffers 202-1 to 202-n output the TS packets to the audio decoder 262 with predetermined timing.

In step S98, the audio decoder 262 decodes the supplied TS packets of the base audio stream and, in step S99, outputs the decoded audio stream.

As described above, the received stream includes the TS packets forming the base audio stream, the TS packets forming the first to n-th extension audio streams, and the TS packets of the tables in which information is written for associating the PIDs that respectively identify these TS packets with the base audio stream and the first to n-th extension audio streams. Since the PIDs that identify the types of audio streams are added to the TS packets forming the base audio stream and the TS packets forming the first to n-th extension audio streams, the audio-stream processing section 122 (the receiver 42) capable of decoding the base audio stream and the first to n-th extension audio streams, such as that shown in FIG. 17, can perform decoding.

The receiver 42 capable of decoding the base audio stream and the first to m-th extension audio streams (m represents a natural number greater than or equal to one and less than or equal to n) can separate and play back the base audio stream and the first to m-th extension audio streams.

Figure 18:
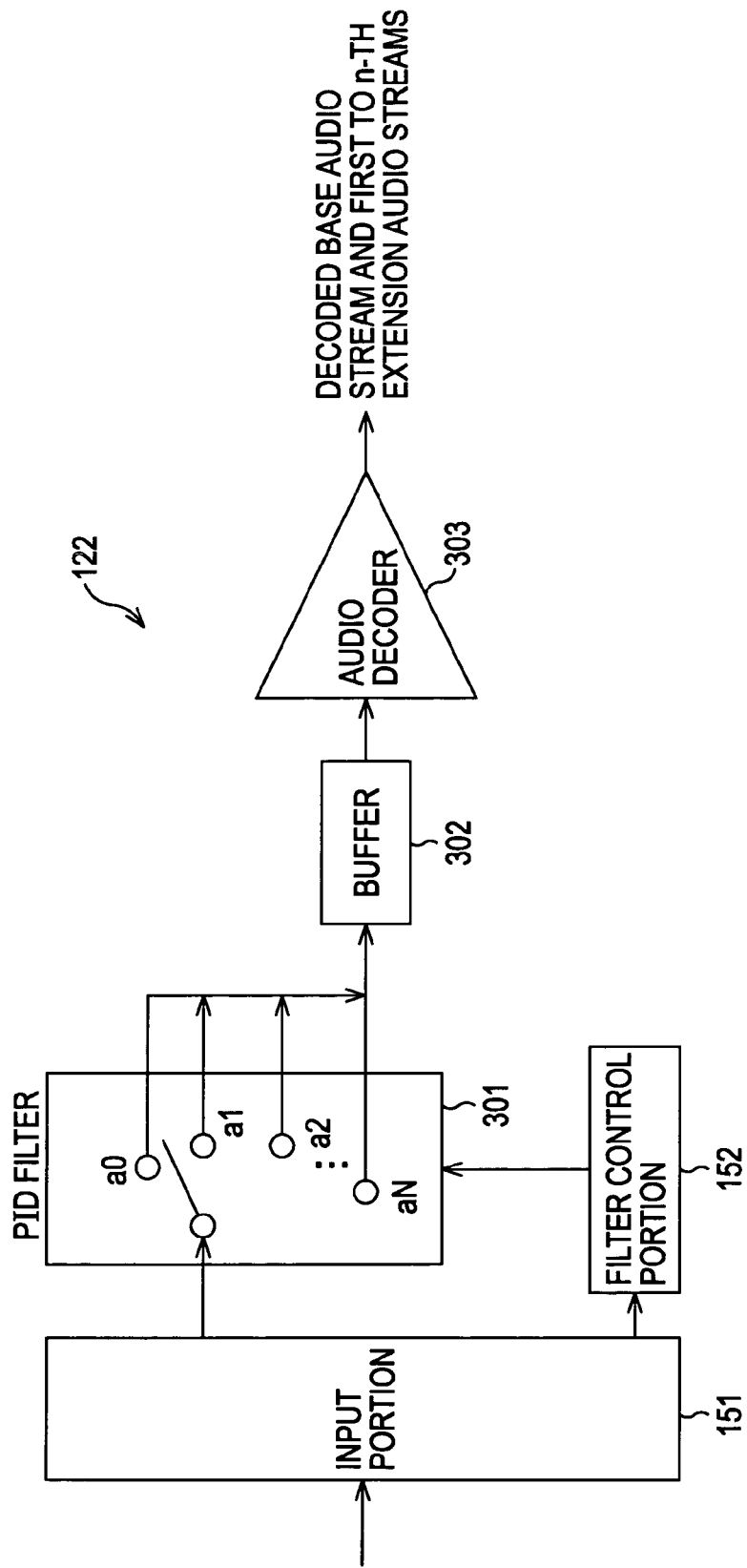
FIG. 18 is an illustration of an example of the configuration of the audio-stream processing section that can decode the base audio stream and the first to n-th extension audio streams.
Figure 19:
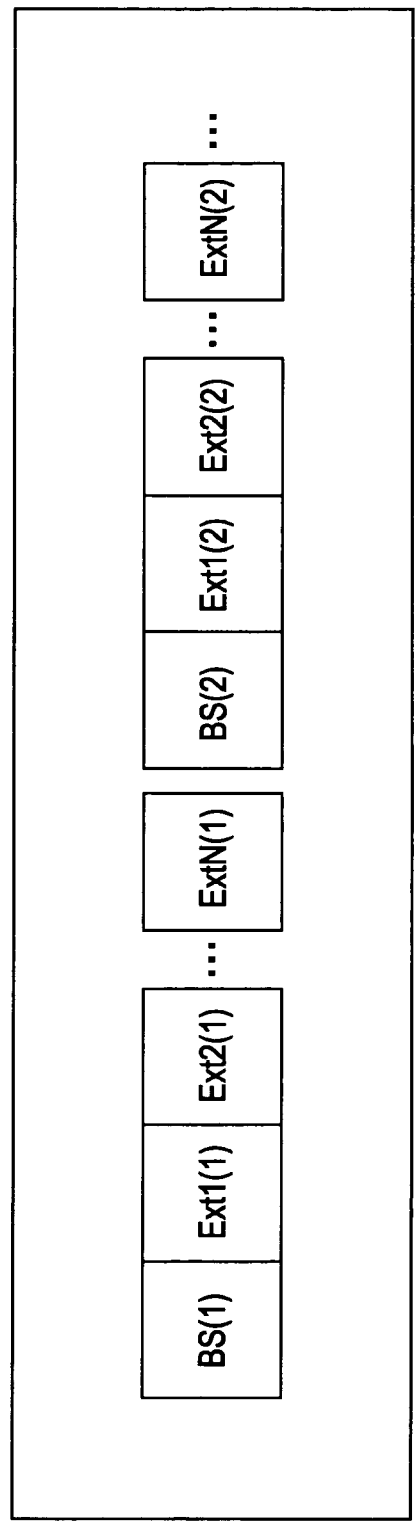
FIG. 19 is an illustration of the order of TS packets.

Next, another example of the configuration of the receiver 42 including the audio-stream processing section 122 capable of decoding the base audio stream and the first to n-th extension audio streams is described. FIG. 18 is a diagram showing an example of the configuration of the audio-stream processing section 122 decoding the base audio stream and the first to n-th extension audio streams.

The audio-stream processing section 122 in FIG. 18 is limited in the TS multiplexing. Specifically, it is necessary that, in a TS, encoding units to be synchronously played back be encoded in sequence in the order of the base audio stream and the first to n-th extension audio streams. That is, in a TS, encoding units need to be encoded in sequence in the order of BS(1), Ext1(1), Ext2(1), . . . ExtN(1), BS(2), Ext2(2), . . . ExtN(2). In other words, the TS packets received by the receiving section 121 of the receiver 42 are input to the input portion 151 in the order of BS(1), Ext1(1), Ext2(1), . . . ExtN(1), BS(2), Ext2(2), . . . ExtN(2), and the input portion 151 supplies the TS packets in the order of BS(1), Ext1(1), Ext2(1), . . . ExtN(1), BS(2), Ext2(2), . . . ExtN(2) to a PID filter 301. Namely, the TS packets forming the base audio stream and the TS packets forming the first to n-th extension audio streams, which are included in the entirety of a stream, are arranged in such a manner that the TS packets to be played back at the same time are arranged in sequence in the order of the TS packets forming the base audio stream and the first to n-th extension audio streams (the transmitter 41 at the encoding side outputs the TS packets in this order).

Figure 37:
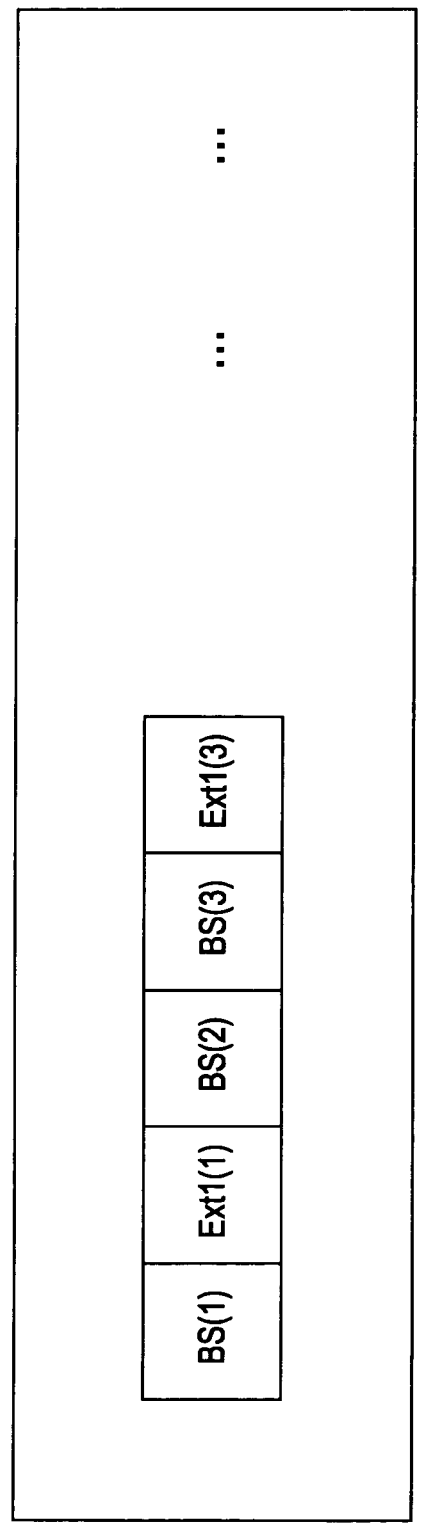
FIG. 37 is an illustration of another example of the configuration of TS packets.

It is not necessarily the case that synchronization units of the extension audio streams corresponding to synchronization units of the base audio stream are present. For example, in the case where the entirety of a stream includes the base audio stream and the first extension audio stream, when all the synchronization units of the extension audio stream corresponding to the synchronization units of the base audio stream are present, the TS packets are arranged in the order of BS(1), Ext1(1), BS(2), Ext1(2), BS(3), Ext(3), . . . However, for example, when Ext1(2) corresponding to BS(2) is not present, as shown in FIG. 37, the TS packets are arranged in the order of BS(1), Ext1(1), BS(2), BS(3), Ext1(3), . . . .

That is, the audio stream at least includes the TS packets forming the base audio stream and further includes the TS packets of the first to n-th extension audio streams corresponding to the synchronization units of the base audio stream, in which the number of the TS packets of the first to n-th extension audio streams is variable. In other words, one audio stream at least includes the base audio stream and may include the first to n-th extension audio streams. When any of the synchronization units (predetermined units to be played back at the same time) of the first to n-th extension audio streams corresponding to the synchronization units of the base audio stream are present, among the first to n-th extension audio streams, the extension stream having the present synchronization units is encoded. As a result, the base audio stream is included in the entire audio stream, whereas the number of TS packets forming the extension audio streams is variable (only the TS packets corresponding to the first extension audio stream may be included, or the TS packets corresponding to the first to third extension audio streams may be included).

Such an encoding method is employed in audio-stream encoding using variable bit rate when, in a portion (time interval) where the amount of information of the original audio signal is small, information in the base audio stream is sufficient and information in the extension stream(s) is unnecessary. The bit rate of a time interval where no extension stream information is present is reduced.

The audio-stream processing section 122 in FIG. 18 includes the input portion 151, the filter control portion 152, the PID filter 301, a buffer 302, and an audio decoder 303.

The filter control portion 152 controls the PID filter 301 so as to supply the TS packets having PID=a0 to aN to the buffer 302. Under the control of the filter control portion 152, the PID filter 301 extracts the TS packets. In other words, the PID filter 301 sequentially supplies the TS packets having PID=a0 to aN to the buffer 302. Since the TS packets in the TS are encoded in sequence in the order of BS(1), Ext1(1), Ext2 (1), . . . ExtN(1), BS(2), Ext2(2), . . . ExtN(2), the PID filter 301 supplies the TS packets in the TS in the order of BS(1), Ext1(1), Ext2(1), . . . ExtN(1), BS(2), Ext2(2), . . . ExtN(2) to the buffer 302.

The buffer 302 stores the TS packets supplied in sequence in the order of BS(1), Ext1(1), Ext2(1), . . . ExtN(1), BS(2), Ext2(2), . . . ExtN(2). The audio decoder 303 acquires the TS packets stored in the buffer 302 and decodes the TS packets.

In the example of FIG. 18, the audio-stream processing section 122 has the audio decoder 303 corresponding to the base audio stream and the first to n-th extension audio streams and thus is capable of decoding all of the received base audio stream and the first to n-th extension audio streams. In this case, under the control of the filter control portion 152, the PID filter 301 extracts the TS packets with PID=a0 to aN and supplies these TS packets to the buffer 302.

The buffer 302 stores the TS packets of the audio stream (PID=a0 to aN), which are sequentially selected and supplied by the PID filter 301. The buffer 302 operates to allow synchronization of the TS packets at the receiving side and synchronization with the audio decoder 303. Although one buffer 302 is provided in the example of FIG. 18, two buffers may be provided in serial to serve as the buffer 302, including a buffer for allowing synchronization of the TS packets at the receiving side and a buffer for allowing synchronization with the audio decoder 303. The audio decoder 303 sequentially decodes the TS packets of the base audio stream and the TS packets of the first to n-th extension audio streams and outputs the decoded base audio stream and the decoded first to n-th extension audio streams.

According to FIG. 18, the number of buffers is reduced compared with that in FIG. 16, thereby achieving lower cost. Although the number of buffers in FIG. 16 is greater than that in FIG. 18, it is advantageous in that the order of encoding TS packets is not limited.

According to the first embodiment, in the case where a multiplexed audio stream including the base audio stream and extension audio streams at a plurality of levels is played back, there is provided a multiplexed stream encoding and decoding method for the receiver 42 capable of decoding only the base audio stream (e.g., the receiver 42 having the audio-stream processing section 122 in FIG. 11) that separates and plays back only the base audio stream; and for the receiver 42 capable of playing back the extension audio streams up to a predetermined n-th level (e.g., the receiver 42 having the audio-stream processing section 122 in FIG. 16) that separates and plays back the base audio stream and the extension audio streams up to the n-th level.

That is, a stream including the base audio stream and extension streams at a plurality of levels can be encoded so as to be decodable in accordance with the processing capacity of the receiving side. In other words, when a stream including the base audio stream and extension streams at a plurality of levels is transmitted, an apparatus at the receiving side can determine the types of streams that it can process and can decode and play back only the streams that it can process.

Since it is only necessary to add the PID to each TS packet and to add the tables, this method is easily applicable to a transport stream.

As described above, according to the first embodiment of the present invention, the PID is used to identify each packet (TS packet) forming an MPEG-TS, and each of the base audio stream and the first to n-th extension audio streams is identified based on the PID. Hereinafter, with reference to FIGS. 20 to 35, a case is described as the second embodiment of the present invention in which a Sub_id is used to identify each packet (TS packet) forming an MPEG-TS and each of the base audio stream and the first to n-th extension audio streams is identified based on the Sub_id. Portions of the embodiment corresponding to those of the first embodiment are accordingly described with reference to the first embodiment (FIGS. 1 to 19).

A transmitting/receiving system of the second embodiment is similar to the above-described transmitting/receiving system 40 in FIG. 2. An example of the configuration of a transmitter and a receiver forming the transmitting/receiving system 40 in this embodiment is described below.

Figure 20:
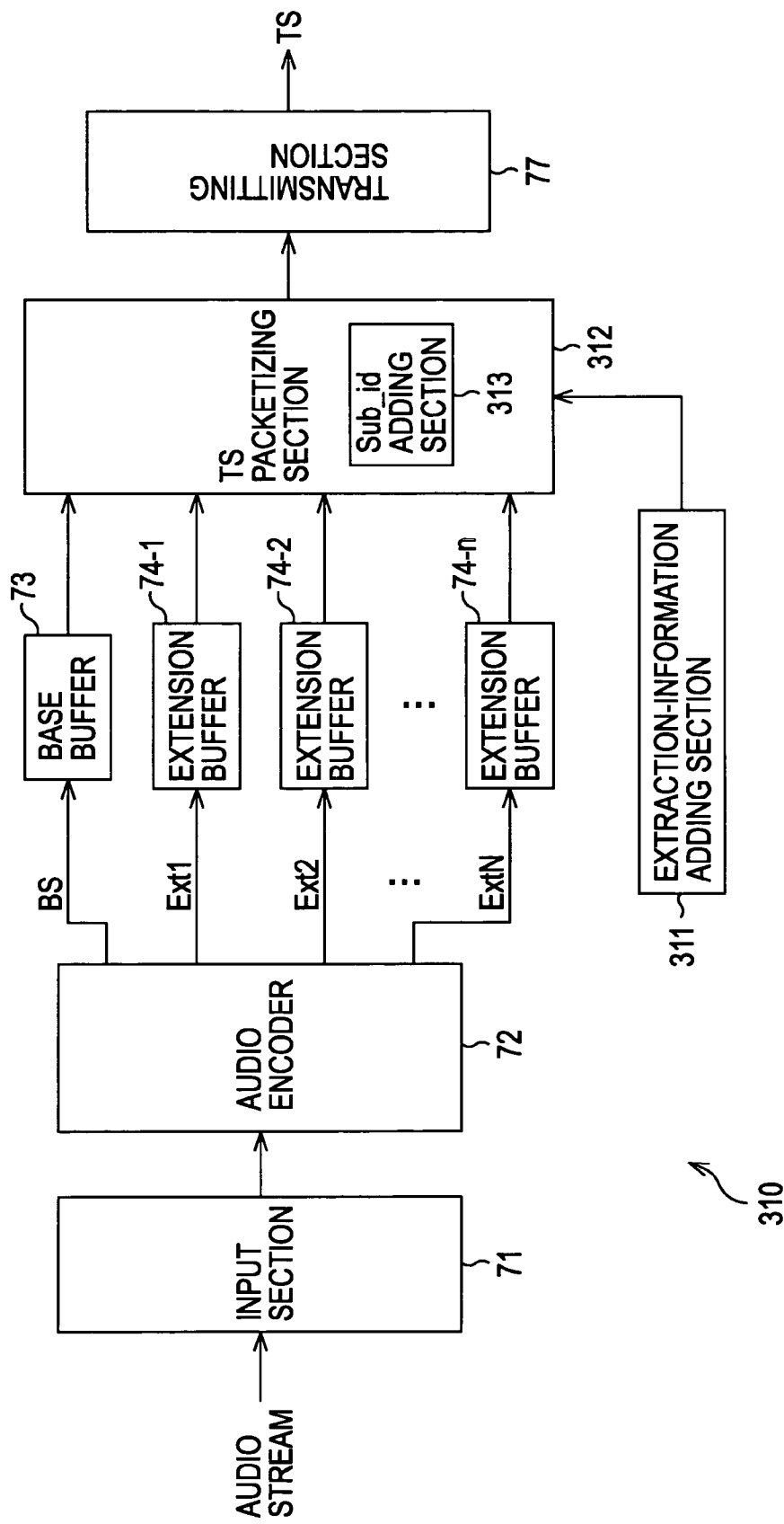
FIG. 20 is a block diagram showing an example of the configuration of a transmitter of a second embodiment to which the present invention is applied.

FIG. 20 is a block diagram showing an example of the configuration of the transmitter in the second embodiment.

A transmitter 310 includes, in addition to the input section 71, the audio encoder 72, the base buffer 73, the extension buffers 74-1 to 74-n, and the transmitting section 77, an extraction-information adding section 311 and a TS packetizing section 312, in which n represents an arbitrary natural number (an integer equal to one or greater). In the diagram, portions corresponding to those in FIG. 3 are referred to using the same reference numerals, and descriptions thereof are omitted to avoid repetition. That is, the input section 71, the audio encoder 72, the base buffer 73, the extension buffers 74-1 to 74-n, and the transmitting section 77 each have the similar functions as the above-described corresponding portions in FIG. 3.

The extraction-information adding section 311 generates tables (PAT and PMT), which are extraction information for extracting one audio stream at the decoding side. An example of the audio stream may be the Japanese dub or the English dub of a certain motion picture (content). In the tables, predetermined types of audio streams are defined. For example, the extraction-information adding section 311 generates the above-described PAT shown in FIG. 7 and a PMT shown in FIG. 21 and supplies these tables to the TS packetizing section 312.

FIG. 21 is an illustration of an example of the PMT of a transport stream (TS). In FIG. 8 described above (first embodiment), a plurality of PIDs are written (entered) in stream_entry( ). In the example of FIG. 21, Audio_stream_type indicating the audio-stream encoding method (information indicating the encoding type) and one PID are written. In this example, the PAT of the TS is the same as that in FIG. 7.

Specifically, the value of PMT-PID in FIG. 7 is referred to by the PMT in FIG. 21. In FIG. 21, stream_entry in the case where PID is "X" is written. That is, Audio_stream_type and Audio_PID=a0 are written. According to FIGS. 7 and 21, audio streams of the same type (one audio stream) can be identified. In other words, one audio stream corresponding to one piece of content can be identified using the tables (PAT and PMT) in FIGS. 7 and 21.

Referring back to FIG. 20, the TS packetizing section 312 includes a Sub_id adding section 313. In the Sub_id adding section 313, a predetermined condition associating Sub_id with the type of TS packet is set in advance. In accordance with the condition, the Sub_id adding section 313 adds the Sub_id to the header of a TS packet. For example, a condition is set so as to allow the Sub_id adding section 313 to add Sub_id=0 to the base audio stream (BS) supplied from the base buffer 73, to add Sub_id=1 to the first audio stream (Ext1) supplied from the first extension buffer 74-1, to add Sub_id=2 to the second audio stream supplied from the second extension buffer 74-2, and similarly to add Sub_id=N to the n-th audio stream supplied from the n-th extension buffer 74-n. The same condition as this condition is set in the receiving side (decoding side) described below.

The TS packetizing section 312 controls the base buffer 73 and the extension buffers 74-1 to 74-n to acquire the base audio stream and the first to n-th extension audio streams and also acquires the tables (FIGS. 7 and 21) supplied from the extraction-information adding section 311. The TS packetizing section 312 packetizes the tables into TS packets and, based on the predetermined condition set in the Sub_id adding section 313 and on the tables, packetizes the base audio stream and the first to n-th extension audio streams into TS packets (generates TS packets). At this time, the TS packetizing section 312 adds the PID, namely the identification information common to one audio stream, to the header of each TS packet, and the Sub_id adding section 313 of the TS packetizing section 312 adds the Sub_id that identifies the type of stream (the base audio stream and the first to n-th extension audio streams) to the header of each TS packet in accordance with the predetermined condition. The TS packetizing section 312 supplies the generated TS packets to the transmitting section 77.

The transmitting section 77 transmits the TS packets. Here, the plural TS packets are transmitted in sequence, resulting in transmission of one stream (including the plural TS packets).

In the second embodiment of the present invention, the PID is not information indicating the extensibility of the encoding type of a TS packet, but is information that identifies one audio stream, and the Sub_id is information indicating the extensibility of encoding type of a TS packet. In other words, the type of stream (the base audio stream and the first to n-th extension audio streams) can be identified based on the Sub_id. Since the Sub_id is added to the header of each TS packet, the receiver at the decoding side can select packets of an extension audio stream at a desired level.

Next, the structure of a TS (transport stream) in which the base audio stream and the extension audio streams at a plurality of levels are multiplexed is described with reference to FIGS. 22 and 23.

Figure 22:
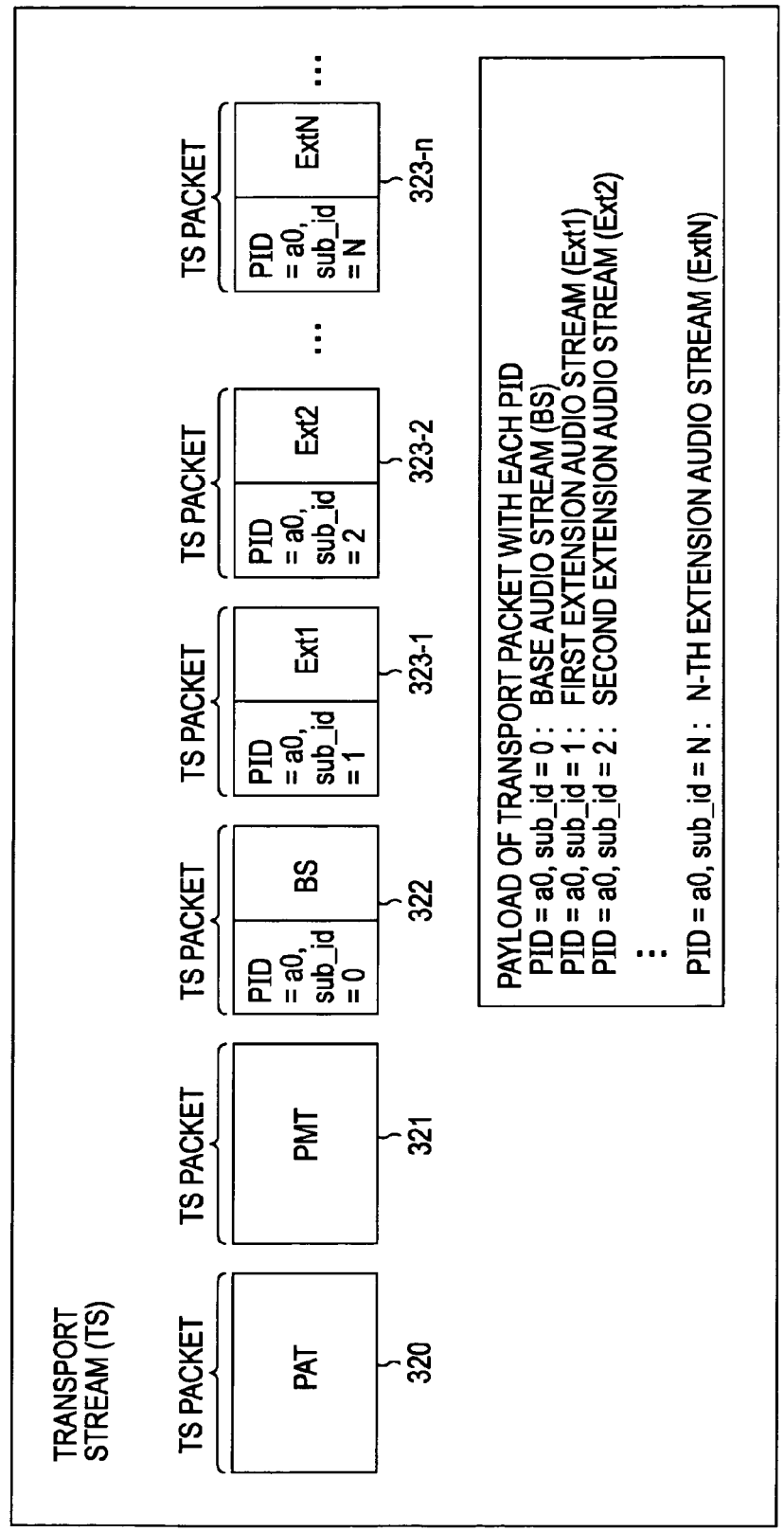
FIG. 22 is an illustration of the structure of a TS in which the base audio stream and the extension audio streams at a plurality of levels are multiplexed.

The TS packetizing section 312 adds, as shown in FIG. 22, the same (common) PID (PID=a0) and a different Sub_id (packet ID) to the header of each of the base audio stream 81 and the first to n-th extension audio streams 82-1 to 82-n in FIG. 4 described above, thereby generating TS packets. One TS packet stores data of, for example, 188 bytes.

The TS stream in FIG. 22 includes a TS packet 320 of a table in which PAT is written (the same information as the PAT 90 in FIG. 5, namely, the PAT in FIG. 7), a TS packet 321 of a table in which PMT is written (the same information as PMT in FIG. 21), a TS packet 322 of the base audio stream (BS) having PID=a0 and Sub_id=0, a TS packet 323-1 of the first extension audio stream (Ext1) having PID=a0 and Sub_id=1, a TS packet 323-2 of the second extension audio stream (Ext2) having PID=a0 and Sub_id=2, ..., and a TS packet 323-n of the n-th extension audio stream (ExtN) having PID=a0 and Sub_id=N. The TS packets 320 and 321 of the tables are transmitted by the transmitter 310 every predetermined period. The PID indicates the PID of the transport packet header.

Each of the base audio stream 81 and the first to n-th extension audio streams 82-1 to 82-n in FIG. 4 is encoded in units of a predetermined number of audio samples, and each unit is indicated by a parenthesized subscript. Specifically, the base audio stream 81 is separated into a plurality of units BS(1), BS(2), ..., BS(n) and encoded. Similarly, for example, the first extension audio stream 82-1 is separated into a plurality of units Ext1(1), Ext1(2), ..., Ext1(n) and encoded. With regard to the base audio stream 81 and the first to n-th extension audio streams 82-1 to 82-n, a set of units having the same subscript, e.g., BS(1) and Ext1(1) to ExtN(1), is synchronously encoded by the audio encoder 72 in FIG. 20 and synchronously played back (decoded) by the receiver 42 at the receiving side.

The structure of the TS (transport stream) in FIG. 22 in which the base audio stream and the extension audio streams at a plurality of levels are multiplexed is described in more detail with reference to FIG. 23.

Figure 23:
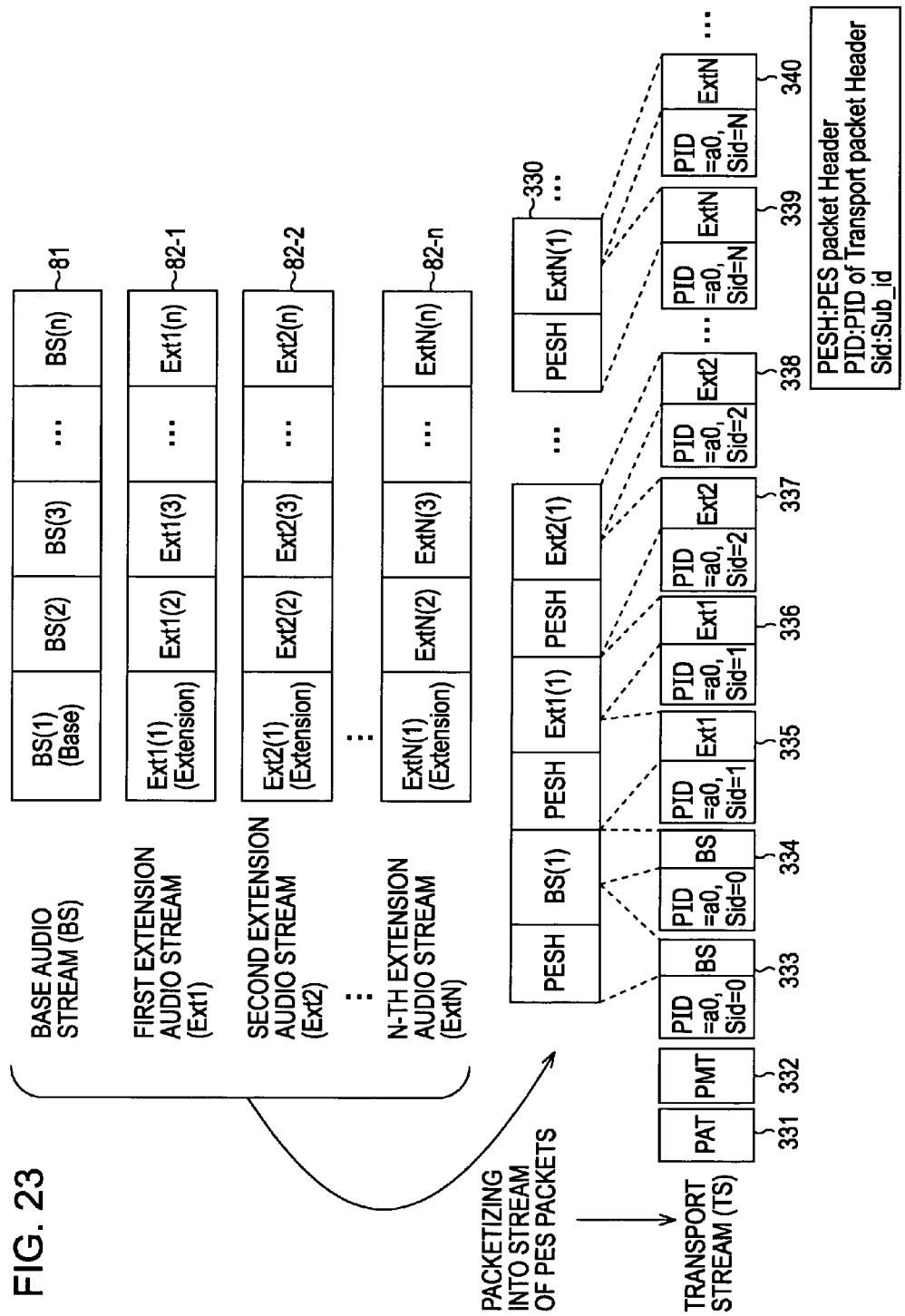
FIG. 23 is an illustration of the structure of the TS in which the base audio stream and the extension audio streams at a plurality of levels are multiplexed.

At first, the TS packetizing section 312 packetizes the base audio stream 81 and the first to n-th extension audio streams 82-1 to 82-n in FIG. 23 (the upper rows of FIG. 23) into a stream of PES packets, as shown in the middle row of FIG. 23, thus generating a PES packet stream 330. PESH indicates the PES packet header. Next, the TS packetizing section 312 packetizes and multiplexes each of the PES packets forming the PES packet stream 330 into TS packets 333 to 340, as shown in the lower row of FIG. 23. In accordance with the condition set in the Sub_id adding section 313 and the tables supplied from the extraction-information adding section 311, the TS packetizing section 312 adds the PID and the Sub_id to the header of each TS packet, in which "PID" indicates the PID of Transport packet Header and "Sid" indicates the Sub_id. Although the TS packetizing section 312 actually adds various other types of information, these types of information are not directly related to the present invention and descriptions thereof are thus omitted. The TS packetizing section 312 packetizes the tables supplied from the extraction-information adding section 311 into TS packets. That is, the TS packetizing section 312 packetizes, of the tables supplied from the extraction-information adding section 311, the PAT into a TS packet 331 and the PMT into a TS packet 332.

As shown in the lower row of FIG. 23, one audio frame (the entirety of BS(1) or the entirety of Ext1(1)) is not included in one TS packet. Specifically, one TS packet stores data of a predetermined data length, and hence one audio frame (the entirety of BS(1)) is divided (separated) into a plurality of TS packets. In the example of FIG. 23, BS(1) is divided into the TS packets 333 and 334.

In the example of FIG. 23, the TS packet 332 of PMT is shown to be transmitted by the transmitting section 77 subsequent to the TS packet 331 of PAT and prior to the TS packet 333. Actually, however, the TS packet 332 of PMT is transmitted by the transmitter 41 every predetermined period.

In the second embodiment illustrated in FIGS. 22 and 23, the PID of each TS packet corresponding to one audio stream, namely, the PID of each TS packet corresponding to all the types including the base audio stream and the first to n-th extension audio streams of the audio stream, is the same (PID=a0). This is to conform to the configuration of the receiving side in this embodiment (the configuration is described below with reference to Figures from FIG. 28 onwards). Depending on the configuration of the receiver, it is not always necessary to have the same PID for each TS packet corresponding to all the types including the base audio stream and the first to n-th extension audio streams of the audio stream. For example, different PIDs may be added to TS packets of different types including the base audio stream and the first to n-th extension audio streams.

Next, a TS packet transmitting process executed by the transmitter 310 in FIG. 20 is described. Since this process is basically similar to the process shown by the flowchart of FIG. 6, the flowchart of FIG. 6 is referred to and only points different from the process in FIG. 6 are described. Since the processing in step S11 to step S16 is the same as the processing described above using FIG. 6, a description thereof is omitted.

In step S17, the extraction-information adding section 311 in FIG. 20 generates tables and supplies the tables to the TS packetizing section 312. Specifically, the extraction-information adding section 311 generates the PMT table shown in FIG. 7 and the PAT table shown in FIG. 21 and supplies the tables to the extraction-information adding section 311.

In step S18, the TS packetizing section 312 executes a TS packet generating process. The process is described below in detail with reference to FIG. 24. TS packets generated by the TS packetizing section 312 are output to the transmitting section 77.

In step S19, the transmitting section 77 transmits the TS packets (an audio stream including the plural TS packets) to the receiver 42 (FIG. 10). Specifically, a stream including the TS packets 320 and 321 of the PAT and the PMT (tables), the TS packet 322 of the base audio stream, the TS packets 323-1 to 323-n of the first to n-th extension audio streams is transmitted to the receiver 42. After that, the process is finished.

Although the TS packets are transmitted to the receiver 42 (FIG. 10) in this embodiment, the TS packets may be recorded in various types of recording media, which are not shown. Alternatively, transmission of the TS packets to the receiver 42 (FIG. 10) may be performed indirectly by recording the TS packets in a recording medium and then supplying the recording medium to the receiver 42 (FIG. 10).

Next, the TS packet generating process in step S18 of FIG. 6 in the second embodiment is described in detail with reference to the flowchart of FIG. 24.

In step S131, the TS packetizing section 312 acquires the tables (PAT and PMT). The tables are the PAT and the PMT generated in step S17 of FIG. 6, which are shown in FIGS. 7 and 21, respectively.

In step S132, the TS packetizing section 312 packetizes the tables (PAT and PMT) into TS packets (generates TS packets based on the PAT and the PMT) and outputs the TS packets to the transmitting section 77. The transmitting section 77 in turn transmits the tables to the receiver 42. Accordingly, the TS packet 320 in which the PAT in FIG. 7 is written and the TS packet 321 in which the PMT is written (see FIG. 22) are generated and output to the transmitting section 77. In this process, the TS packets are transmitted once. Actually, however, the TS packets in which the tables are written are transmitted every predetermined period. Accordingly, even when the receiver starts receiving the stream in the middle thereof, the receiver acquires the tables and thus can reliably decode the stream.

In step S133, the TS packetizing section 312 adds the PID and the Sub_id to each audio stream from the base buffer 73 and the extension buffers 74-1 to 74-n based on the predetermined condition set in the Sub_id adding section 313 and on the tables. The tables themselves are packetized into TS packets by the processing in step S131 and then transmitted. Here, it is assumed that the tables are held by the TS packetizing section 312. Based on the tables, the TS packetizing section 312 adds PID=a0 to each audio stream from the base buffer 73 and the extension buffers 74-1 to 74-n and, based on the predetermined condition set in the Sub_id adding section 313, adds the corresponding Sub_id to each audio stream from the base buffer 73 and extension buffers 74-1 to 74-n. In the second embodiment, PID is a0 (the same), and the value of Sub_id changes as 0, 1, 2, . . . , N.

By this process, PID=a0 and Sub_id=0 are added to the base audio stream (BS); PID=a0 and Sub_id=1 are added to the first extension audio stream (Ext1); PID=a0 and Sub_id=2 are added to the second extension audio stream (Ext2); and similarly PID=a0 and Sub_id=N are added to the n-th extension audio stream (ExtN). In other words, identification information different for each type of stream is added.

In step S134, the TS packetizing section 312 generates TS packets based on the audio streams from the base buffer 73 and the extension buffers 74-1 to 74-n, respectively. Accordingly, as shown in FIG. 22, the same PID and different Sub_ids are added to the base audio stream and the first to n-th extension audio streams, thus generating TS packets. More specifically, the TS packets in the same audio frame are given the same Sub_id (see Sid in FIG. 23).

In step S135, the TS packetizing section 312 outputs the generated TS packets to the transmitting section 77. After that, the process returns to step S18 of FIG. 6.

Figure 24:
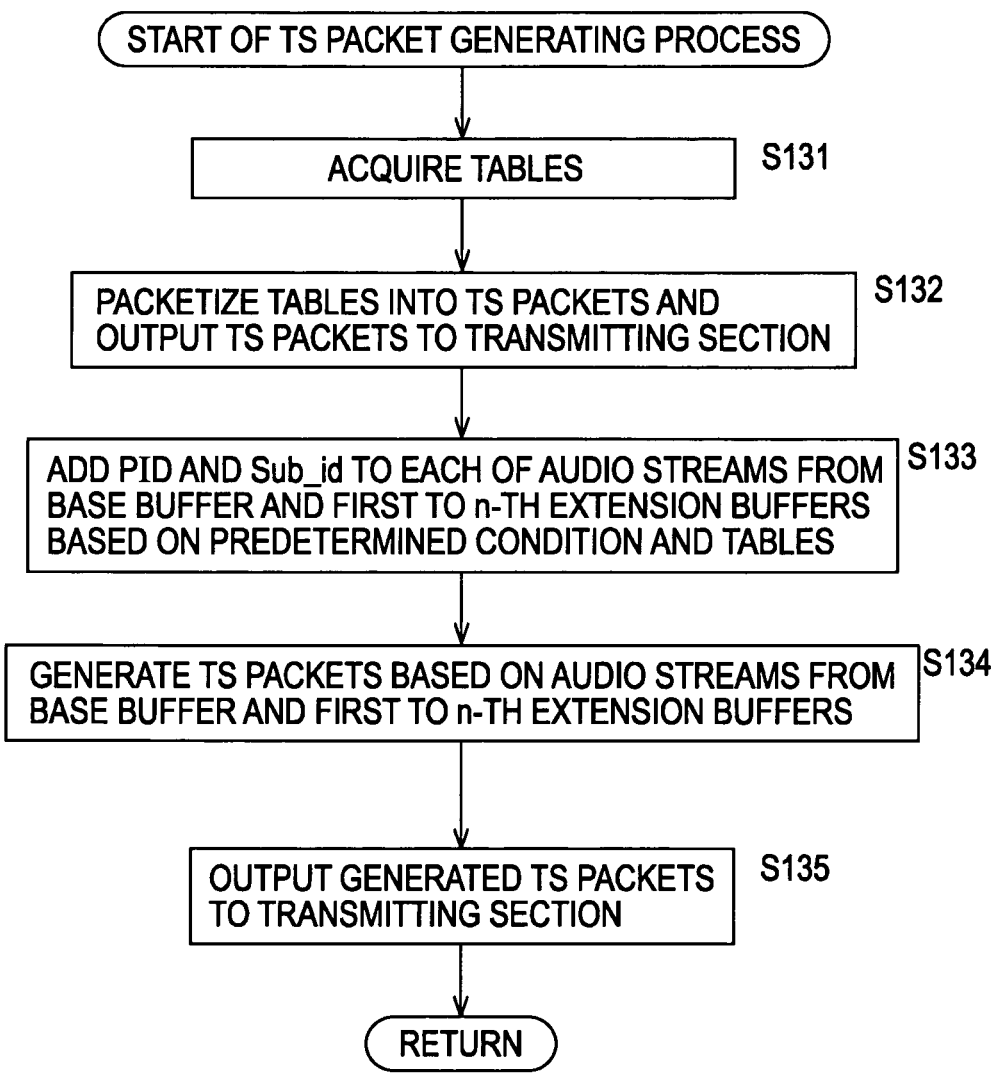
FIG. 24 is a flowchart showing a TS packet generating process.

By the processes in FIGS. 6 and 24, the transmitter 310 (FIG. 20) capable of encoding the n-th extension audio stream separates the encoded data into the base audio stream and the first to n-th extension audio streams. Based on the predetermined condition set in the Sub_id adding section 313 and on the tables, the transmitter 310 adds the PID and the Sub_id to the separated audio streams, packetizes the audio streams into TS packets, and transmits the TS packets. That is, the transmitter 310 (FIG. 20) transmits the audio stream including the TS packets having the header with Sub_id that identifies the type of stream and the TS packets of the tables to the receiver 42.

The stream transmitted by the transmitter 310 includes the TS packets forming the base audio stream and the first to n-th extension audio streams and the TS packets in which the PAT and the PMT are written. Since the header of each of the TS packets forming the base audio stream and the first to n-th extension audio streams includes the PID identifying one audio stream and the Sub_id identifying the type of TS packet included in the audio stream, the receiving side can perform decoding in accordance with its processing capacity.

Next, an example of the structure of a TS packet transmitted by the transmitter 310 is described. FIG. 25 is an illustration of the structure of each TS packet transmitting the base audio stream and the first to n-th extension audio streams of the TS (transport stream) in FIG. 22.

In the syntax of the TS packet header in MPEG 2 systems shown in FIG. 25, private_data_byte may be entered in Adaptation_field( ). One byte of private_data_byte is used for the purpose of Sub_id. In the example of FIG. 25, a portion where Sub_id is written corresponds to private_data_byte.

More specifically, the header of a TS packet includes descriptions from sync_byte to Sub_id in transport_packet (namely, PID and Sub_id are written), and the actual data (audio stream) includes the payload description. In the example of FIG. 22, the first block of the TS packet 322 in which PID=a0 and Sub_id=0 are written corresponds to the header of the TS packet, and the latter block of the TS packet 322 in which BS is written corresponds to the payload of the TS packet.

In adaptation_field, the data length of adaptation_field is written in adaptation_field_length, and flag corresponds to other information. Also, transport_priate_data_flag is a flag indicating the presence of private_data. In the example of FIG. 25, "1", that is, the presence of private_data, is indicated. The data length of private_data is written in transport_priate_data_lengs. In the example of FIG. 25, "1", that is, the fact that the data length of private_data (Sub_id) is one byte, is indicated. Also, Sub_id is set as private_data. The data length of Sub_id is one byte, as indicated by transport_priate_data_lengs=1. That is, the value 0, 1, 2, . . . , n is written in Sub_id in accordance with the type of TS packet. Specifically, "0" is written when the TS packet corresponds to the base audio stream, and "1" is written when the TS packet corresponds to the first extension audio stream. In this manner, PID and Sub_id are written in the header of each TS packet.

In the example shown in FIGS. 23 and 25, the structure of the TS packets of the audio stream including the base audio stream and the extension audio streams at a plurality of levels is described. Next, TS packets of an audio stream including only the base audio stream and the first extension audio stream is described with reference to FIGS. 26 and 27.

Figure 26:
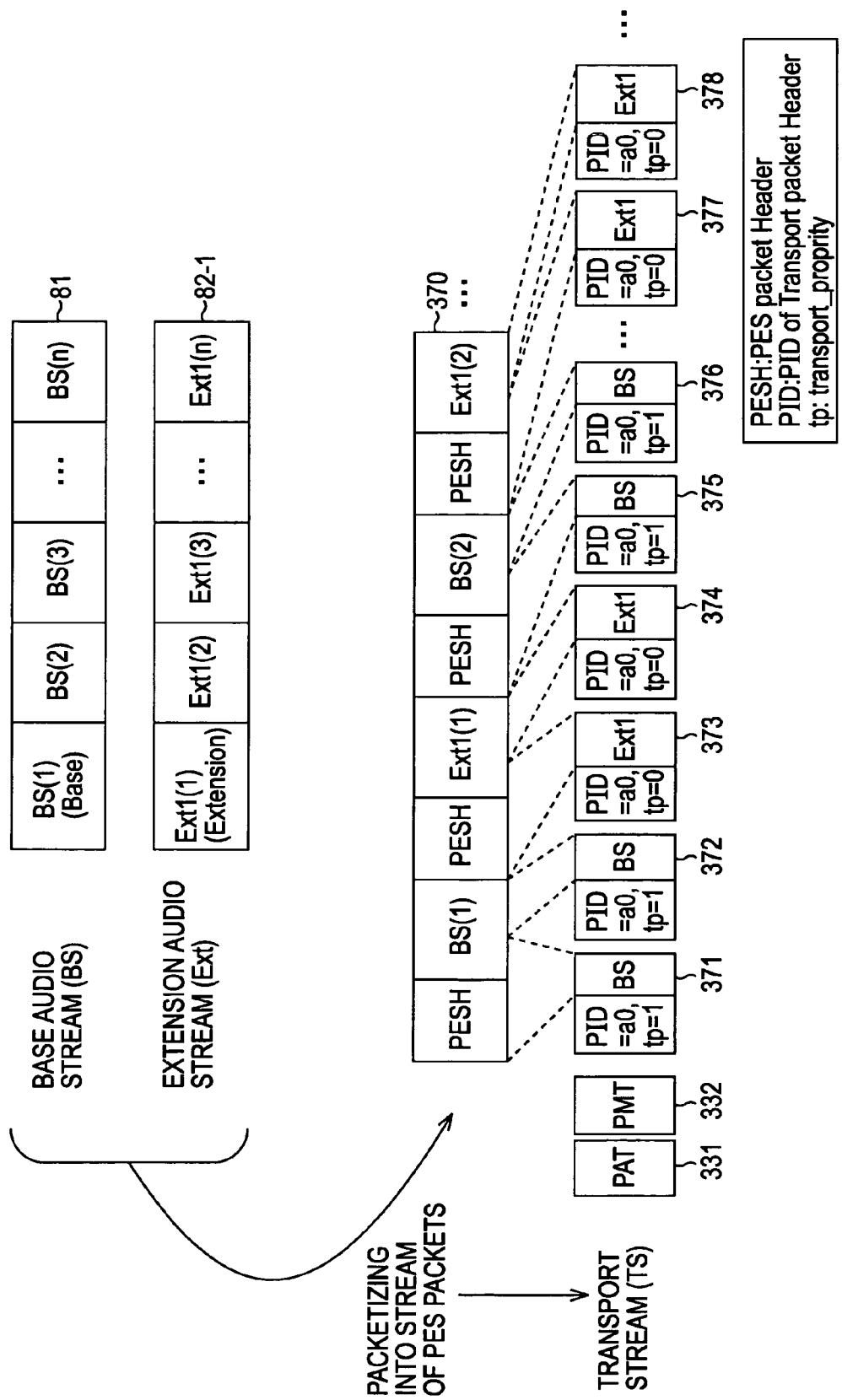
FIG. 26 is an illustration of the structure of a TS in which the base audio stream and the first extension audio stream are multiplexed.

FIG. 26 is an illustration of the structure of a transport stream in the case where the base audio stream and the first extension audio stream are multiplexed. In the illustration, portions corresponding to those of FIG. 23 are referred to using the same reference numerals.

Referring to FIG. 26, in order to identify the type of TS packet, transport_priority (written as tp in FIG. 26) is used instead of Sub_id. At first, the TS packetizing section 312 packetizes the audio stream 81 and the first extension audio stream 82-1 (the upper rows of FIG. 26) into a stream of PES packets, as shown in the middle row of FIG. 26, thus generating a PES packet stream 370. Next, the TS packetizing section 312 packetizes and multiplexes each of the PES packets forming the PES packet stream 370 into TS packets 371 to 378, as shown in the lower row of FIG. 26. In accordance with the condition set in the Sub_id adding section 313 and the tables supplied from the extraction-information adding section 311, the TS packetizing section 312 adds PID and transport_priority to the header of each TS packet. The TS packetizing section 312 actually adds various other types of information. The TS packetizing section 312 packetizes the tables (PAT and PMT) supplied from the extraction-information adding section 311 into TS packets. That is, the TS packetizing section 312 packetizes the PAT into the TS packet 331 and the PMT into the TS packet 332.

FIG. 27 is an illustration of the structure of each TS packet transmitting the base audio stream and the first extension audio stream of the TS (transport stream) in FIG. 26.

In the syntax of the TS packet header in MPEG 2 systems shown in FIG. 27, the transport_priority flag is used to distinguish whether the payload data of the transport packet is the base audio stream or the first extension audio stream. In the example of FIG. 27, transport_priority=1 indicates the base audio stream, and transport_priority=0 indicates the first extension audio stream. Accordingly, transport_priority=1 is added to a stream of higher priority (the base audio stream).

The header of the TS packet includes descriptions from sync_byte to continuity_counter in transport_packet (namely, PID and transport_priority are written), and the actual data (audio stream) includes the payload description. In the example of FIG. 26, the first block of the TS packet 371 in which PID=a0 and tp=1 are written corresponds to the header of the TS packet, and the latter block of the TS packet 371 in which BS is written corresponds to the payload of the TS packet.

In the case where the audio stream includes only the base audio stream and the first extension audio stream, the TS packet may have the structure shown in FIG. 27. Compared with the structure of the TS packet in FIG. 25, the data amount of the header is reduced. Needless to say, the structure of the TS packet in FIG. 25 may be used in the case where the audio stream includes only the base audio stream and the first extension audio stream.

The method of defining Sub_id in the transport packet header is not limited to the methods in FIGS. 25 and 27, and other syntax fields are also applicable.

Next, an example of the configuration of the receiver 42 (FIG. 10) at the playing-back side in the second embodiment is described. In this embodiment, the receiver 42 at the playing-back side is capable of decoding at least the base audio stream (BS). When the receiver 42 at the playing-back side can play back extension audio streams up to the predetermined m-th level (m represents a natural number equal to one or greater, and m≦n), the receiver 42 (FIG. 10) can decode the base audio stream and the first to m-th extension audio streams. Regarding the relationships between the base audio stream and the extension audio streams, for example, the larger the value n of the decodable extension audio stream, the better the audio playback quality is and the higher the functionality is.

Figure 28:
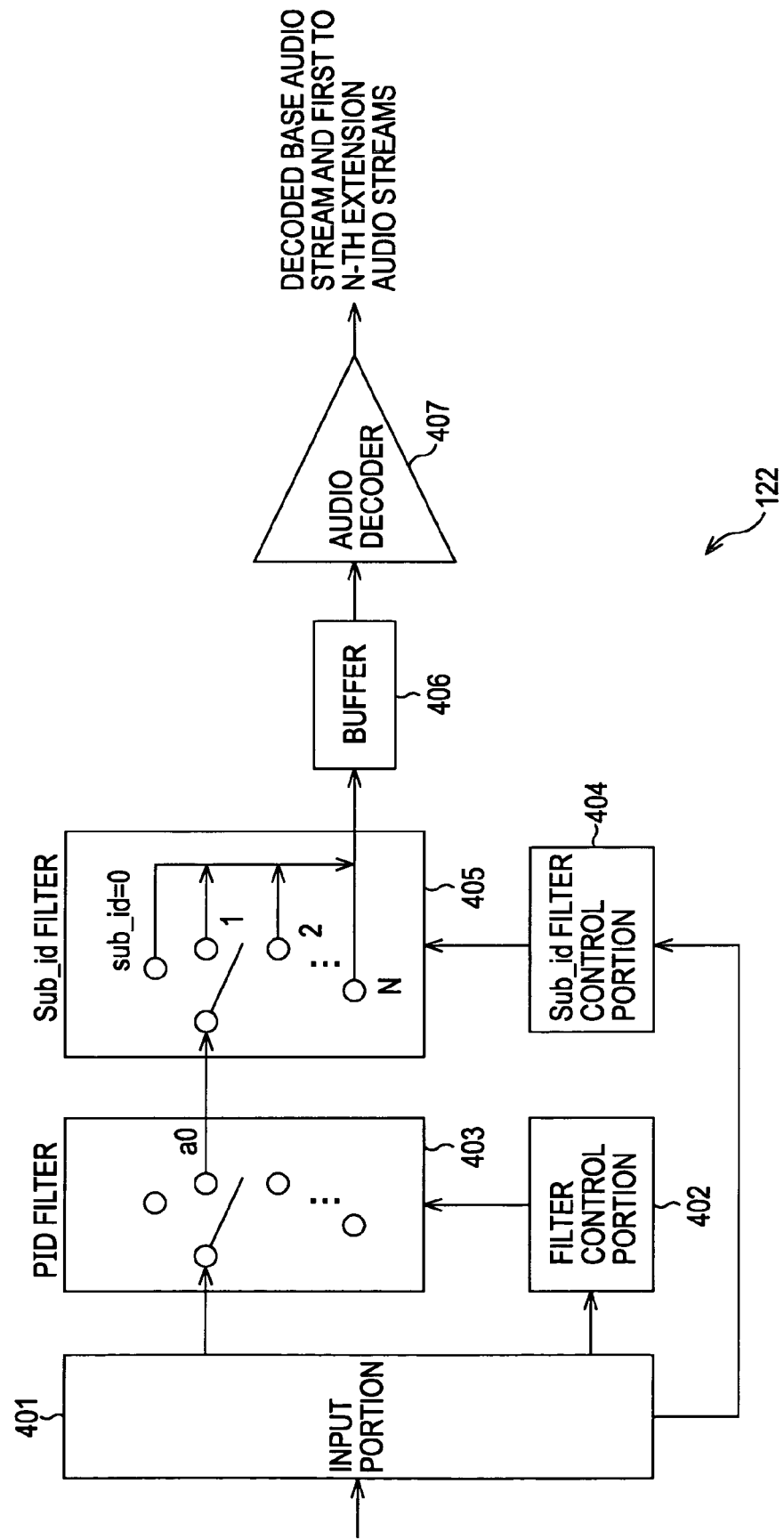
FIG. 28 is an illustration of an example of the configuration of an audio-stream processing section that can decode the base audio stream and the first to n-th extension audio streams.

At first, an example of the configuration of the receiver 42 (FIG. 10) in the second embodiment having the audio-stream processing section 122 capable of decoding the base audio stream and the first to n-th extension audio streams is described with reference to FIG. 28. In the example of FIG. 28, as in the case of FIGS. 18 and 19, the audio-stream processing section 122 executing a stream processing process in the case where the TS multiplexing method is limited is described. That is, FIG. 28 shows an example of the audio-stream processing section 122 applied in the case where, in the TS, encoding units to be synchronously played back are encoded in sequence in the order of the base audio stream and the first to n-th extension audio streams. In other words, the TS packets forming the base audio stream and the TS packets forming the first to n-th extension audio streams, which are included in the entirety of a stream, are arranged in such a manner that the TS packets to be played back at the same time are arranged in sequence in the order of the TS packets forming the base audio stream and the first to n-th extension audio streams (the transmitter 41 at the encoding side outputs the TS packets in this order).

The audio-stream processing section 122 in FIG. 28 includes an input portion 401, a PID filter control portion 402, a PID filter 403, a Sub_id filter control portion 404, a Sub_id filter 405, a buffer 406, and an audio decoder 407.

The input portion 401 receives input of TS packets of an audio stream (TS packets in which encoding units to be synchronously played back are input in sequence in the order of the base audio stream and the first to n-th extension audio streams) supplied by the receiving section 121 (FIG. 10). The input portion 401 supplies, among the TS packets of the audio stream, the TS packets of the tables (the PAT and PMT tables described above using FIGS. 7 and 21) to the PID filter control portion 402, and the remaining TS packets (e.g., the TS packets of the base audio stream and the first to n-th extension audio streams to which the PID and Sub_id in FIG. 23 are added) to the PID filter 403. The input portion 401 supplies the header of each of the TS packets of the base audio stream and the first to n-th extension audio streams having PID and Sub_id (the TS packets other than PAT and PMT) to the Sub_id filter control portion 404. For example, when the TS packets of the audio stream input to the input portion 401 have the structure shown in FIG. 25, the header from sync_byte to Sub_id in FIG. 25 is supplied to the Sub_id filter control portion 404. When the TS packets of the audio stream input to the input portion 401 have the structure shown in FIG. 27, the header from sync_byte to continuity_counter is supplied to the Sub_id filter control portion 404.

The PID filter control portion 402 controls the operation of the PID filter 403 based on the acquired tables (FIGS. 7 and 21). For example, based on the PAT and the PMT in FIGS. 7 and 21, the PID filter control portion 402 controls the operation of the PID filter 403 so as to supply the TS packets having Audio_PID=a0 written in the header thereof to the Sub_id filter control portion 404 (flips the switch of the PID filter 403).

Under the control of the PID filter control portion 402, the PID filter 403 selects (extracts) the TS packets. For example, under the control of the PID filter control portion 402, the PID filter 403 selects the TS packets having PID=a0 written in the header to the Sub_id filter 405 at a subsequent stage.

Based on the Sub_id information (value) written in the header of each TS packet supplied by the input portion 401 and on the predetermined condition set in advance in the Sub_id filter control portion 404, the Sub_id filter control portion 404 controls the operation of the Sub_id filter 405. The same condition as that set in the Sub_id adding section 313 of the above-described transmitter 310 (FIG. 20) is set in the Sub_id filter control portion 404. Thus, based on this preset condition and the Sub_id value of each TS packet supplied by the input portion 401, the Sub_id filter control portion 404 determines the type(s) of stream(s) that the audio decoder 407 can process and controls the operation of the Sub_id filter 405 (flips the switch of the Sub_id filter 405). In the example of FIG. 28, the Sub_id filter control portion 404 determines that the types of streams that the audio decoder 407 can process are the base audio stream and the first to n-th extension audio streams, and controls the Sub_id filter 405 so as to supply the TS packets having Sub_id=0 to N to the buffer 406.

Figure 29:
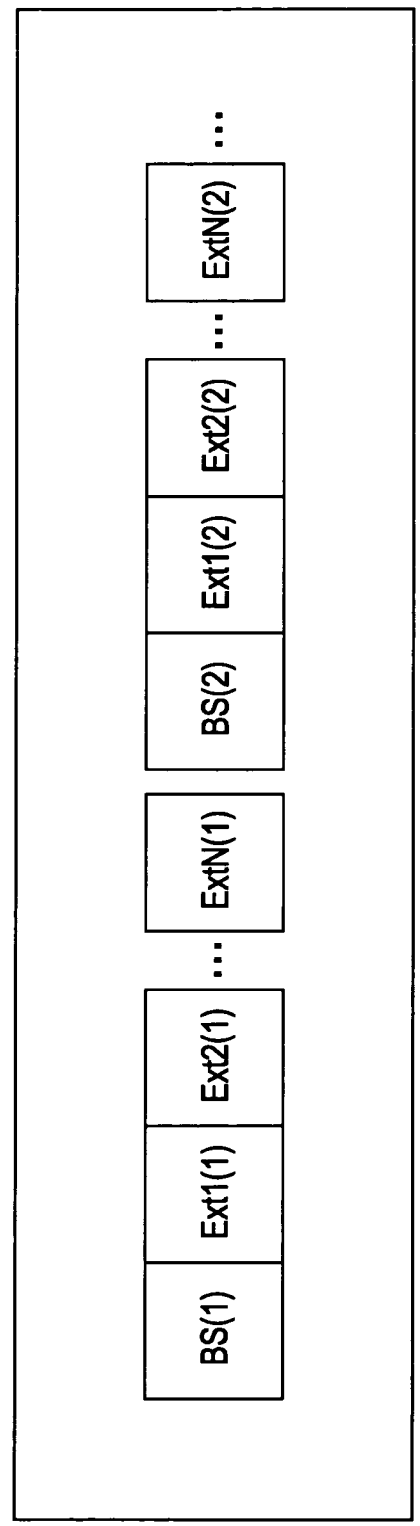
FIG. 29 is an illustration of the order of TS packets.

Under the control of the Sub_id filter control portion 404, the Sub_id filter 405 selects (extracts) the TS packets. Specifically, under the Sub_id filter control portion 404, the Sub_id filter 405 selects the switch corresponding to the Sub_id value written in the header. For example, under the control of the Sub_id filter control portion 404, the Sub_id filter 405 sequentially supplies the TS packets having Sub_id=0, 1, 2, . . . , N written in the header thereof to the buffer 406 at a subsequent stage. As shown in FIGS. 22 and 23, the TS packets are encoded in sequence in the order of BS(1), Ext1(1), Ext2(1), . . . ExtN(1), BS(2), Ext2(2), . . . ExtN(2) in the TS. Thus, the Sub_id filter 405 supplies, as shown in FIG. 29, the payload data of the TS packets in the order of BS(1), Ext1(1), Ext2(1), . . . ExtN(1), BS(2), Ext2(2), . . . ExtN(2) in the TS to the buffer 406.

The buffer 406 stores (buffers) the TS packets supplied by the Sub_id filter 405. The buffer 406 is an audio buffer that operates to allow synchronization with the audio decoder 407. Specifically, the buffer 406 stores the TS packets (data) supplied in sequence in the order of BS(1), Ext1(1), Ext2(1), . . . ExtN(1), BS(2), Ext2(2), . . . ExtN(2). Also the buffer 406 outputs the buffered TS packets to the audio decoder 407 with predetermined timing (that is, the audio decoder 407 acquires the TS packets stored in the buffer 406 with predetermined timing). The audio decoder 407 decodes the TS packets supplied by the buffer 406. The audio decoder 407 supplies the decoded audio stream to the output section 123 at a subsequent stage (FIG. 10).

According to FIG. 28 in the second embodiment, the PID value does not have different values depending on the types of streams (the base audio stream and the first to n-th extension audio streams), and the Sub_id value has different values depending on the types of streams. Therefore, an audio stream including a combination of the base and extension audio streams can be regarded as one entity, and this entity is given one PID value and managed. This is especially advantageous when applied to an application for managing the base audio stream and the extension audio streams at a plurality of levels as one stream.

A TS packet receiving process executed by the receiver 42 (FIG. 10) having the audio-stream processing section 122 in FIG. 28 is basically similar to that in FIG. 12, but differs in details of the audio stream processing process in step S53 of FIG. 12. Using the flowcharts of FIGS. 30 and 31, an n-th extension audio stream processing process, which is an example of the processing in step S53 of FIG. 12, is described. This process is a process executed by the audio-stream processing section 122 in FIG. 28. That is, this process is a process executed by the audio-stream processing section 122 capable of decoding the base audio stream and the first to n-th extension audio streams.

In step S171, the input portion 401 receives input of TS packets of an audio stream (an audio stream including the plural TS packets). The TS packets of the audio stream correspond to one audio stream including the TS packets of the tables (FIGS. 7 and 21) and the TS packets of the base audio stream and the first to n-th extension audio streams, which are transmitted by the transmitter 41 in step S19 of FIG. 6 described above.

In step S172, the input portion 401 supplies the TS packets of the tables (FIGS. 7 and 21) to the PID filter control portion 402. Specifically, since the TS packets of the audio stream include the TS packets of the tables (PAT and PMT), the TS packets of the base audio stream, and the TS packets of the first to n-th extension audio streams (see FIGS. 22 and 23), the input portion 401 supplies, among these packets, the TS packets of the tables (FIGS. 7 and 21) to the PID filter control portion 402.

In step S173, the input portion 401 supplies the TS packets having PID to the PID filter 403. Specifically, referring to FIGS. 22 and 23, the TS packets of the base audio stream and the first to n-th extension audio streams having PID are supplied to the PID filter 403.

In step S174, the PID filter control portion 402 refers to the tables (FIGS. 7 and 21) and determines the type(s) of stream(s) that the audio decoder 407 can process. That is, the PID filter control portion 402 refers to the tables to detect one stream that it can process (in this example, one audio stream having PID=a0) and determines the PID added to this stream as the type of stream that it can process. The PID filter control portion 402 controls the PID filter 403 so as to select the TS packets having PID=a0 determined to be processable (the TS packets associated with the audio stream).

By the processing in step S174, the PID filter control portion 402 controls the PID filter 403 so as to supply the TS packets of the base audio stream and the TS packets of the first to n-th extension audio streams, which form one audio stream having the same PID (PID=a0 is added), to the Sub_id filter 405.

In step S175, under the control of the PID filter control portion 402, the PID filter 403 selects the switch to supply the corresponding TS packets to the Sub_id filter 405 at a subsequent stage. Specifically, the PID filter 403 flips the switch to select the TS packets having PID=a0, i.e., one audio stream, and supplies the TS packets to the Sub_id filter 405 at a subsequent stage.

In step S176, based on the header information of the TS packets supplied by the input portion 401 by the processing in step S173 and on the predetermined condition set in advance in the Sub_id filter control portion 404, the Sub_id filter control portion 404 determines the type(s) of stream(s) that the audio decoder 407 can process and controls the Sub_id filter 405. For example, the Sub_id filter control portion 404 determines that the types of streams that the audio decoder 407 can process are the base audio stream and the first to n-th extension audio streams. A predetermined condition, such as the fact that Sub_id=0 corresponds to the base audio stream, Sub_id=1 corresponds to the first extension audio stream, and similarly Sub_id=N corresponds to the n-th extension audio stream, is set in advance in the Sub_id filter control portion 404. Based on the condition, the Sub_id filter control portion 404 controls the operation of the Sub_id filter 405 so as to supply the types of streams determined to be predeterminable to the buffer 406 at a subsequent stage. The condition set in the Sub_id filter control portion 404 is the same as that (the condition indicating that, for example, Sub_id=0 corresponds to the base audio stream) set in the Sub_id adding section 313 of the above-described transmitter 310 (FIG. 20). Based on the Sub_id, the types of streams can be accurately identified.

In step S177, under the control of the Sub_id filter control portion 404, the Sub_id filter 405 selects the switch to supply the corresponding TS packets to the buffer 406 at a subsequent stage. For example, under the control of the Sub_id filter control portion 404, the Sub_id filter 405 flips the switch to supply the TS packets having Sub_id=0 in the header to the buffer 406 via the line of Sub_id=0 of the Sub_id filter 405. Under the control of the Sub_id filter control portion 404, the Sub_id filter 405 flips the switch to supply the TS packets having Sub_id=1 in the header to the buffer 406 via the line of Sub_id=1 of the Sub_id filter 405. Accordingly, data is supplied to the buffer 406 in the order of TS packets shown in FIG. 29.

In step S178, the buffer 406 stores (buffers) the TS packets supplied by the Sub_id filter 405. Accordingly, the TS packets supplied in sequence in the order of BS(1), Ext1(1), Ext2(1), ... ExtN(1), BS(2), Ext2(2), ... ExtN(2) as shown in FIG. 29 are stored in the buffer 406.

In step S179, the buffer 406 outputs the TS packets to the audio decoder 407 with predetermined timing. For example, the buffer 406 sequentially outputs the TS packets, which are buffered in sequence in the order of BS(1), Ext1(1), Ext2(1), ... ExtN(1), BS(2), Ext2(2), ... ExtN(2) as shown in FIG. 29, to the audio decoder 407 with predetermined timing.

In step S180, the audio decoder 407 sequentially decodes the TS packets supplied by the buffer 406 (the TS packets supplied in the order of BS(1), Ext1(1), Ext2(1), ... ExtN(1), BS(2), Ext2(2), ... ExtN(2)). In step S181, the audio decoder 407 sequentially outputs the decoded audio stream.

Figure 30:
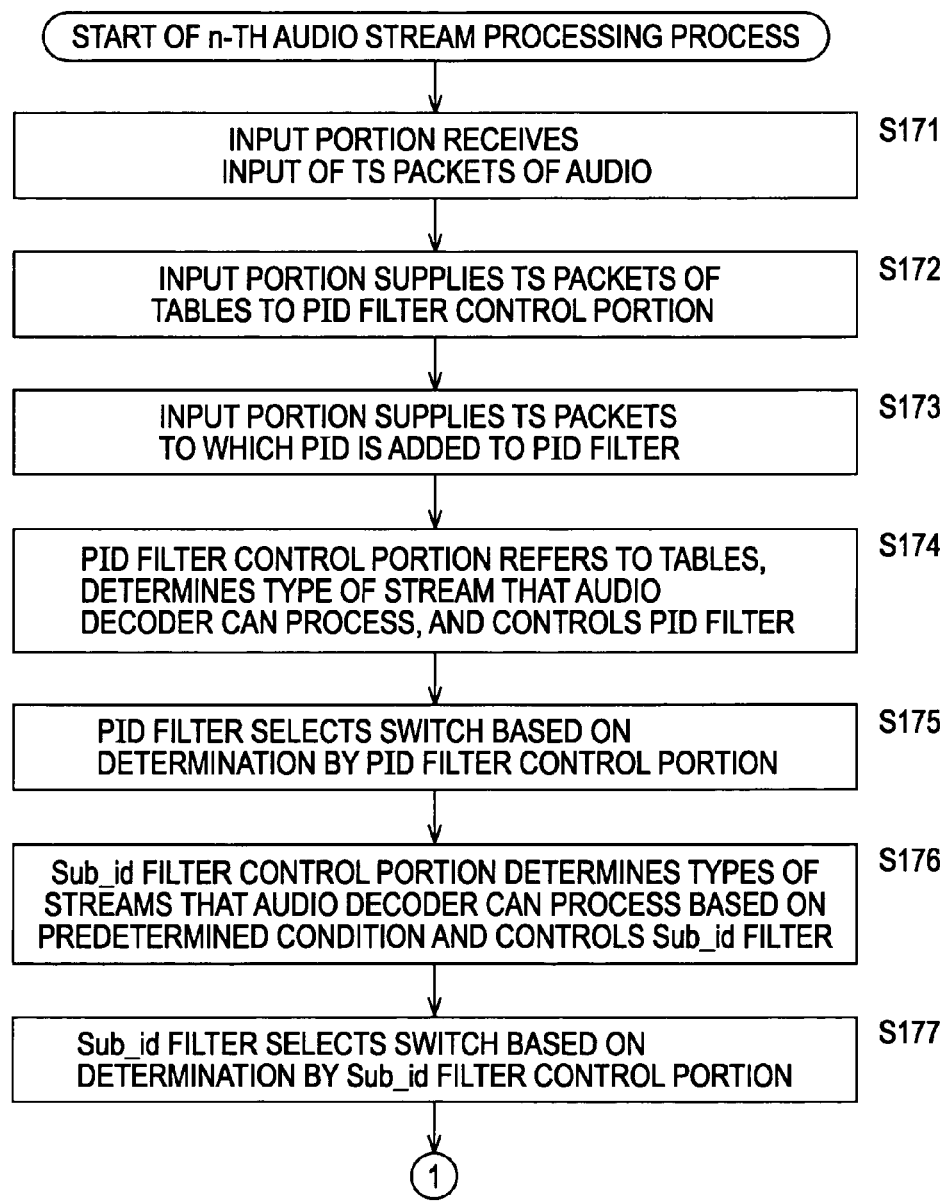
FIG. 30 is a flowchart showing an audio stream processing process executed by the audio-stream processing section in FIG. 28.
Figure 31:
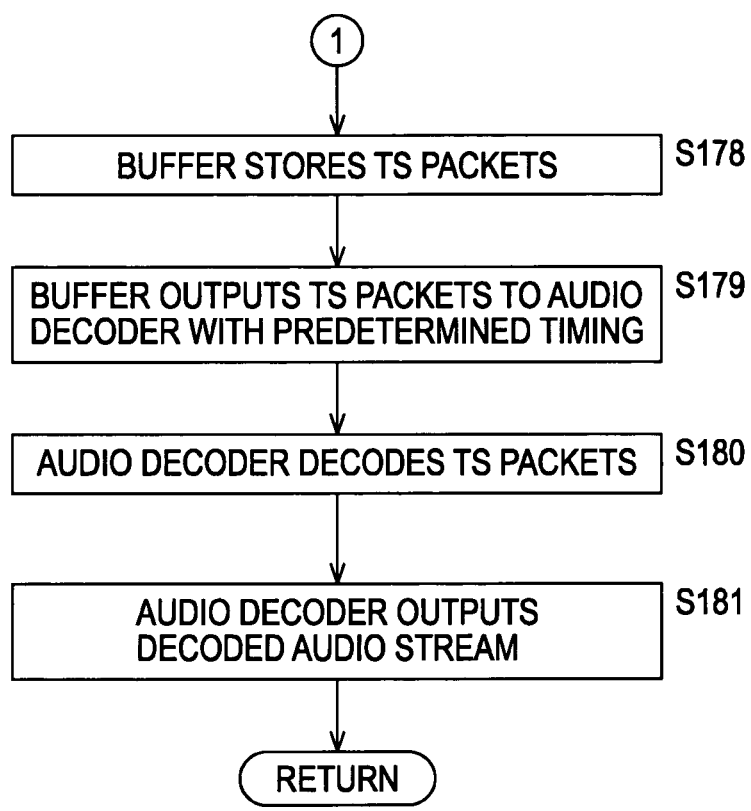
FIG. 31 is a flowchart showing the audio stream processing process executed by the audio-stream processing section in FIG. 28.

By the process in FIGS. 30 and 31, a stream to be received includes the TS packets forming the base audio stream, the TS packets forming the first to n-th extension audio streams, and the tables (PAT and PMT in FIGS. 7 and 21) for assigning PID. The PID that identifies one audio stream and the Sub_id that identifies the type of audio stream are added to each of the TS packets forming the base audio stream and the TS packets of the first to n-th extension audio streams. Therefore, the audio-stream processing section 122 (the receiver 42), shown in FIG. 28, capable of decoding the base audio stream and the first to n-th extension audio streams can easily perform decoding.

Figure 32:
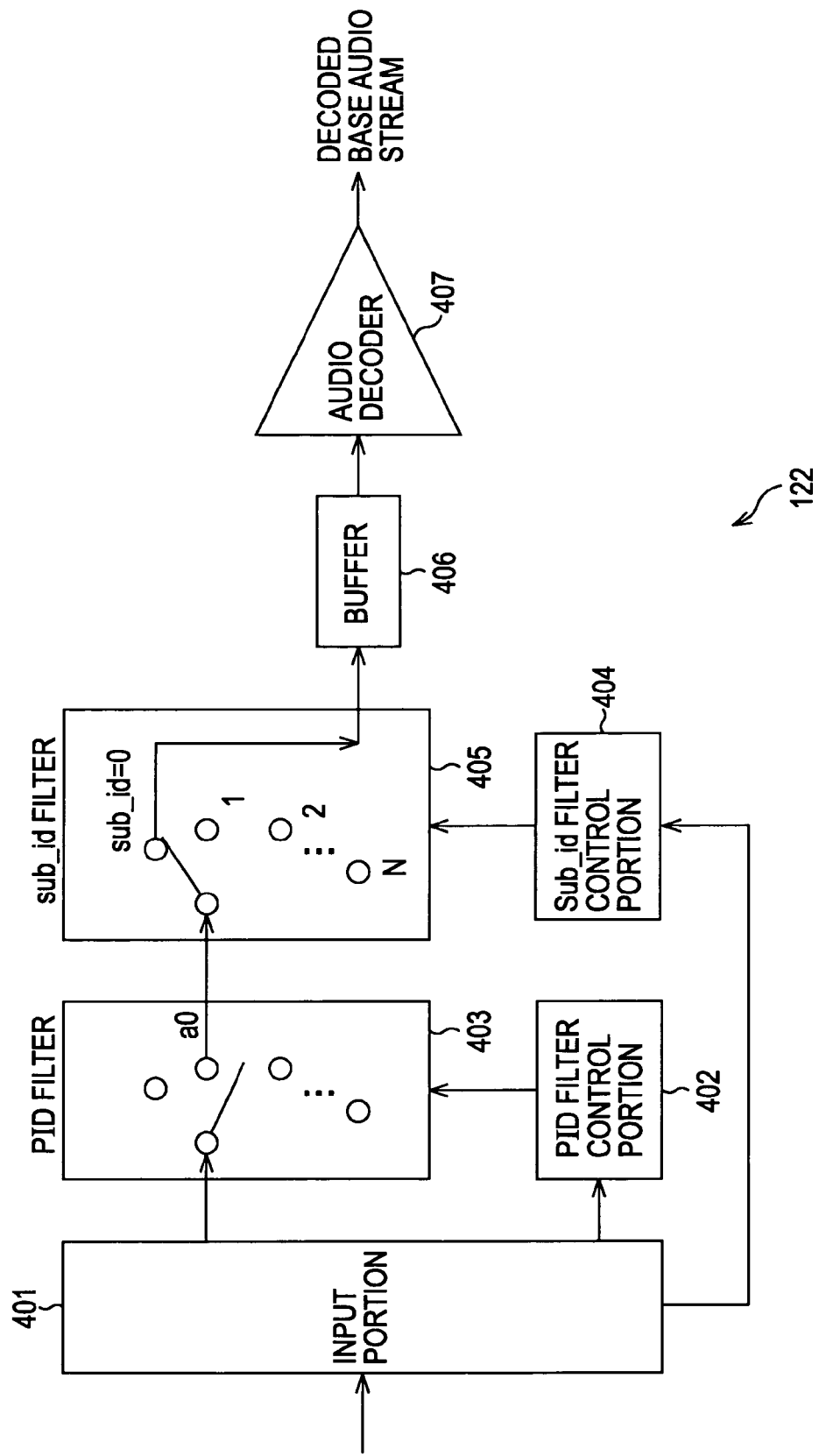
FIG. 32 is an example of the configuration of an audio-stream processing section that can decode the base audio stream and the first extension audio stream.

Referring to FIGS. 28 to 31, the receiver 42 (FIG. 10) having the audio-stream processing section 122 capable of decoding the TS in FIGS. 22 and 23 has been described. As another example, an example of the configuration in the case where the audio decoder 407 of the audio-stream processing section 122 capable of decoding the TS in FIGS. 22 and 23 is capable of decoding only the base audio stream is described using FIG. 32. In FIG. 32, portions corresponding to those in FIG. 28 are referred to using the same reference numerals, and descriptions thereof are omitted to avoid repetition.

Based on the Sub_id information (value) written in the header of each TS packet supplied by the input portion 401 and on the predetermined condition set in advance in the Sub_id filter control portion 404, the Sub_id filter control portion 404 controls the operation of the Sub_id filter 405. In the example of FIG. 32, the Sub_id filter control portion 404 determines that the type of audio stream that the audio decoder 407 can process is the base audio stream, and, based on the predetermined condition, confirms that the base audio stream corresponds to Sub_id=0. The Sub_id filter control portion 404 controls the Sub_id filter 405 so as to supply the TS packets having Sub_id=0 to the buffer 406.

Under the control of the Sub_id filter control portion 404, the Sub_id filter 405 selects (extracts) the TS packets. In the example of FIG. 32, under the control of the Sub_id filter control portion 404, the Sub_id filter 405 selects the switch corresponding to the value of Sub_id=0 written in the header and supplies the base audio stream to the buffer 406.

Figure 33:
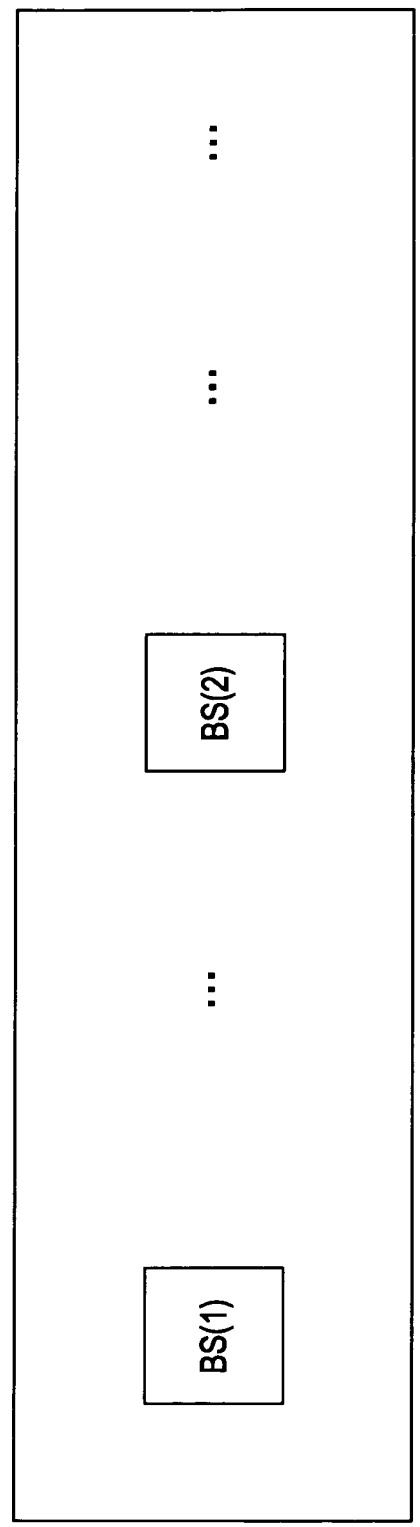
FIG. 33 is an illustration of the order of TS packets.

In the example of FIG. 32, the audio-stream processing section 122 has only the audio decoder 407 corresponding to the base audio stream and is incapable of decoding the first to n-th extension audio streams. In this case, the Sub_id filter control portion 404 remembers that the type of stream that it can process is the base audio stream. Based on the predetermined condition set in advance (condition indicating, for example, that Sub_id=0 corresponds to the base audio stream, and Sub_id=1 corresponds to the first extension audio stream), the Sub_id filter control portion 404 refers to the Sub_id corresponding to the base audio stream. In this case, the Sub_id filter control portion 404 determines that Sub_id=0 corresponds to the type of stream that it can process and controls the Sub_id filter 405 so as to select the TS packets having the Sub_id of the decodable stream. For example, the Sub_id filter control portion 404 informs the Sub_id filter 405 of the ID of the decodable stream or the Sub_id number (Sub_id=0) allowed to be passed through. Based on this Sub_id, namely, Sub_id=0, reported by the Sub_id filter control portion 404, the Sub_id filter 405 selects the TS packets having Sub_id=0 and supplies the TS packets to the buffer 406. When the TS packets of the first to n-th extension audio streams are supplied, the Sub_id filter 405 does not select these packets. That is, only when the TS packets of the base audio stream having Sub_id=0 are supplied, the Sub_id filter 405 selects the TS packets of the base audio stream and supplies the TS packets to the buffer 406 at a subsequent stage. Accordingly, the Sub_id filter 405 selects, as shown in FIG. 33, the TS packets of the base audio stream and supplies the TS packets to the buffer 406 at a subsequent stage.

Since a TS packet receiving process executed by the receiver 42 (FIG. 10) having the audio-stream processing section 122 in FIG. 32 is similar to those in FIGS. 12, 30, and 31, a description thereof is omitted. The Sub_id filter control portion 404 in FIG. 32 controls the Sub_id filter 405 so as to supply the TS packets having Sub_id=0 to the buffer 406 at a subsequent stage, and, under the control of the Sub_id filter control portion 404, the Sub_id filter 405 flips the switch. As a result, the Sub_id filter 405 supplies, as shown in FIG. 33, only the TS packets of the base audio stream to the buffer 406. The audio decoder 407 decodes the TS packets of the base audio stream, which are supplied by the buffer 406 with predetermined timing.

Since the PID that indicates one audio stream and the Sub_id that identifies the type of stream are added to the header of each TS packet, even the audio-stream processing section 122 (receiver 42) capable of decoding only the base audio stream, such as that shown in FIG. 32, can select and decode only the TS packets corresponding to the base audio stream. That is, when an audio stream extended to a plurality of levels is transmitted, even the receiver 42 having the audio-stream processing section 122 in FIG. 32 can extract and play back only the base audio stream. Since the Sub_id is added not to the payload but to the header of the TS packet, the receiver 42 can determine, based on the header, whether the TS packet is processable without seeing the payload of the TS packet. As a result, the processing can be done fast.

In the above-described second embodiment, the example of the receiver 42 (FIG. 10) having the audio-stream processing section 122 capable of decoding the TS in FIGS. 22 and 23 has been described. As another example, an example of the configuration in the case where the audio decoder 407 of the audio-stream processing section 122 capable of decoding the TS in FIGS. 22 and 23 is capable of decoding only the base audio stream and the first extension audio stream is described using FIG. 34.

Figure 34:
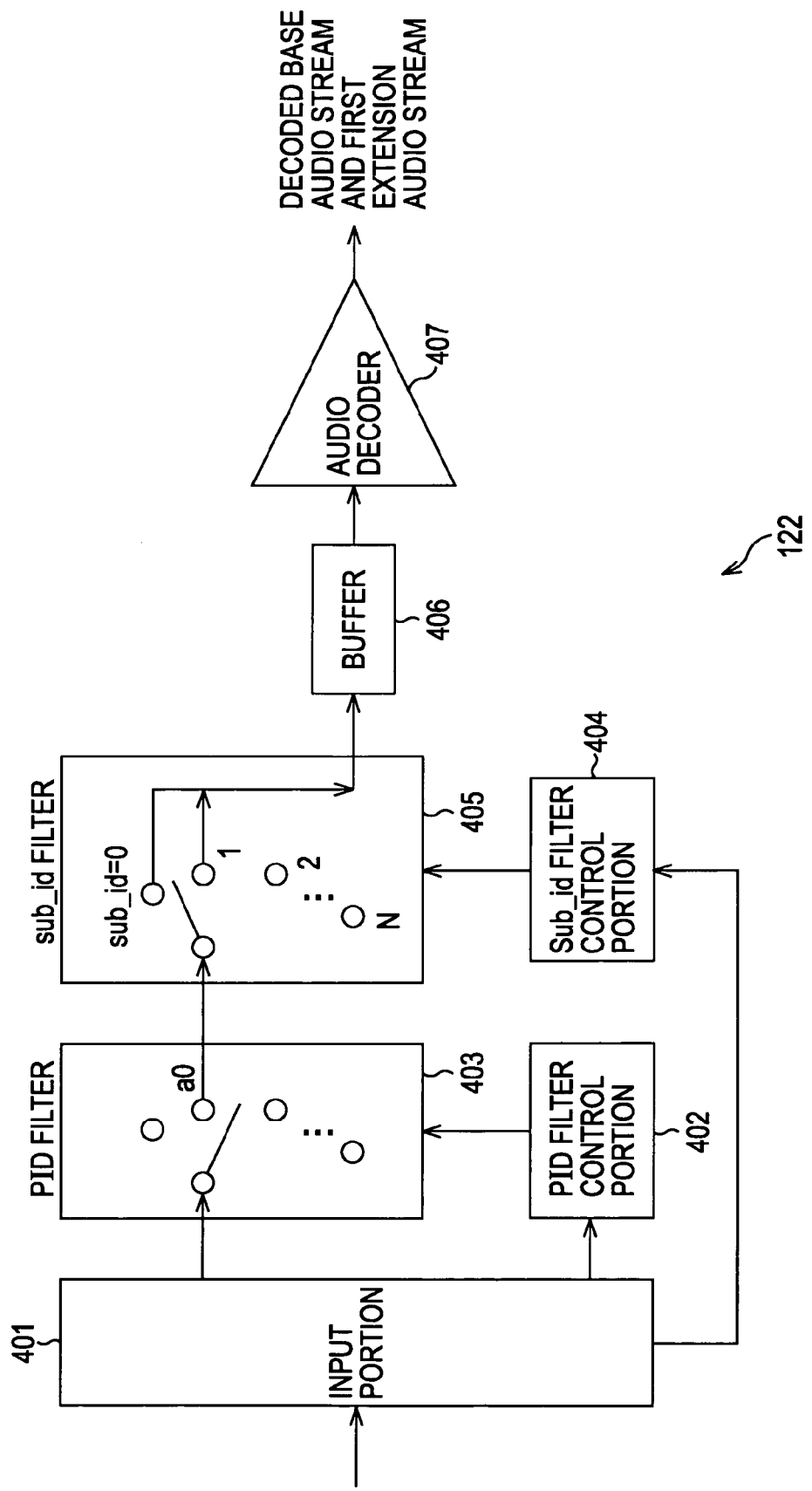
FIG. 34 is an illustration of an example of the configuration of an audio-stream processing section that can decode the base audio stream and the first and second extension audio streams.

Based on the Sub_id information (value) written in the header of each TS packet supplied by the input portion 401 and on the predetermined condition set in advance in the Sub_id filter control portion 404, the Sub_id filter control portion 404 controls the operation of the Sub_id filter 405. In the example of FIG. 34, the Sub_id filter control portion 404 determines that the types of streams that the audio decoder 407 can process are the base audio stream and the first extension audio stream, and, based on the predetermined condition, confirms that the base audio stream corresponds to Sub_id=0 and 1. The Sub_id filter control portion 404 controls the Sub_id filter 405 so as to supply the TS packets having Sub_id=0 and 1 to the buffer 406.

Under the control of the Sub_id filter control portion 404, the Sub_id filter 405 selects (extracts) the TS packets. In the example of FIG. 34, under the control of the Sub_id filter control portion 404, the Sub_id filter 405 selects the switch corresponding to the values of Sub_id=0 and 1 written in the header and supplies the base audio stream and the first extension audio stream to the buffer 406.

Figure 35:
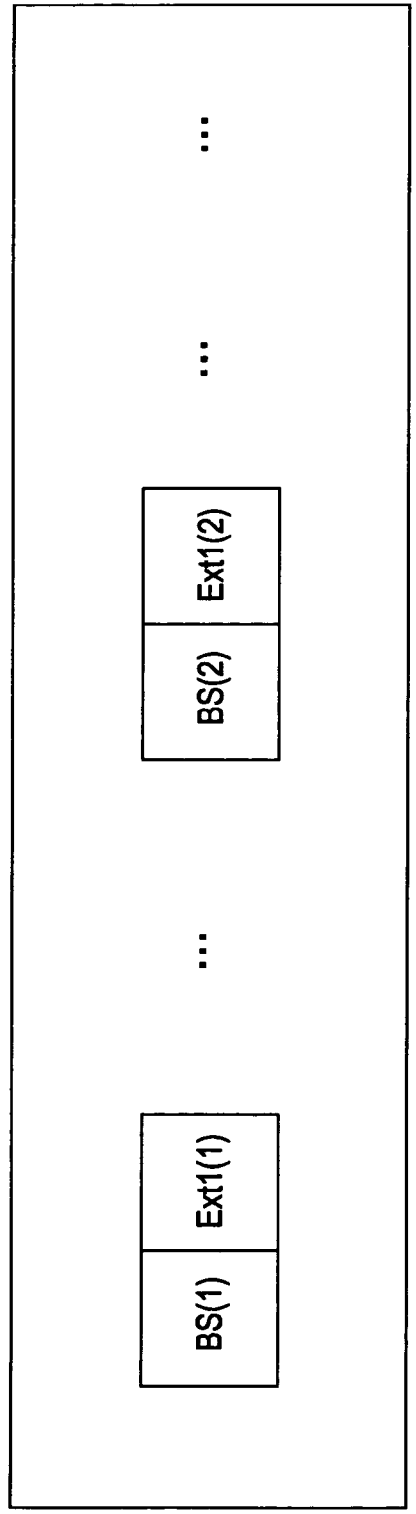
FIG. 35 is an illustration of the order of TS packets.

In the example of FIG. 34, the audio-stream processing section 122 has only the audio decoder 407 corresponding to the base audio stream and the first extension audio stream and is incapable of decoding the second to n-th extension audio streams. In this case, the Sub_id filter control portion 404 remembers that the types of streams that it can process are the base audio stream and the first extension audio stream. Based on the predetermined condition set in advance (condition indicating, for example, that Sub_id=0 corresponds to the base audio stream, and Sub_id=1 corresponds to the first extension audio stream), the Sub_id filter control portion 404 refers to Sub_ids corresponding to the base audio stream and the first extension audio stream. In this case, the Sub_id filter control portion 404 determines that Sub_id=0 and 1 correspond to the types of streams that it can process and controls the Sub_id filter 405 so as to select the TS packets having Sub_ids of the decodable streams. For example, the Sub_id filter control portion 404 informs the Sub_id filter 405 of the IDs of the decodable streams or the Sub_id numbers (Sub_id=0 and 1) allowed to be passed through. Based on the Sub_ids, namely, Sub_id=0 and 1, reported by the Sub_id filter control portion 404, the Sub_id filter 405 selects the TS packets having Sub_id=0 and 1 and supplies the TS packets to the buffer 406. When the TS packets of the second to n-th extension audio streams are supplied, the Sub_id filter 405 does not select these packets. That is, only when the TS packets of the base audio stream and the first extension audio stream having Sub_id=0 and 1 are supplied, the Sub_id filter 405 selects the TS packets of the base audio stream and the first extension audio stream and supplies the TS packets to the buffer 406 at a subsequent stage. Accordingly, the Sub_id filter 405 selects, as shown in FIG. 35, the TS packets of the base audio stream and the first extension audio stream and supplies the TS packets to the buffer 406 at a subsequent stage.

Since a TS packet receiving process executed by the receiver 42 (FIG. 10) having the audio-stream processing section 122 in FIG. 34 is similar to those in FIGS. 12, 30, and 31, a description thereof is omitted. The Sub_id filter control portion 404 in FIG. 34 controls the Sub_id filter 405 so as to supply the TS packets having Sub_id=0 and 1 to the buffer 406 at a subsequent stage, and, under the control of the Sub_id filter control portion 404, the Sub_id filter 405 flips the switch. As a result, the Sub_id filter 405 supplies, as shown in FIG. 35, only the TS packets of the base audio stream and the first extension audio stream to the buffer 406. The audio decoder 407 decodes the TS packets of the base audio stream and the first extension audio stream, which are supplied by the buffer 406 with predetermined timing.

As described above, the receiver 42 (the audio-stream processing section 122 in FIG. 34) capable of decoding the base audio stream and the first extension audio stream can separate and play back only the base audio stream and the first extension audio stream.

When a TS is an audio stream in which encoding units to be synchronously played back are encoded and supplied in sequence in the order of the base audio stream and the first to n-th extension audio streams, the configuration shown in FIGS. 28, 32, and 34 can be applied. Compared with FIG. 16 or the like in the first embodiment, the number of buffers can be reduced. Also the audio-stream processing section can be implemented with low cost.

In the example of the audio-stream processing section 122 (FIGS. 28, 32, and 34) of the receiver 42 in the second embodiment, as in the case of FIG. 18, the cases have been described in which the stream processing process is performed when the TS multiplexing is limited. However, as shown in FIGS. 11, 14, 15, and 16 in the first embodiment, different buffers may be provided for different types of streams. In this case, although the number of buffers is increased, the TS multiplexing becomes unlimited, thereby increasing the degree of freedom for the receiver 42.

In the audio-stream processing section 122 in the examples of FIGS. 28, 32, and 34, the input portion 401 supplies the header of each TS packet to the Sub_id filter control portion 404. Alternatively, however, the output of the PID filter 403 (TS packets having PID=a0) may be supplied to the Sub_id filter control portion 404. In this case, the Sub_id filter control portion 404 controls the Sub_id filter 405 based on the header of each of the TS packets supplied not by the input portion 401 but by the PID filter 403.

According to the second embodiment, in the case where a multiplexed audio stream including the base audio stream and extension audio streams at a plurality of levels is played back, there is provided a multiplexed stream encoding and decoding method for the receiver 42 capable of decoding only the base audio stream (e.g., the receiver 42 having the audio-stream processing section 122 in FIG. 32) that separates and plays back only the base audio stream; and for the receiver 42 capable of playing back the extension audio streams up to a predetermined n-th level (e.g., the receiver 42 having the audio-stream processing section 122 in FIG. 28) that separates and plays back the base audio stream and the extension audio streams up to the n-th level.

That is, according to the transmitter 41 at the transmitting side (e.g., the transmitter 41 in FIG. 20), a stream including the base audio stream and extension streams at a plurality of levels can be encoded so as to be decodable in accordance with the processing capacity of the receiving side. In other words, when a stream including the base audio stream and extension streams at a plurality of levels is transmitted, an apparatus at the receiving side (e.g., FIGS. 28, 32, and 34) can determine the type(s) of stream(s) that it can process and can decode and play back only the stream(s) that it can process.

Since it is only necessary to add the PID and the Sub_id to the header of each TS packet, this method is easily applicable to a transport stream.

Since only one type of stream needs to be included in one TS packet having 188 bytes, which is relatively a small amount of data, that is, the base audio stream and the extension audio stream(s) need not be included in one TS packet, encoding with high encoding efficiency can be performed.

Because the stream structure is not defined by the format, even when an extension is added to an audio stream, that is, even when n is increased, both encoding and decoding in accordance therewith can be performed. That is, even an apparatus capable of decoding only the base audio stream can decode an audio stream to which extension is added.

The present invention is not limited to the transmitter 41 having an encoder and is applicable to all the information processing apparatuses that perform encoding. Also, the present invention is not limited to the receiver 42 having a decoder and is applicable to all the information processing apparatuses that perform decoding.

In the above examples, the cases in which the present invention is applied to encoding and decoding of an audio stream have been described. However, the present invention is not limited thereto but can be applied to encoding and decoding of a video stream. In other words, the present invention can be applied to a stream such as an audio stream or a video stream.

The above-described consecutive processing can be executed by hardware or can be executed by software. In this case, the above-described processing is executed by a personal computer 500 shown in FIG. 36.

Figure 36:
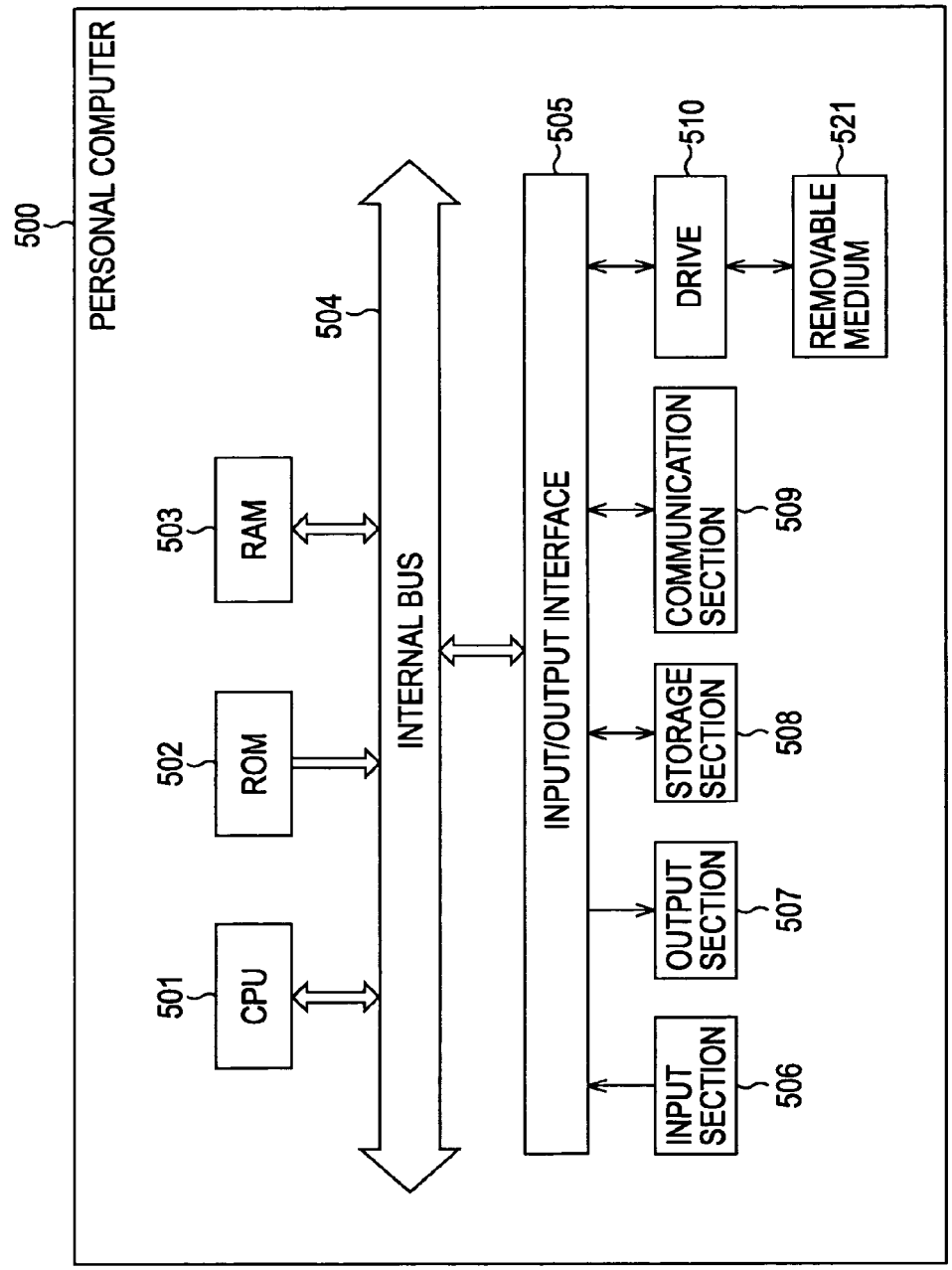
FIG. 36 is a diagram showing a personal computer.

In FIG. 36, a CPU 501 executes various types of processing in accordance with programs stored in a ROM 502 or programs loaded from a storage section 508 to a RAM 503. The RAM 503 stores the data required for the CPU 501 to execute various types of processing.

The CPU 501, the ROM 502, and the RAM 503 are connected to one another via an internal bus 504. The internal bus 504 also connects to an input/output interface 505.

The input/output interface 505 connects to an input section 506 including a keyboard and a mouse; an output section 507 including a display formed by a CRT, an LCD, or the like, and a speaker; a storage section 508 including a hard disk; and a communication section 509 including a modem and a terminal adapter. The communication section 509 performs communicating processing via various types of networks including a telephone line and a CATV.

The input/output interface 505 connects to a drive 510, if necessary, and a removable medium 521, such as a magnetic disk, an optical disc, a magneto-optical disc, or a semiconductor memory, is loaded into the drive 510. A computer program read therefrom is installed in the storage section 508, if necessary.

When the consecutive processing is executed by software, programs forming the software are installed from a network or a recording medium.

As shown in FIG. 36, the recording medium includes a package medium which includes the program-recorded removable medium 521 distributed for providing a user with a program, but also a hard disk which includes the program-recorded ROM 502 and the program-recorded storage section 508 provided to the user in a form built into an apparatus.

In this specification, steps constituting a computer program include, needless to say, processing steps which are performed in a time-series manner in the order given, and include processing steps which are executed in parallel or separately even if they are not always executed in a time-series manner.

In addition, in this specification, the system means the entirety of an apparatus including a plurality of devices.

The invention claimed is:

1. An information processing apparatus comprising:
encoding means for encoding at least a base stream of an entire stream that may include the base stream and one or more extension streams having extensibility for the base stream;
first adding means for adding a same first ID to the stream encoded by the encoding means among the base stream and the one or more extension streams, the first ID identifying the entire stream;
second adding means for adding transport priority information to, among the base stream and the one or more extension streams, the stream encoded by the encoding means, the transport priority information indicating priority and respectively distinguishing the base stream from the one or more extension streams; and
a packetizing means for packetizing the base stream and the one or more extension streams, to which the first ID and the transport priority information are added by the first adding means and the second adding means, into distinct TS packets,
wherein the encoding means encodes first TS packets forming only the base stream and the second TS packets forming the one or more extension streams, which are included in the entire stream, so that the first and second TS packets, to be played back at the same time, are arranged in sequence in the order of the first TS packets forming the base stream and the second TS packets forming the one or more extension streams and such that the first TS packets forming the base stream and the second TS packets forming the one or more extension streams are interleaved.

2. The information processing apparatus according to claim 1, wherein
when any of synchronization units of the one or more extension streams corresponding to synchronization units of the base stream are present, the encoding means encodes, among the one or more extension streams, the extension stream having the present synchronization units of the base stream.

3. The information processing apparatus according to claim 2, wherein
when any of the synchronization units of the one or more extension streams corresponding to the synchronization units of the base stream are present, the encoding means encodes, among the one or more extension streams, the extension stream having the present synchronization units and the base stream and does not encode the extension stream having none of the present synchronization units, thereby encoding the entire stream using variable bit rate.

4. An information processing method implemented using an information processing apparatus having at least encoding and packetizing parts, comprising:
an encoding step of encoding, using the information processing apparatus, at least a base stream of an entire stream that may include the base stream and one or more extension streams having extensibility for the base stream;
a first adding step of adding a same first ID to the stream encoded by the encoding step among the base stream and the one or more extension streams, the first ID identifying the entire stream;
a second adding step of adding transport priority information to, among the base stream and the one or more extension streams, the stream encoded by the encoding step, the transport priority information indicating priority and respectively distinguishing the base stream from the one or more extension streams; and
a packetizing step of packetizing, using the information processing apparatus, the base stream and the one or more extension streams, to which the first ID and the transport priority information are added by the first adding step and the second adding step, into distinct TS packets,
wherein the encoding step encodes first TS packets forming only the base stream and second TS packets forming the one or more extension streams, which are included in the entire stream, so that the first and second TS packets, to be played back at the same time, are arranged in sequence in the order of the first TS packets forming the base stream and the second TS packets forming the one or more extension streams and such that the first TS packets forming the base stream and the second TS packets forming the one or more extension streams are interleaved.

5. A non-transitory computer readable medium having stored thereon a program that when executed by the computer causes the computer to execute an information processing method comprising:
- an encoding step of encoding at least a base stream of an entire stream that may include the base stream and one or more extension streams having extensibility for the base stream;
- a first adding step of adding a same first ID to the stream encoded by the encoding step among the base stream and the one or more extension streams, the first ID identifying the entire stream;
- a second adding step of adding transport priority information to, among the base stream and the one or more extension streams, the stream encoded by the encoding step, the transport priority information indicating priority and respectively distinguishing the base stream from the one or more extension streams; and
- a packetizing step of packetizing the base stream and the one or more extension streams, to which the first ID and the transport priority information are added by the first adding step and the second adding step, into distinct TS packets,
- wherein the encoding step encodes first TS packets forming only the base stream and second TS packets forming the one or more extension streams, which are included in the entire stream, so that the first and second TS packets, to be played back at the same time, are arranged in sequence in the order of the first TS packets forming the base stream and the second TS packets forming the one or more extension streams and such that the first TS packets forming the base stream and the second TS packets forming the one or more extension streams are interleaved.

6. An information processing apparatus comprising:
- input means for inputting an entire stream that includes at least one of first TS packets forming a base stream and second TS packets forming each of one or more extension streams having extensibility for the base stream the first and second TS packets being distinct;
- selecting means for selecting, from the entire stream, first and second TS packets based on a first ID used to identify the entire stream, transport priority information indicating priority and respectively distinguishing the base stream from the one or more extension streams, and a predetermined condition set in advance, the first ID and the transport priority information being stored in each of the first and second TS packets input by the input means; and
- decoding means for decoding the first and second TS packets selected by the selecting means,
- wherein the first TS packets forming only the base stream and the second TS packets forming the one or more extension streams, which are included in the entire stream, are encoded so that the first and second TS packets, to be played back at the same time, are arranged in sequence in the order of the first TS packets forming the base stream and the second TS packets forming the one or more extension streams and such that the first TS packets forming the base stream and the second TS packets forming the one or more extension streams are interleaved.

7. The information processing apparatus according to claim 6, wherein
- the entire stream input to the input means at least includes an encoded base stream, and further includes the one or more extension streams which correspond to synchronization units of the base stream and which are encoded using variable bit rate.

8. An information processing method implemented using an information processing apparatus having at least a decoding part, comprising:
- an input step of inputting an entire stream that may include first TS packets forming a base stream and second TS packets forming each of one or more extension streams having extensibility for the base stream, the first and second TS packets being distinct;
- a selecting step of selecting, from the entire stream, first and second TS packets based on a first ID used to identify the entire stream, transport priority information indicating priority and respectively distinguishing the base stream from the one or more extension streams, and a predetermined condition set in advance, the first ID and the transport priority information being stored in each of the first and second TS packets input by processing in the input step; and
- a decoding step of decoding, using the information processing apparatus, the first and second TS packets selected by processing in the selecting step,
- wherein the first TS packets forming only the base stream and the second TS packets forming the one or more extension streams, which are included in the entire stream, are encoded so that the first and second TS packets, to be played back at the same time, are arranged in sequence in the order of the first TS packets forming the base stream and the second TS packets forming the one or more extension streams and such that the first TS packets forming the base stream and the second TS packets forming the one or more extension streams are interleaved.

9. A non-transitory computer readable medium having stored thereon a program that when executed by the computer causes the computer to execute an information processing method comprising:
- an input step of inputting an entire stream that may include first TS packets forming a base stream and second TS packets forming each of one or more extension streams having extensibility for the base stream, the first and second TS packets being distinct;
- a selecting step of selecting, from the entire stream, first and second TS packets based on a first ID used to identify the entire stream, transport priority information indicating priority and respectively distinguishing the base stream from the one or more extension streams, and a predetermined condition set in advance, the first ID and the transport priority information being stored in each of the first and second TS packets input by processing in the input step; and
- a decoding step of decoding the first and second TS packets selected by processing in the selecting step,
- wherein the first TS packets forming only the base stream and the second TS packets forming the one or more extension streams, which are included in the entire stream, are encoded so that the first and second TS packets, to be played back at the same time, are arranged in sequence in the order of the first TS packets forming the base stream and the second TS packets forming the one or more extension streams and such that the first TS packets forming the base stream and the second TS packets forming the one or more extension streams are interleaved.

10. A non-transitory computer readable medium having stored thereon a data structure of an entire stream to be played back by a computer, wherein the entire stream includes at least one of a base stream and one or more extension streams having extensibility for the base stream, the entire stream includes:
  first TS packets forming only the base stream; and
  second TS packets forming, when any of synchronization units of the one or more extension streams corresponding to synchronization units of the base stream are present, among the one or more extension streams, the extension stream having the present synchronization units, the first and second TS packets being distinct; and
  a header of each of the first TS packets forming the base stream and the second TS packets forming each of the one or more extension streams includes:
    a first ID used to identify the entire stream; and
    transport priority information indicating priority and respectively distinguishing the base stream from the one or more extension streams,
wherein the first TS packets forming the base stream and the second TS packets forming the one or more extension streams, which are included in the entire stream, are encoded so that the first and second TS packets, to be played back at the same time, are arranged in sequence in the order of the first TS packets forming the base stream and the second TS packets forming the one or more extension streams and such that the first TS packets forming the base stream and the second TS packets forming the one or more extension streams are interleaved.

11. The non-transitory computer readable medium according to claim 10, wherein
the entire stream at least includes the base stream, and further includes the second TS packets forming the one or more extension streams corresponding to the synchronization units of the base stream, the number of the second TS packets being variable.

12. An information processing apparatus, comprising:
an encoding unit implemented by a central processing unit and configured to encode an input stream so as to include, among a base stream and one or more extension streams having extensibility for the base stream, at least the base stream and one or more extension streams;
an adding unit configured to add transport priority information that indicates priority and respectively distinguishes the base stream from the one or more extension streams, which are encoded by the encoding unit, to the base stream and the one or more extension streams; and
a packetizing unit configured to packetize the base stream and the one or more extension streams, to which the transport priority information is added by the adding unit, into distinct TS packets,
wherein the encoding unit is further configured to encode first TS packets forming only the base stream and second TS packets forming the one or more extension streams, which are included in the input stream, so that the first and second TS packets, to be played back at the same time, are arranged in sequence in the order of the first TS packets forming the base stream and the second TS packets forming the one or more extension streams and such that the first TS packets forming the base stream and the second TS packets forming the one or more extension streams are interleaved.

13. An information processing apparatus, comprising:
an input unit configured to input a stream including first TS packets forming a base stream, and second TS packets forming one or more extension streams having extensibility for the base stream, each of the first and second TS packets being distinct and having transport priority information that indicates priority and respectively distinguishes the base stream from the one or more extension streams;
a determining unit configured to refer to the transport priority information stored in the first and second TS packets input by the input unit and for determining the type of processable stream;
a selecting unit configured to select, from the stream, the first and second TS packets having the transport priority information associated with the stream determined by the determining unit to be processable; and
a decoding unit implemented by a central processing unit and configured to decode the first and second TS packets selected by the selecting unit,
wherein the first TS packets forming only the base stream and the second TS packets forming the one or more extension streams, which are included in the stream, are encoded so that the first and second TS packets, to be played back at the same time, are arranged in sequence in the order of the first TS packets forming the base stream and the second TS packets forming the one or more extension streams and such that the first TS packets forming the base stream and the second TS packets forming the one or more extension streams are interleaved.

14. An information processing apparatus, comprising:
an encoding unit implemented by a central processing unit and configured to encode at least a base stream of an entire stream that may include the base stream and one or more extension streams having extensibility for the base stream;
a first adding unit configured to add a same first ID to the stream encoded by the encoding unit among the base stream and the one or more extension streams, the first ID identifying the entire stream;
a second adding unit configured to add transport priority information to, among the base stream and the one or more extension streams, the stream encoded by the encoding unit, the transport priority information indicating priority and respectively distinguishing the base stream from the one or more extension streams; and
a packetizing unit configured to packetize the base stream and the one or more extension streams, to which the first ID and the transport priority information are added by the first adding unit and the second adding unit, into distinct TS packets,
wherein the encoding unit is further configured to encode first TS packets forming only the base stream and second TS packets forming the one or more extension streams, which are included in the entire stream, so that the first and second TS packets, to be played back at the same time, are arranged in sequence in the order of the first TS packets forming the base stream and the second TS packets forming the one or more extension streams and such that the first TS packets forming the base stream and the second TS packets forming the one or more extension streams are interleaved.

15. An information processing apparatus comprising:

an input unit configured to input an entire stream that includes at least one of first TS packets forming a base stream and second TS packets forming each of one or more extension streams having extensibility for the base stream, the first and second TS packets being distinct;

a selecting unit configured to select, from the entire stream, first and second TS packets based on a first ID used to identify the entire stream, transport priority information indicating priority and respectively distinguishing the base stream from the one or more extension streams, and a predetermined condition set in advance, the first ID and the transport priority information being stored in each of the first and second TS packets input by the input unit; and a decoding unit implemented by a central processing unit and configured to decode the first and second TS packets selected by the selecting unit, wherein the first TS packets forming only the base stream and the second TS packets forming the one or more extension streams, which are included in the entire stream, are encoded so that the first and second TS packets, to be played back at the same time, are arranged in sequence in the order of the first TS packets forming the base stream and the second TS packets forming the one or more extension streams and such that the first TS packets forming the base stream and the second TS packets forming the one or more extension streams are interleaved.

* * * * *